(12) United States Patent
Poghosyan et al.

(10) Patent No.: US 11,481,300 B2
(45) Date of Patent: Oct. 25, 2022

(54) PROCESSES AND SYSTEMS THAT DETECT ABNORMAL BEHAVIOR OF OBJECTS OF A DISTRIBUTED COMPUTING SYSTEM

(71) Applicant: VMware, Inc., Palo Alto, CA (US)

(72) Inventors: Arnak Poghosyan, Yerevan (AM); Ashot Nshan Harutyunyan, Yerevan (AM); Naira Movses Grigoryan, Yerevan (AM); Nicholas Kushmerick, Seattle, WA (US)

(73) Assignee: VMware, Inc., Palo Alto, CA (US)

( * ) Notice: Subject to any disclaimer, the term of this patent is extended or adjusted under 35 U.S.C. 154(b) by 381 days.

(21) Appl. No.: 16/391,668

(22) Filed: Apr. 23, 2019

(65) Prior Publication Data
US 2020/0341877 A1 Oct. 29, 2020

(51) Int. Cl.
*G06F 11/30* (2006.01)
*G06F 17/18* (2006.01)

(52) U.S. Cl.
CPC ........ *G06F 11/3055* (2013.01); *G06F 11/301* (2013.01); *G06F 17/18* (2013.01)

(58) Field of Classification Search
CPC ..... G06F 11/3055; G06F 11/301; G06F 17/18
See application file for complete search history.

(56) References Cited

U.S. PATENT DOCUMENTS

| | | | |
|---|---|---|---|
| 8,949,677 B1* | 2/2015 | Brundage | G06F 11/0745 714/48 |
| 9,245,235 B2* | 1/2016 | Chen | G06F 17/18 |
| 2014/0179270 A1* | 6/2014 | Anand | H04W 12/12 455/410 |
| 2016/0350173 A1* | 12/2016 | Ahad | H04L 67/02 |
| 2016/0352767 A1* | 12/2016 | Owhadi | H04L 63/1416 |
| 2017/0279829 A1* | 9/2017 | Vasseur | H04L 41/0893 |
| 2018/0225391 A1* | 8/2018 | Sali | G06N 20/00 |
| 2019/0163900 A1* | 5/2019 | Zhang | G06F 21/567 |
| 2020/0007563 A1* | 1/2020 | Leibman | G06K 9/6219 |

* cited by examiner

Primary Examiner — Viet D Vu

(57) ABSTRACT

Automated processes and systems for detecting abnormally behaving objects of a distributed computing system are described. Processes and systems obtain metrics that are generated in a historical time window and are associated with an object of the distributed computing system. Processes and system use the metrics to compute a time-dependent system indicator over the historical time window. Each value of the system indicator corresponds to a point in time of the historical time window when the object was in a normal or an abnormal state. Processes and systems use the normal and abnormal states of the system indicator in the historical time window to train a state classifier that is used to detect run-time abnormal behavior of the object. When the state classifier identifies abnormal behavior of the object, an alert is generated, indicating the abnormal behavior of the object.

21 Claims, 36 Drawing Sheets

$$\bar{X} = \begin{bmatrix} \bar{x}_1^{(1)} & \bar{x}_1^{(2)} & \bar{x}_1^{(3)} & \cdots & \bar{x}_1^{(M)} \\ \bar{x}_2^{(1)} & \bar{x}_2^{(2)} & \bar{x}_2^{(3)} & \cdots & \bar{x}_2^{(M)} \\ \bar{x}_3^{(1)} & \bar{x}_3^{(2)} & \bar{x}_3^{(3)} & \cdots & \bar{x}_3^{(M)} \\ \vdots & \vdots & \vdots & & \vdots \\ \bar{x}_N^{(1)} & \bar{x}_N^{(2)} & \bar{x}_N^{(3)} & \cdots & \bar{x}_N^{(M)} \end{bmatrix}$$

$$2100 \rightarrow \bar{X}^T = \begin{bmatrix} \bar{x}_1^{(1)} & \bar{x}_2^{(1)} & \bar{x}_3^{(1)} & \cdots & \bar{x}_N^{(1)} \\ \bar{x}_1^{(2)} & \bar{x}_2^{(2)} & \bar{x}_3^{(2)} & \cdots & \bar{x}_N^{(2)} \\ \bar{x}_1^{(3)} & \bar{x}_2^{(3)} & \bar{x}_3^{(3)} & \cdots & \bar{x}_N^{(3)} \\ \vdots & \vdots & \vdots & & \vdots \\ \bar{x}_1^{(M)} & \bar{x}_2^{(M)} & \bar{x}_3^{(M)} & \cdots & \bar{x}_N^{(M)} \end{bmatrix}$$

FIG. 21A $$2102 \rightarrow \mathbf{C}^{cov} = \begin{bmatrix} cov(\bar{u}_1,\bar{u}_1) & cov(\bar{u}_1,\bar{u}_2) & \cdots & cor(\bar{u}_1,\bar{u}_M) \\ cov(\bar{u}_2,\bar{u}_1) & cov(\bar{u}_2,\bar{u}_2) & \cdots & cor(\bar{u}_1,\bar{u}_M) \\ \vdots & \vdots & & \vdots \\ cov(\bar{u}_M,\bar{u}_1) & cov(\bar{u}_M,\bar{u}_2) & \cdots & cor(\bar{u}_M,\bar{u}_M) \end{bmatrix}$$

FIG. 21B $$2104 \rightarrow \mathbf{C}^{cor} = \begin{bmatrix} cor(\bar{u}_1,\bar{u}_1) & cor(\bar{u}_1,\bar{u}_2) & \cdots & cor(\bar{u}_1,\bar{u}_M) \\ cor(\bar{u}_2,\bar{u}_1) & cor(\bar{u}_2,\bar{u}_2) & \cdots & cor(\bar{u}_1,\bar{u}_M) \\ \vdots & \vdots & & \vdots \\ cor(\bar{u}_M,\bar{u}_1) & cor(\bar{u}_M,\bar{u}_2) & \cdots & cor(\bar{u}_M,\bar{u}_M) \end{bmatrix}$$

FIG. 21C $$2100 \rightarrow \quad 2204$$

$$\mathbf{C} \begin{bmatrix} E_{1j} \\ E_{2j} \\ \vdots \\ E_{Mj} \end{bmatrix} = \lambda^j \begin{bmatrix} E_{1j} \\ E_{2j} \\ \vdots \\ E_{Mj} \end{bmatrix} = \lambda^j \mathbf{E}^j$$

FIG. 22

$$E = \begin{bmatrix} | & | & & | \\ E^1 & E^2 & \cdots & E^M \\ | & | & & | \end{bmatrix} \quad \Lambda = \begin{bmatrix} \lambda_1 & & & 0 \\ & \lambda_2 & & \\ & & \ddots & \\ 0 & & & \lambda_M \end{bmatrix} \quad E^T = \begin{bmatrix} \underline{\quad E^1 \quad} \\ \underline{\quad E^2 \quad} \\ \vdots \\ \underline{\quad E^M \quad} \end{bmatrix}$$

$$e_1 = \begin{bmatrix} e_{11} \\ e_{21} \\ \vdots \\ e_{M1} \end{bmatrix} \quad e_2 = \begin{bmatrix} e_{12} \\ e_{22} \\ \vdots \\ e_{M2} \end{bmatrix} \quad e_3 = \begin{bmatrix} e_{13} \\ e_{23} \\ \vdots \\ e_{M3} \end{bmatrix} \quad \cdots \quad e_M = \begin{bmatrix} e_{1M} \\ e_{2M} \\ \vdots \\ e_{MM} \end{bmatrix}$$

FIG. 24

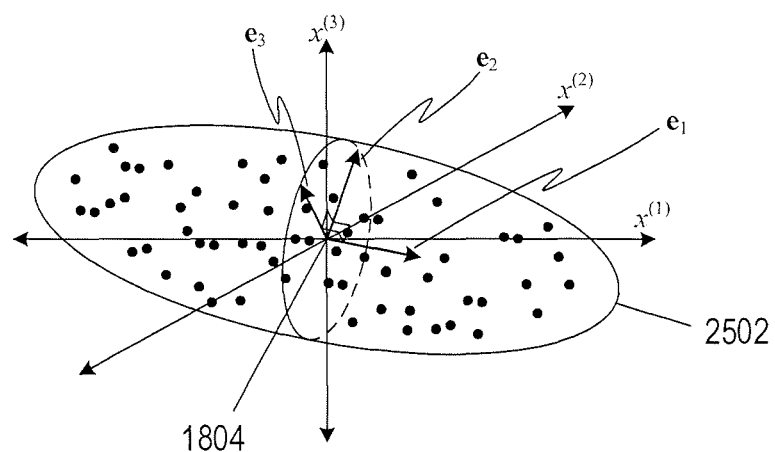

FIG. 25

$$[[\mathbf{PC}_1][\mathbf{PC}_2]\cdots[\mathbf{PC}_M]] = \begin{bmatrix} \overline{x}_1^{(1)} & \overline{x}_1^{(2)} & \overline{x}_1^{(3)} & \cdots & \overline{x}_1^{(M)} \\ \overline{x}_2^{(1)} & \overline{x}_2^{(2)} & \overline{x}_2^{(3)} & \cdots & \overline{x}_2^{(M)} \\ \overline{x}_3^{(1)} & \overline{x}_3^{(2)} & \overline{x}_3^{(3)} & \cdots & \overline{x}_3^{(M)} \\ \vdots & \vdots & \vdots & & \vdots \\ \overline{x}_N^{(1)} & \overline{x}_N^{(2)} & \overline{x}_N^{(3)} & \cdots & \overline{x}_N^{(M)} \end{bmatrix} [[\mathbf{e}_1][\mathbf{e}_2]\cdots[\mathbf{e}_M]]$$

$$\mathbf{PC}_1 = \begin{bmatrix} pc_1(t_1) \\ pc_1(t_2) \\ \vdots \\ pc_1(t_N) \end{bmatrix} = \begin{bmatrix} e_{11}\overline{x}_1^{(1)} + e_{21}\overline{x}_1^{(2)} + \ldots + e_{M1}\overline{x}_1^{(M)} \\ e_{11}\overline{x}_2^{(1)} + e_{21}\overline{x}_2^{(2)} + \ldots + e_{M1}\overline{x}_2^{(M)} \\ \vdots \\ e_{11}\overline{x}_N^{(1)} + e_{21}\overline{x}_N^{(2)} + \ldots + e_{M1}\overline{x}_N^{(M)} \end{bmatrix}$$

$$\mathbf{PC}_2 = \begin{bmatrix} pc_2(t_1) \\ pc_2(t_2) \\ \vdots \\ pc_2(t_N) \end{bmatrix} = \begin{bmatrix} e_{12}\overline{x}_1^{(1)} + e_{22}\overline{x}_1^{(2)} + \ldots + e_{M2}\overline{x}_1^{(M)} \\ e_{12}\overline{x}_2^{(1)} + e_{22}\overline{x}_2^{(2)} + \ldots + e_{M2}\overline{x}_2^{(M)} \\ \vdots \\ e_{12}\overline{x}_N^{(1)} + e_{22}\overline{x}_N^{(2)} + \ldots + e_{M2}\overline{x}_N^{(M)} \end{bmatrix}$$

$$\vdots$$

$$\mathbf{PC}_M = \begin{bmatrix} pc_M(t_1) \\ pc_M(t_2) \\ \vdots \\ pc_M(t_N) \end{bmatrix} = \begin{bmatrix} e_{1M}\overline{x}_1^{(1)} + e_{2M}\overline{x}_1^{(2)} + \ldots + e_{MM}\overline{x}_1^{(M)} \\ e_{1M}\overline{x}_2^{(1)} + e_{2M}\overline{x}_2^{(2)} + \ldots + e_{MM}\overline{x}_2^{(M)} \\ \vdots \\ e_{1M}\overline{x}_N^{(1)} + e_{2M}\overline{x}_N^{(2)} + \ldots + e_{MM}\overline{x}_N^{(M)} \end{bmatrix}$$

FIG. 26

$$\begin{bmatrix}[\mathbf{PC}_1^{rt}] & [\mathbf{PC}_2^{rt}] & \cdots & [\mathbf{PC}_n^{rt}]\end{bmatrix} = \begin{bmatrix} \overline{x}_{N+1}^{(1)} & \overline{x}_{N+1}^{(2)} & \overline{x}_{N+1}^{(3)} & \cdots & \overline{x}_{N+1}^{(M)} \\ \overline{x}_{N+2}^{(1)} & \overline{x}_{N+2}^{(2)} & \overline{x}_{N+2}^{(3)} & \cdots & \overline{x}_{N+2}^{(M)} \\ \overline{x}_{N+3}^{(1)} & \overline{x}_{N+3}^{(2)} & \overline{x}_{N+3}^{(3)} & \cdots & \overline{x}_{N+3}^{(M)} \\ \vdots & \vdots & \vdots & & \vdots \\ \overline{x}_{N+Q}^{(1)} & \overline{x}_{N+Q}^{(2)} & \overline{x}_{N+Q}^{(3)} & \cdots & \overline{x}_{N+Q}^{(M)} \end{bmatrix} \begin{bmatrix}[\mathbf{e}_1] & [\mathbf{e}_2] & \cdots & [\mathbf{e}_n]\end{bmatrix}$$

- 3308, 3310, 3306, 3312, 3302, 3304

$$\mathbf{PC}_1^{rt} = \begin{bmatrix} pc_1(t_{N+1}) \\ pc_1(t_{N+2}) \\ \vdots \\ pc_1(t_{N+Q}) \end{bmatrix} = \begin{bmatrix} e_{11}\overline{x}_{N+1}^{(1)} + e_{21}\overline{x}_{N+1}^{(2)} + \ldots + e_{M1}\overline{x}_{N+1}^{(M)} \\ e_{11}\overline{x}_{N+2}^{(1)} + e_{21}\overline{x}_{N+2}^{(2)} + \ldots + e_{M1}\overline{x}_{N+2}^{(M)} \\ \vdots \\ e_{11}\overline{x}_{N+Q}^{(1)} + e_{21}\overline{x}_{N+Q}^{(2)} + \ldots + e_{M1}\overline{x}_{N+Q}^{(M)} \end{bmatrix}$$

$$\mathbf{PC}_2^{rt} = \begin{bmatrix} pc_2(t_{N+1}) \\ pc_2(t_{N+2}) \\ \vdots \\ pc_2(t_{N+Q}) \end{bmatrix} = \begin{bmatrix} e_{12}\overline{x}_{N+1}^{(1)} + e_{22}\overline{x}_{N+1}^{(2)} + \ldots + e_{M2}\overline{x}_{N+1}^{(M)} \\ e_{12}\overline{x}_{N+2}^{(1)} + e_{22}\overline{x}_{N+2}^{(2)} + \ldots + e_{M2}\overline{x}_{N+2}^{(M)} \\ \vdots \\ e_{12}\overline{x}_{N+Q}^{(1)} + e_{22}\overline{x}_{N+Q}^{(2)} + \ldots + e_{M2}\overline{x}_{N+Q}^{(M)} \end{bmatrix}$$

$$\vdots$$

$$\mathbf{PC}_n^{rt} = \begin{bmatrix} pc_n(t_{N+1}) \\ pc_n(t_{N+2}) \\ \vdots \\ pc_n(t_{N+Q}) \end{bmatrix} = \begin{bmatrix} e_{1n}\overline{x}_{N+1}^{(1)} + e_{2n}\overline{x}_{N+1}^{(2)} + \ldots + e_{Mn}\overline{x}_{N+1}^{(M)} \\ e_{1n}\overline{x}_{N+2}^{(1)} + e_{2n}\overline{x}_{N+2}^{(2)} + \ldots + e_{Mn}\overline{x}_{N+2}^{(M)} \\ \vdots \\ e_{1n}\overline{x}_{N+Q}^{(1)} + e_{2n}\overline{x}_{N+Q}^{(2)} + \ldots + e_{Mn}\overline{x}_{N+Q}^{(M)} \end{bmatrix}$$

FIG. 33

PROCESSES AND SYSTEMS THAT DETECT ABNORMAL BEHAVIOR OF OBJECTS OF A DISTRIBUTED COMPUTING SYSTEM

TECHNICAL FIELD

This disclosure is directed to processes and systems that detect abnormal performance of objects of a distributed computing system.

BACKGROUND

Electronic computing has evolved from primitive, vacuum-tube-based computer systems, initially developed during the 1940s, to modern electronic computing systems in which large numbers of multi-processor computer systems, such as server computers, work stations, and other individual computing systems are networked together with large-capacity data-storage devices and other electronic devices to produce geographically distributed computing systems with numerous components that provide enormous computational bandwidths and data-storage capacities. These large, distributed computing systems are made possible by advances in computer networking, distributed operating systems and applications, data-storage appliances, computer hardware, and software technologies.

Because distributed computing systems have an enormous number of computational resources, various management systems have been developed to collect performance information about these resources. For example, a typical management system may collect hundreds of thousands of streams of metric data, called "metrics," to monitor various computational resources of a data center infrastructure. Each data point of a stream of metric data may represent an amount of the resource in use at a point in time. However, the enormous number of metric data streams received by a management system makes it very difficult for information technology ("IT") administrators to manually monitor the metrics, detect performance issues, and respond in real time to performance issues. Failure to respond in real time to performance problems can interrupt computer services and have enormous cost implications for data center tenants, such as when a tenant's server applications stop running or fail to timely respond to client requests.

SUMMARY

Automated processes and systems for detecting abnormal behavior of objects of a distributed computing system are described herein. Processes and systems obtain a metrics that are generated in a historical time window and are associated with an object of the distributed computing system. The object may be a physical object or a virtual object, including a server computer, data storage device, network device, application, virtual machine, virtual network device, or a container for which the metrics can be collected and recorded. Processes and systems use the metrics to compute a time-dependent system indicator for the object over the historical time window. Each value of the system indicator corresponds to a point in time of the historical time window when the object was in a normal or an abnormal state. Processes and systems use the normal and abnormal states of the system indicator in the historical time window to train a state classifier that is used to detect run-time abnormal behavior of the object. When the state classifier identifies abnormal behavior of the object, an alert is generated, identifying the abnormal behavior of the object. Processes and systems may generate recommendations for correcting the abnormal behavior or execute remedial measures to correct the abnormal behavior.

DESCRIPTION OF THE DRAWINGS

FIG. 21A shows an example transposed mean-centered metric-data matrix for the mean-centered metric-data matrix shown in FIG. 19.

FIG. 21B shows an example variance matrix.

FIG. 21C shows an example correlation matrix.

FIG. 22 shows a matrix representation of an eigenvector-eigenvalue problem formed for deviation matrix in FIG. 21B.

FIG. 23 shows matrix representations of the eigenvector matrix and eigenvalue matrix of the deviation matrix in FIG. 21B.

FIG. 24 shows column vectors of normalized eigenvectors.

FIG. 25 shows three orthogonal normalized eigenvectors for the three metrics shown FIG. 20.

FIG. 26 shows computation of M principal components by matrix multiplication.

FIG. 33 shows computation of n principal components by matrix multiplication.

DETAILED DESCRIPTION

This disclosure is directed to automated computational processes and systems to detect abnormal behavior exhibited by physical and virtual objects of a distributed computing system. In a first subsection, computer hardware, complex computational systems, and virtualization are described. Automated processes and systems for detecting and correcting abnormally behaving objects of a distributed computing system are described below in a second subsection.

Computer Hardware, Complex Computational Systems, and Virtualization

The term "abstraction" is not, in any way, intended to mean or suggest an abstract idea or concept. Computational abstractions are tangible, physical interfaces that are implemented using physical computer hardware, data-storage devices, and communications systems. Instead, the term "abstraction" refers, in the current discussion, to a logical level of functionality encapsulated within one or more concrete, tangible, physically-implemented computer systems with defined interfaces through which electronically-encoded data is exchanged, process execution launched, and electronic services are provided. Interfaces may include graphical and textual data displayed on physical display devices as well as computer programs and routines that control physical computer processors to carry out various tasks and operations and that are invoked through electronically implemented application programming interfaces ("APIs") and other electronically implemented interfaces. Software is essentially a sequence of encoded symbols, such as a printout of a computer program or digitally encoded computer instructions sequentially stored in a file on an optical disk or within an electromechanical mass-storage device. Software alone can do nothing. It is only when encoded computer instructions are loaded into an electronic memory within a computer system and executed on a physical processor that "software implemented" functionality is provided. The digitally encoded computer instructions are a physical control component of processor-controlled machines and devices. Multi-cloud aggregations, cloud-computing services, virtual-machine containers and virtual machines, containers, communications interfaces, and many of the other topics discussed below are tangible, physical components of physical, electro-optical-mechanical computer systems.

Figure 1:
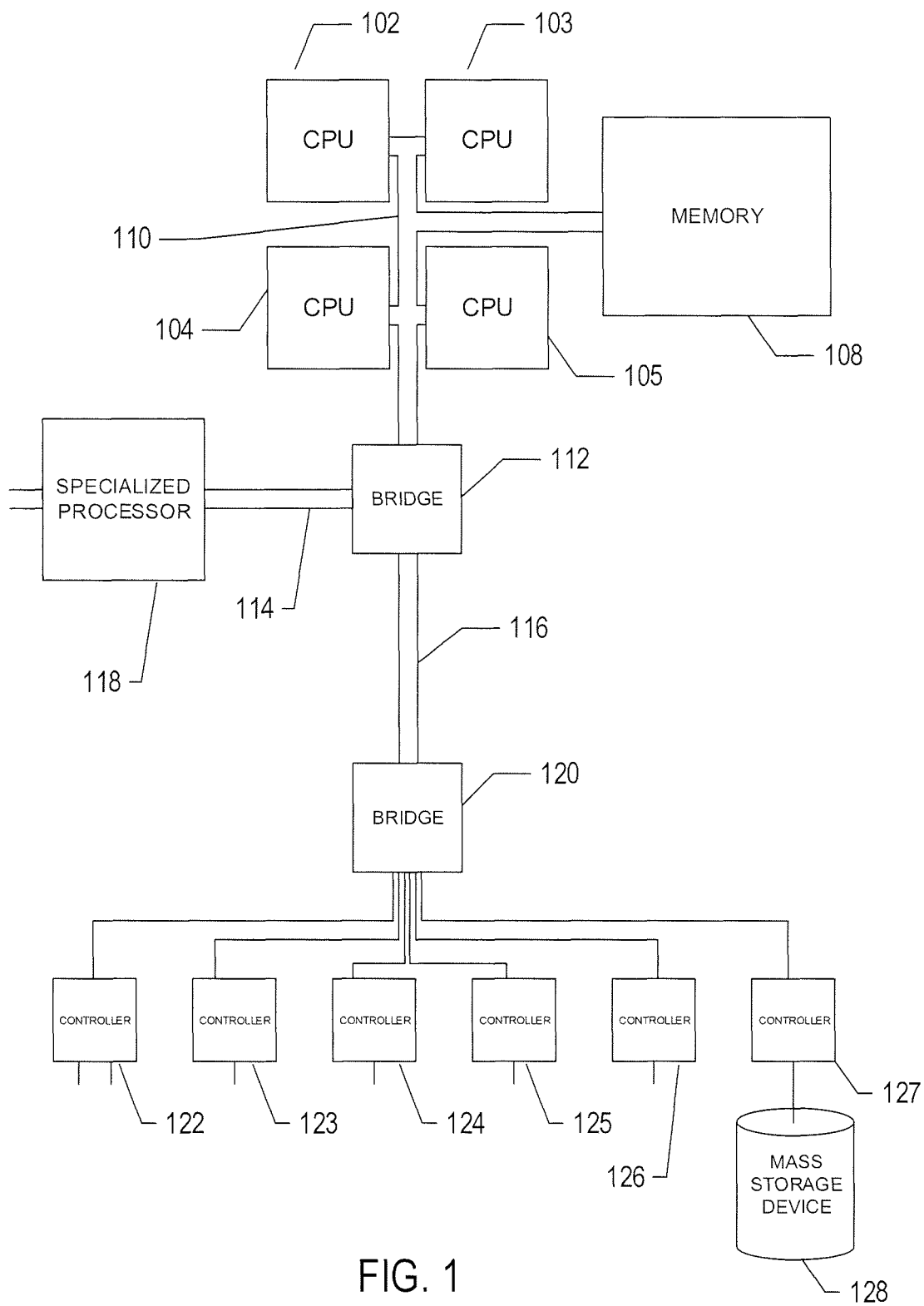
FIG. 1 shows an architectural diagram for various types of computers.

FIG. 1 shows a general architectural diagram for various types of computers. Computers that receive, process, and store event messages may be described by the general architectural diagram shown in FIG. 1, for example. The computer system contains one or multiple central processing units ("CPUs") 102-105, one or more electronic memories 108 interconnected with the CPUs by a CPU/memory-subsystem bus 110 or multiple busses, a first bridge 112 that interconnects the CPU/memory-subsystem bus 110 with additional busses 114 and 116, or other types of high-speed interconnection media, including multiple, high-speed serial interconnects. These busses or serial interconnections, in turn, connect the CPUs and memory with specialized processors, such as a graphics processor 118, and with one or more additional bridges 120, which are interconnected with high-speed serial links or with multiple controllers 122-127, such as controller 127, that provide access to various different types of mass-storage devices 128, electronic displays, input devices, and other such components, subcomponents, and computational devices. It should be noted that computer-readable data-storage devices include optical and electromagnetic disks, electronic memories, and other physical data-storage devices. Those familiar with modern science and technology appreciate that electromagnetic radiation and propagating signals do not store data for subsequent retrieval, and can transiently "store" only a byte or less of information per mile, far less information than needed to encode even the simplest of routines.

Of course, there are many different types of computer-system architectures that differ from one another in the number of different memories, including different types of hierarchical cache memories, the number of processors and the connectivity of the processors with other system components, the number of internal communications busses and serial links, and in many other ways. However, computer systems generally execute stored programs by fetching instructions from memory and executing the instructions in one or more processors. Computer systems include general-purpose computer systems, such as personal computers ("PCs"), various types of server computers and workstations, and higher-end mainframe computers, but may also include a plethora of various types of special-purpose computing devices, including data-storage systems, communications routers, network nodes, tablet computers, and mobile telephones.

Figure 2:
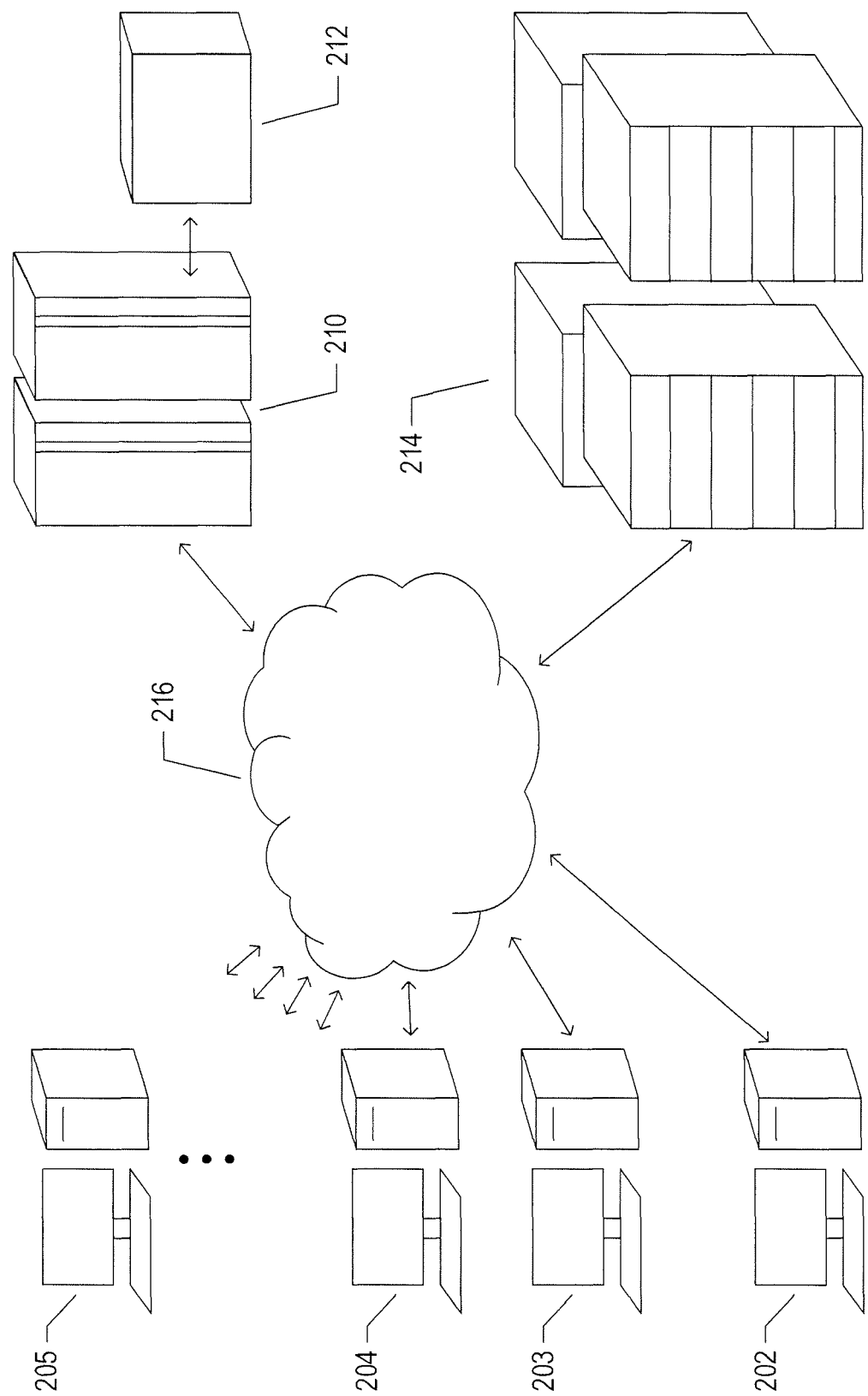
FIG. 2 shows an Internet-connected distributed computer system.

FIG. 2 shows an Internet-connected distributed computer system. As communications and networking technologies have evolved in capability and accessibility, and as the computational bandwidths, data-storage capacities, and other capabilities and capacities of various types of computer systems have steadily and rapidly increased, much of modern computing now generally involves large distributed systems and computers interconnected by local networks, wide-area networks, wireless communications, and the Internet. FIG. 2 shows a typical distributed system in which many PCs 202-205, a high-end distributed mainframe system 210 with a large data-storage system 212, and a large computer center 214 with large numbers of rack-mounted server computers or blade servers all interconnected through various communications and networking systems that together comprise the Internet 216. Such distributed computing systems provide diverse arrays of functionalities. For example, a PC user may access hundreds of millions of different web sites provided by hundreds of thousands of different web servers throughout the world and may access high-computational-bandwidth computing services from remote computer facilities for running complex computational tasks.

Until recently, computational services were generally provided by computer systems and data centers purchased, configured, managed, and maintained by service-provider organizations. For example, an e-commerce retailer generally purchased, configured, managed, and maintained a data center including numerous web server computers, back-end computer systems, and data-storage systems for serving web pages to remote customers, receiving orders through the web-page interface, processing the orders, tracking completed orders, and other myriad different tasks associated with an e-commerce enterprise.

Figure 3:
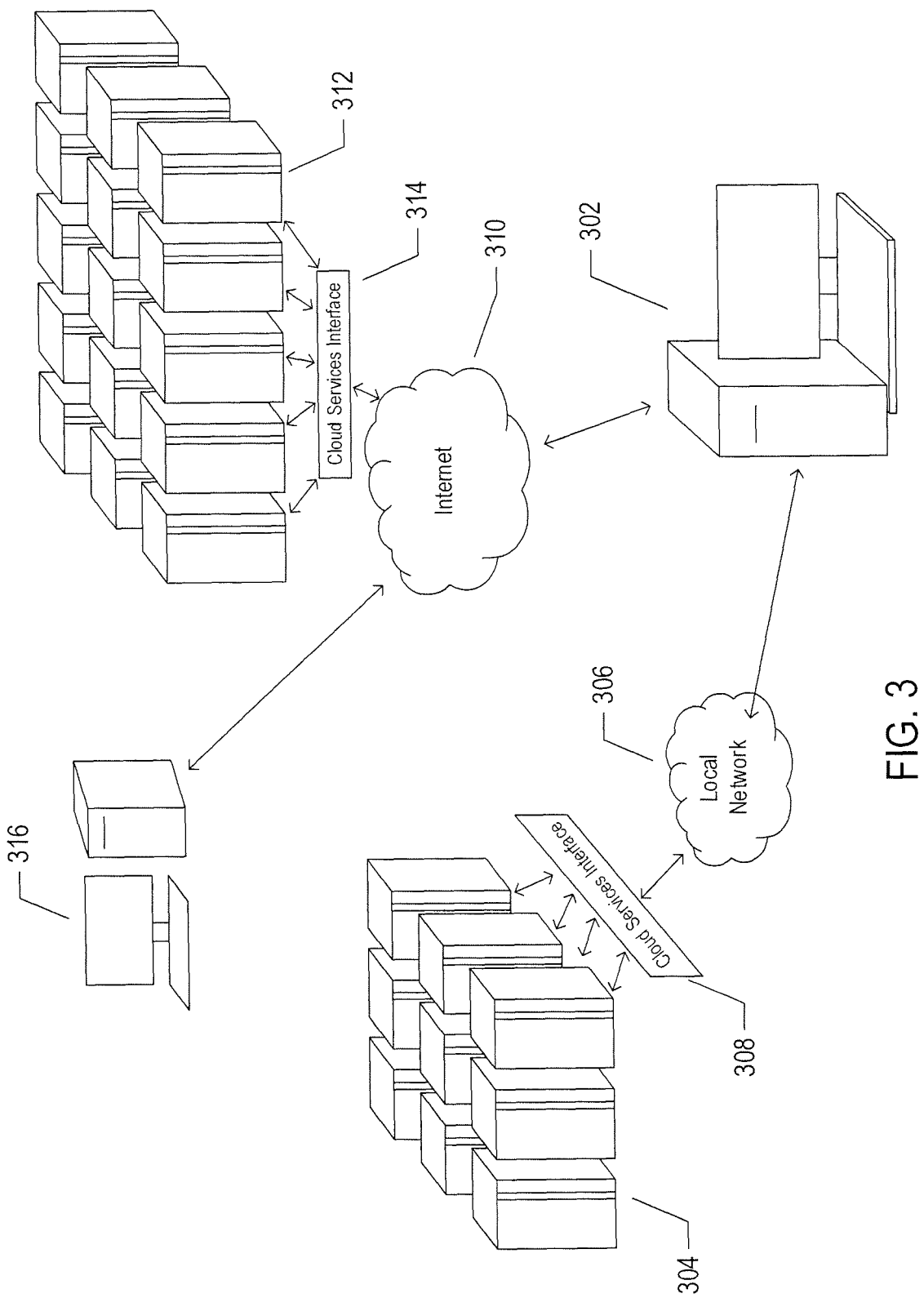
FIG. 3 shows cloud computing.

FIG. 3 shows cloud computing. In the recently developed cloud-computing paradigm, computing cycles and data-storage facilities are provided to organizations and individuals by cloud-computing providers. In addition, larger organizations may elect to establish private cloud-computing facilities in addition to, or instead of, subscribing to computing services provided by public cloud-computing service providers. In FIG. 3, a system administrator for an organization, using a PC 302, accesses the organization's private cloud 304 through a local network 306 and private-cloud interface 308 and accesses, through the Internet 310, a public cloud 312 through a public-cloud services interface 314. The administrator can, in either the case of the private cloud 304 or public cloud 312, configure virtual computer systems and even entire virtual data centers and launch execution of application programs on the virtual computer systems and virtual data centers in order to carry out any of many different types of computational tasks. As one example, a small organization may configure and run a virtual data center within a public cloud that executes web servers to provide an e-commerce interface through the public cloud to remote customers of the organization, such as a user viewing the organization's e-commerce web pages on a remote user system 316.

Cloud-computing facilities are intended to provide computational bandwidth and data-storage services much as utility companies provide electrical power and water to consumers. Cloud computing provides enormous advantages to small organizations without the devices to purchase, manage, and maintain in-house data centers. Such organizations can dynamically add and delete virtual computer systems from their virtual data centers within public clouds in order to track computational-bandwidth and data-storage needs, rather than purchasing sufficient computer systems within a physical data center to handle peak computational-bandwidth and data-storage demands. Moreover, small organizations can completely avoid the overhead of maintaining and managing physical computer systems, including hiring and periodically retraining information-technology specialists and continuously paying for operating-system and database-management-system upgrades. Furthermore, cloud-computing interfaces allow for easy and straightforward configuration of virtual computing facilities, flexibility in the types of applications and operating systems that can be configured, and other functionalities that are useful even for owners and administrators of private cloud-computing facilities used by a single organization.

Figure 4:
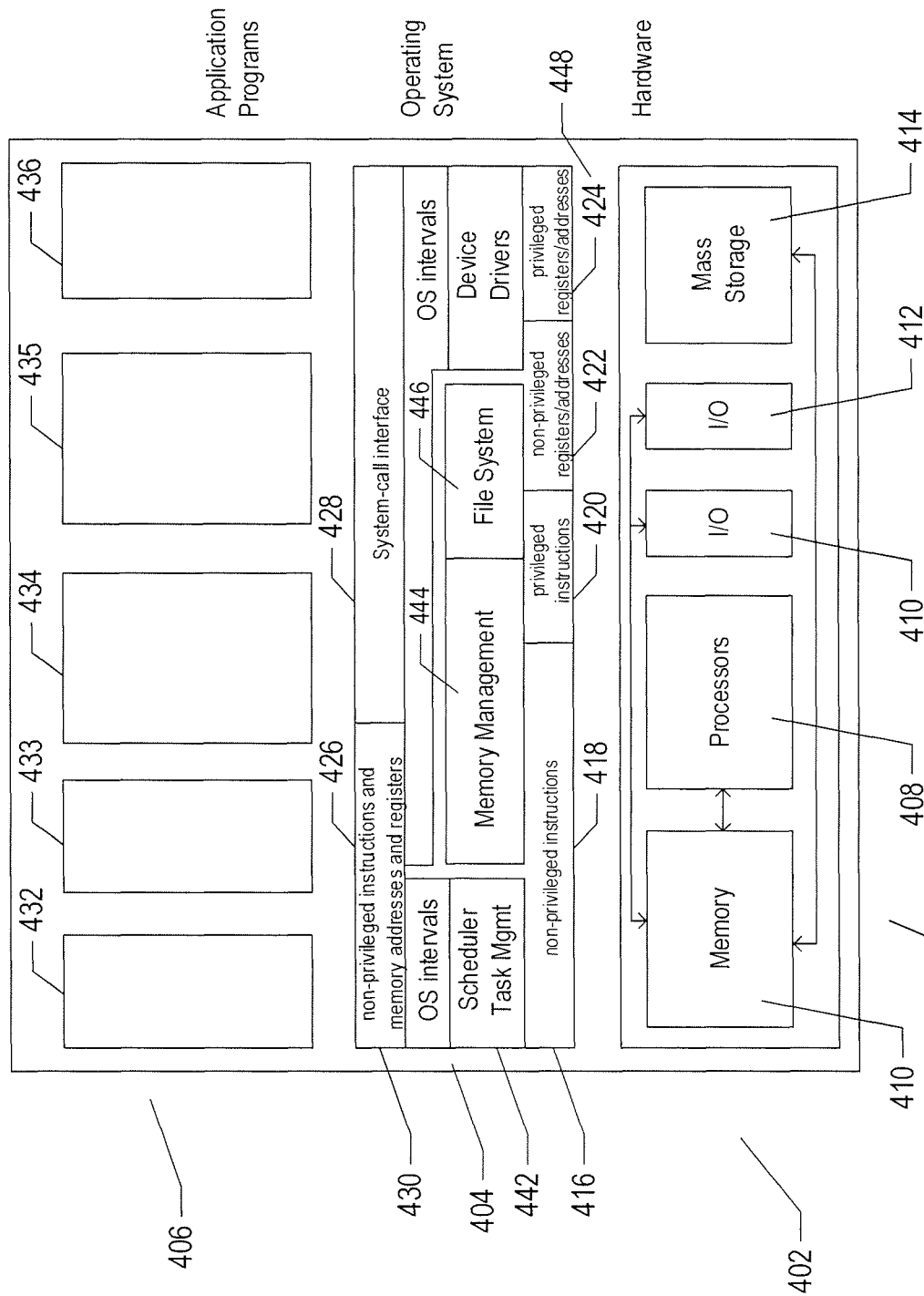
FIG. 4 shows generalized hardware and software components of a general-purpose computer system.

FIG. 4 shows generalized hardware and software components of a general-purpose computer system, such as a general-purpose computer system having an architecture similar to that shown in FIG. 1. The computer system 400 is often considered to include three fundamental layers: (1) a hardware layer or level 402; (2) an operating-system layer or level 404; and (3) an application-program layer or level 406. The hardware layer 402 includes one or more processors 408, system memory 410, different types of input-output ("I/O") devices 410 and 412, and mass-storage devices 414. Of course, the hardware level also includes many other components, including power supplies, internal communications links and busses, specialized integrated circuits, many different types of processor-controlled or microprocessor-controlled peripheral devices and controllers, and many other components. The operating system 404 interfaces to the hardware level 402 through a low-level operating system and hardware interface 416 generally comprising a set of non-privileged computer instructions 418, a set of privileged computer instructions 420, a set of non-privileged registers and memory addresses 422, and a set of privileged registers and memory addresses 424. In general, the operating system exposes non-privileged instructions, non-privileged registers, and non-privileged memory addresses 426 and a system-call interface 428 as an operating-system interface 430 to application programs 432-436 that execute within an execution environment provided to the application programs by the operating system. The operating system, alone, accesses the privileged instructions, privileged registers, and privileged memory addresses. By reserving access to privileged instructions, privileged registers, and privileged memory addresses, the operating system can ensure that application programs and other higher-level computational entities cannot interfere with one another's execution and cannot change the overall state of the computer system in ways that could deleteriously impact system operation. The operating system includes many internal components and modules, including a scheduler 442, memory management 444, a file system 446, device drivers 448, and many other components and modules. To a certain degree, modern operating systems provide numerous levels of abstraction above the hardware level, including virtual memory, which provides to each application program and other computational entities a separate, large, linear memory-address space that is mapped by the operating system to various electronic memories and mass-storage devices. The scheduler orchestrates interleaved execution of different application programs and higher-level computational entities, providing to each application program a virtual, stand-alone system devoted entirely to the application program. From the application program's standpoint, the application program executes continuously without concern for the need to share processor devices and other system devices with other application programs and higher-level computational entities. The device drivers abstract details of hardware-component operation, allowing application programs to employ the system-call interface for transmitting and receiving data to and from communications networks, mass-storage devices, and other I/O devices and subsystems. The file system 446 facilitates abstraction of mass-storage-device and memory devices as a high-level, easy-to-access, file-system interface. Thus, the development and evolution of the operating system has resulted in the generation of a type of multi-faceted virtual execution environment for application programs and other higher-level computational entities.

While the execution environments provided by operating systems have proved to be an enormously successful level of abstraction within computer systems, the operating-system-provided level of abstraction is nonetheless associated with difficulties and challenges for developers and users of application programs and other higher-level computational entities. One difficulty arises from the fact that there are many different operating systems that run within different types of computer hardware. In many cases, popular application programs and computational systems are developed to run on only a subset of the available operating systems and can therefore be executed within only a subset of the different types of computer systems on which the operating systems are designed to run. Often, even when an application program or other computational system is ported to additional operating systems, the application program or other computational system can nonetheless run more efficiently on the operating systems for which the application program or other computational system was originally targeted. Another difficulty arises from the increasingly distributed nature of computer systems. Although distributed operating systems are the subject of considerable research and development efforts, many of the popular operating systems are designed primarily for execution on a single computer system. In many cases, it is difficult to move application programs, in real time, between the different computer systems of a distributed computer system for high-availability, fault-tolerance, and load-balancing purposes. The problems are even greater in heterogeneous distributed computer systems which include different types of hardware and devices running different types of operating systems. Operating systems continue to evolve, as a result of which certain older application programs and other computational entities may be incompatible with more recent versions of operating systems for which they are targeted, creating compatibility issues that are particularly difficult to manage in large distributed systems.

Figure 5A:
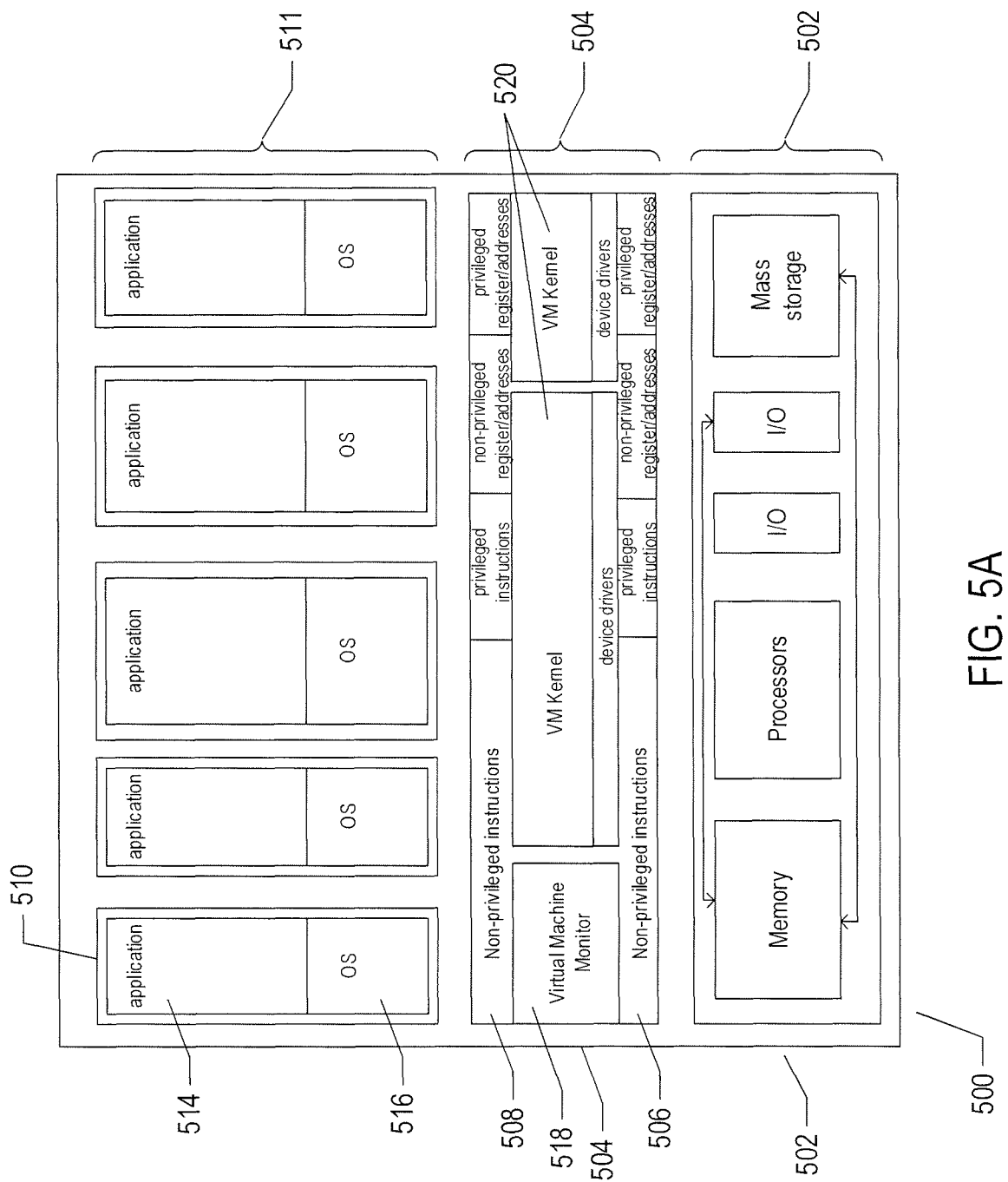
FIGS. 5A-5B show two types of virtual machine ("VM") and VM execution environments.
Figure 5B:
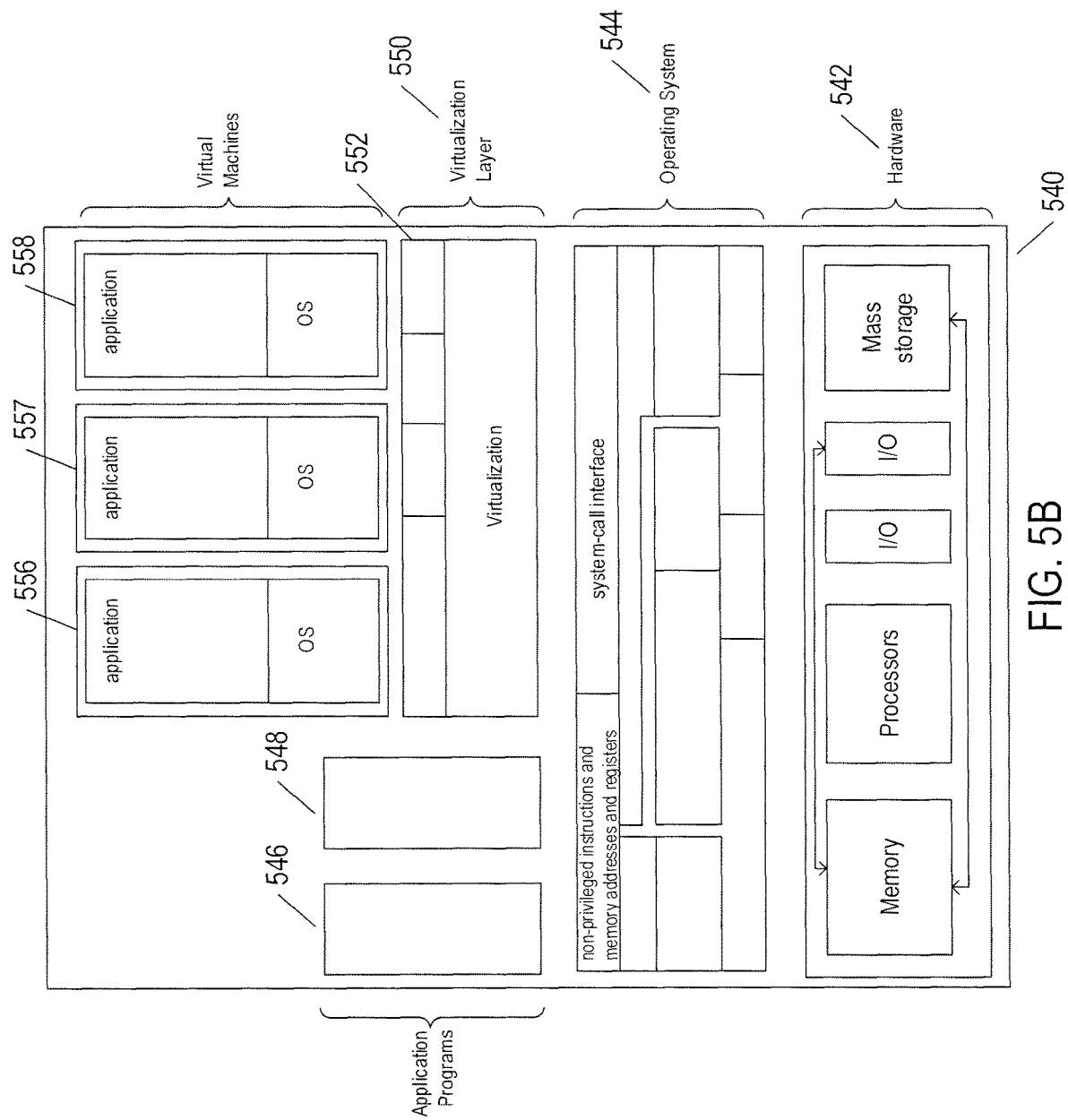

For the above reasons, a higher level of abstraction, referred to as the "virtual machine," ("VM") has been developed and evolved to further abstract computer hardware in order to address many difficulties and challenges associated with traditional computing systems, including the compatibility issues discussed above. FIGS. 5A-B show two types of VM and virtual-machine execution environments. FIGS. 5A-B use the same illustration conventions as used in FIG. 4. FIG. 5A shows a first type of virtualization. The computer system 500 in FIG. 5A includes the same hardware layer 502 as the hardware layer 402 shown in FIG. 4. However, rather than providing an operating system layer directly above the hardware layer, as in FIG. 4, the virtualized computing environment shown in FIG. 5A features a virtualization layer 504 that interfaces through a virtualization-layer/hardware-layer interface 506, equivalent to interface 416 in FIG. 4, to the hardware. The virtualization layer 504 provides a hardware-like interface to VMs, such as VM 510, in a virtual-machine layer 511 executing above the virtualization layer 504. Each VM includes one or more application programs or other higher-level computational entities packaged together with an operating system, referred to as a "guest operating system," such as application 514 and guest operating system 516 packaged together within VM 510. Each VM is thus equivalent to the operating-system layer 404 and application-program layer 406 in the general-purpose computer system shown in FIG. 4. Each guest operating system within a VM interfaces to the virtualization layer interface 504 rather than to the actual hardware interface 506. The virtualization layer 504 partitions hardware devices into abstract virtual-hardware layers to which each guest operating system within a VM interfaces. The guest operating systems within the VMs, in general, are unaware of the virtualization layer and operate as if they were directly accessing a true hardware interface. The virtualization layer 504 ensures that each of the VMs currently executing within the virtual environment receive a fair allocation of underlying hardware devices and that all VMs receive sufficient devices to progress in execution. The virtualization layer 504 may differ for different guest operating systems. For example, the virtualization layer is generally able to provide virtual hardware interfaces for a variety of different types of computer hardware. This allows, as one example, a VM that includes a guest operating system designed for a particular computer architecture to run on hardware of a different architecture. The number of VMs need not be equal to the number of physical processors or even a multiple of the number of processors.

The virtualization layer 504 includes a virtual-machine-monitor module 518 ("VMM") that virtualizes physical processors in the hardware layer to create virtual processors on which each of the VMs executes. For execution efficiency, the virtualization layer attempts to allow VMs to directly execute non-privileged instructions and to directly access non-privileged registers and memory. However, when the guest operating system within a VM accesses virtual privileged instructions, virtual privileged registers, and virtual privileged memory through the virtualization layer 504, the accesses result in execution of virtualization-layer code to simulate or emulate the privileged devices. The virtualization layer additionally includes a kernel module 520 that manages memory, communications, and data-storage machine devices on behalf of executing VMs ("VM kernel"). The VM kernel, for example, maintains shadow page tables on each VM so that hardware-level virtual-memory facilities can be used to process memory accesses. The VM kernel additionally includes routines that implement virtual communications and data-storage devices as well as device drivers that directly control the operation of underlying hardware communications and data-storage devices. Similarly, the VM kernel virtualizes various other types of I/O devices, including keyboards, optical-disk drives, and other such devices. The virtualization layer 504 essentially schedules execution of VMs much like an operating system schedules execution of application programs, so that the VMs each execute within a complete and fully functional virtual hardware layer.

FIG. 5B shows a second type of virtualization. In FIG. 5B, the computer system 540 includes the same hardware layer 542 and operating system layer 544 as the hardware layer 402 and the operating system layer 404 shown in FIG. 4. Several application programs 546 and 548 are shown running in the execution environment provided by the operating system 544. In addition, a virtualization layer 550 is also provided, in computer 540, but, unlike the virtualization layer 504 discussed with reference to FIG. 5A, virtualization layer 550 is layered above the operating system 544, referred to as the "host OS," and uses the operating system interface to access operating-system-provided functionality as well as the hardware. The virtualization layer 550 comprises primarily a VMM and a hardware-like interface 552, similar to hardware-like interface 508 in FIG. 5A. The hardware-layer interface 552, equivalent to interface 416 in FIG. 4, provides an execution environment VMs 556-558, each including one or more application programs or other higher-level computational entities packaged together with a guest operating system.

In FIGS. 5A-5B, the layers are somewhat simplified for clarity of illustration. For example, portions of the virtualization layer 550 may reside within the host-operating-system kernel, such as a specialized driver incorporated into the host operating system to facilitate hardware access by the virtualization layer.

It should be noted that virtual hardware layers, virtualization layers, and guest operating systems are all physical entities that are implemented by computer instructions stored in physical data-storage devices, including electronic memories, mass-storage devices, optical disks, magnetic disks, and other such devices. The term "virtual" does not, in any way, imply that virtual hardware layers, virtualization layers, and guest operating systems are abstract or intangible. Virtual hardware layers, virtualization layers, and guest operating systems execute on physical processors of physical computer systems and control operation of the physical computer systems, including operations that alter the physical states of physical devices, including electronic memories and mass-storage devices. They are as physical and tangible as any other component of a computer since, such as power supplies, controllers, processors, busses, and data-storage devices.

Figure 6:
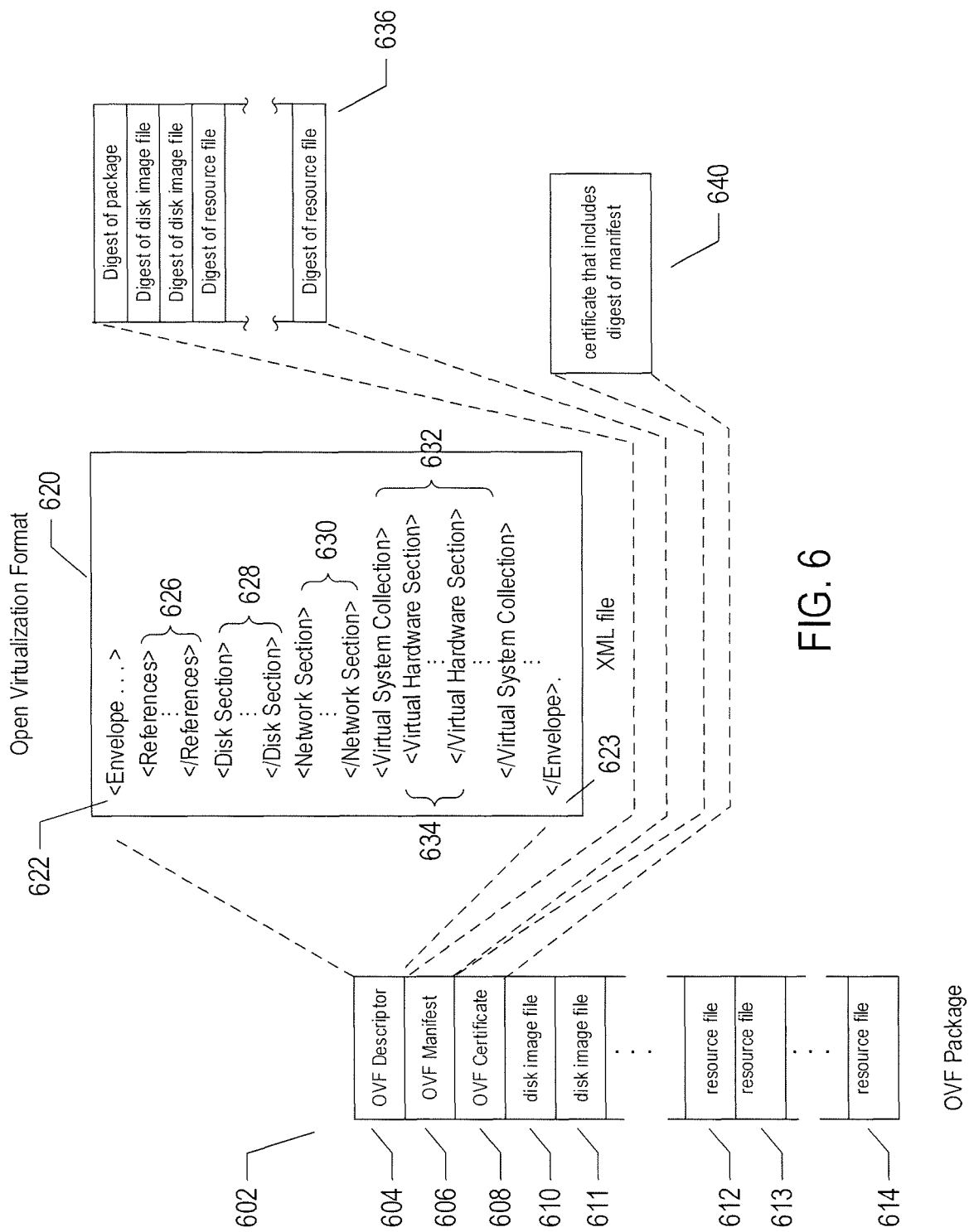
FIG. 6 shows an example of an open virtualization format package.

A VM or virtual application, described below, is encapsulated within a data package for transmission, distribution, and loading into a virtual-execution environment. One public standard for virtual-machine encapsulation is referred to as the "open virtualization format" ("OVF"). The OVF standard specifies a format for digitally encoding a VM within one or more data files. FIG. 6 shows an OVF package. An OVF package 602 includes an OVF descriptor 604, an OVF manifest 606, an OVF certificate 608, one or more disk-image files 610-611, and one or more device files 612-614. The OVF package can be encoded and stored as a single file or as a set of files. The OVF descriptor 604 is an XML document 620 that includes a hierarchical set of elements, each demarcated by a beginning tag and an ending tag. The outermost, or highest-level, element is the envelope element, demarcated by tags 622 and 623. The next-level element includes a reference element 626 that includes references to all files that are part of the OVF package, a disk section 628 that contains meta information about all of the virtual disks included in the OVF package, a network section 630 that includes meta information about all of the logical networks included in the OVF package, and a collection of virtual-machine configurations 632 which further includes hardware descriptions of each VM 634. There are many additional hierarchical levels and elements within a typical OVF descriptor. The OVF descriptor is thus a self-describing, XML file that describes the contents of an OVF package. The OVF manifest 606 is a list of cryptographic-hash-function-generated digests 636 of the entire OVF package and of the various components of the OVF package. The OVF certificate 608 is an authentication certificate 640 that includes a digest of the manifest and that is cryptographically signed. Disk image files, such as disk image file 610, are digital encodings of the contents of virtual disks and device files 612 are digitally encoded content, such as operating-system images. A VM or a collection of VMs encapsulated together within a virtual application can thus be digitally encoded as one or more files within an OVF package that can be transmitted, distributed, and loaded using well-known tools for transmitting, distributing, and loading files. A virtual appliance is a software service that is delivered as a complete software stack installed within one or more VMs that is encoded within an OVF package.

The advent of VMs and virtual environments has alleviated many of the difficulties and challenges associated with traditional general-purpose computing. Machine and operating-system dependencies can be significantly reduced or eliminated by packaging applications and operating systems together as VMs and virtual appliances that execute within virtual environments provided by virtualization layers running on many different types of computer hardware. A next level of abstraction, referred to as virtual data centers or virtual infrastructure, provide a data-center interface to virtual data centers computationally constructed within physical data centers.

Figure 7:
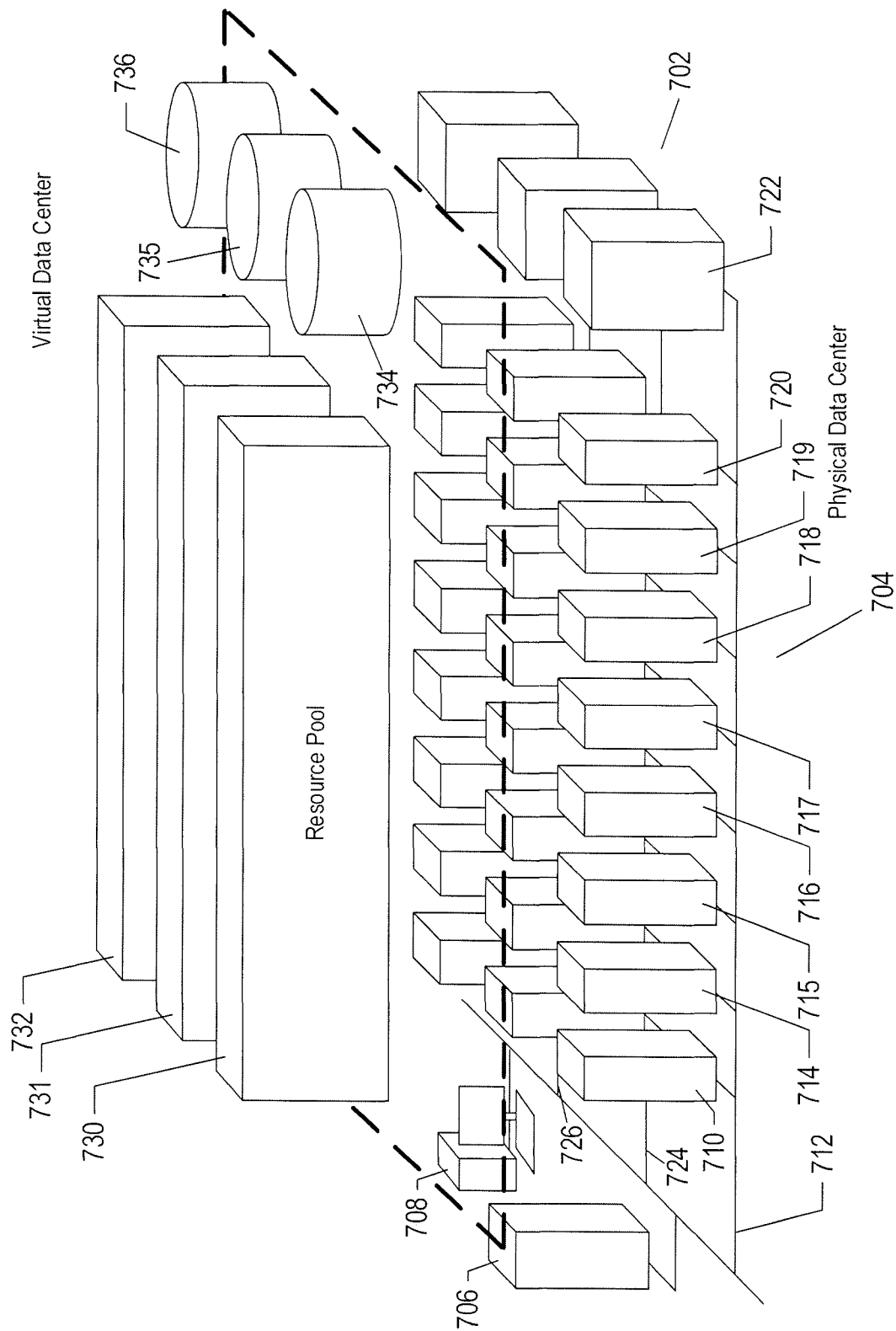
FIG. 7 shows virtual data centers provided as an abstraction of underlying physical-data-center hardware components.

FIG. 7 shows virtual data centers provided as an abstraction of underlying physical-data-center hardware components. In FIG. 7, a physical data center 702 is shown below a virtual-interface plane 704. The physical data center consists of a virtual-data-center management server computer 706 and any of different computers, such as PC 708, on which a virtual-data-center management interface may be displayed to system administrators and other users. The physical data center additionally includes generally large numbers of server computers, such as server computer 710, that are coupled together by local area networks, such as local area network 712 that directly interconnects server computer 710 and 714-720 and a mass-storage array 722. The physical data center shown in FIG. 7 includes three local area networks 712, 724, and 726 that each directly interconnects a bank of eight server computers and a mass-storage array. The individual server computers, such as server computer 710, each includes a virtualization layer and runs multiple VMs. Different physical data centers may include many different types of computers, networks, data-storage systems and devices connected according to many different types of connection topologies. The virtual-interface plane 704, a logical abstraction layer shown by a plane in FIG. 7, abstracts the physical data center to a virtual data center comprising one or more device pools, such as device pools 730-732, one or more virtual data stores, such as virtual data stores 734-736, and one or more virtual networks. In certain implementations, the device pools abstract banks of server computers directly interconnected by a local area network.

The virtual-data-center management interface allows provisioning and launching of VMs with respect to device pools, virtual data stores, and virtual networks, so that virtual-data-center administrators need not be concerned with the identities of physical-data-center components used to execute particular VMs. Furthermore, the virtual-data-center management server computer 706 includes functionality to migrate running VMs from one server computer to another in order to optimally or near optimally manage device allocation, provides fault tolerance, and high availability by migrating VMs to most effectively utilize underlying physical hardware devices, to replace VMs disabled by physical hardware problems and failures, and to ensure that multiple VMs supporting a high-availability virtual appliance are executing on multiple physical computer systems so that the services provided by the virtual appliance are continuously accessible, even when one of the multiple virtual appliances becomes compute bound, data-access bound, suspends execution, or fails. Thus, the virtual data center layer of abstraction provides a virtual-data-center abstraction of physical data centers to simplify provisioning, launching, and maintenance of VMs and virtual appliances as well as to provide high-level, distributed functionalities that involve pooling the devices of individual server computers and migrating VMs among server computers to achieve load balancing, fault tolerance, and high availability.

Figure 8:
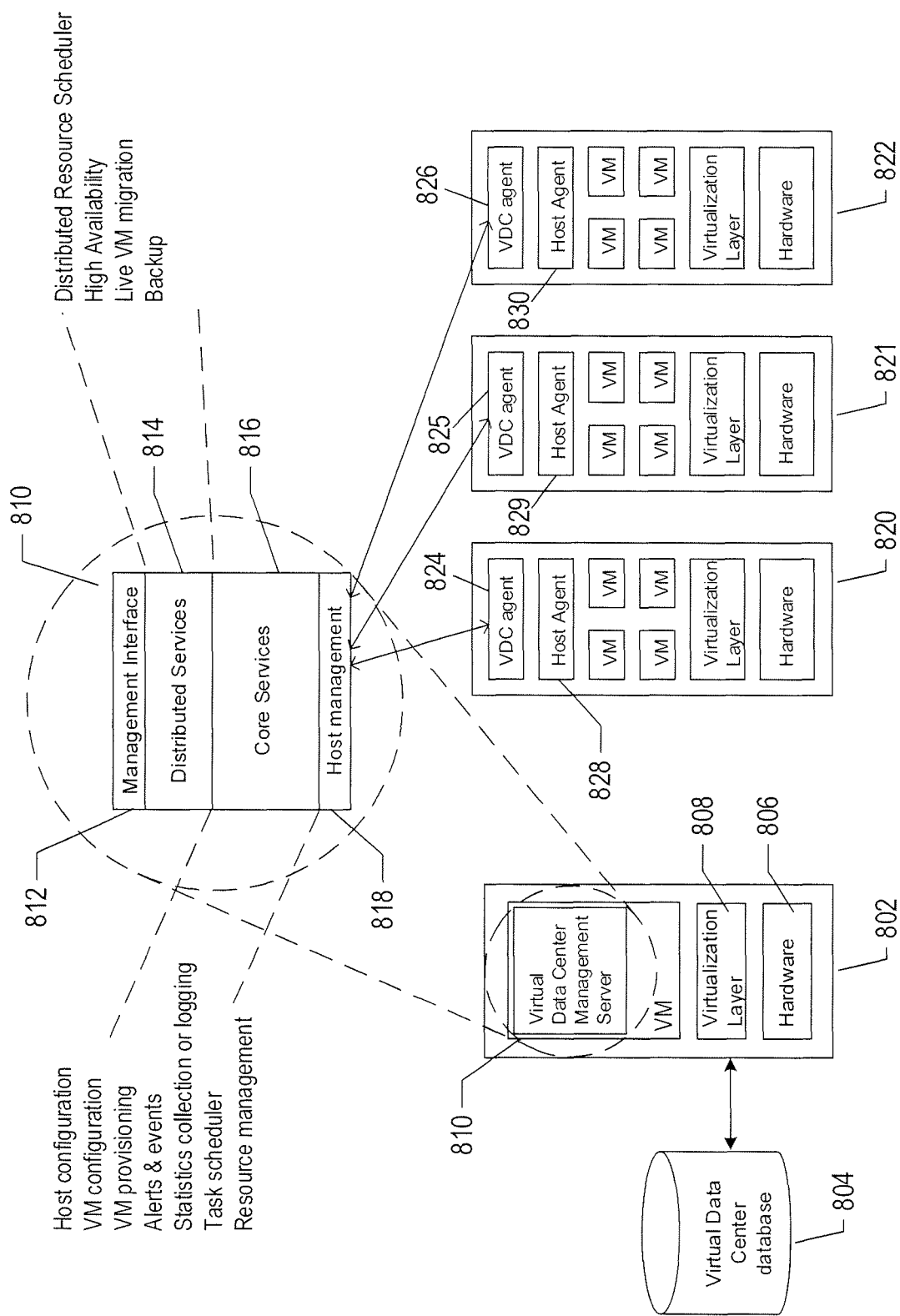
FIG. 8 shows virtual-machine components of a virtual-data-center management server and physical servers of a physical data center.

FIG. 8 shows virtual-machine components of a virtual-data-center management server computer and physical server computers of a physical data center above which a virtual-data-center interface is provided by the virtual-data-center management server computer. The virtual-data-center management server computer 802 and a virtual-data-center database 804 comprise the physical components of the management component of the virtual data center. The virtual-data-center management server computer 802 includes a hardware layer 806 and virtualization layer 808 and runs a virtual-data-center management-server VM 810 above the virtualization layer. Although shown as a single server computer in FIG. 8, the virtual-data-center management server computer ("VDC management server") may include two or more physical server computers that support multiple VDC-management-server virtual appliances. The virtual-data-center management-server VM 810 includes a management-interface component 812, distributed services 814, core services 816, and a host-management interface 818. The host-management interface 818 is accessed from any of various computers, such as the PC 708 shown in FIG. 7. The host-management interface 818 allows the virtual-data-center administrator to configure a virtual data center, provision VMs, collect statistics and view log files for the virtual data center, and to carry out other, similar management tasks. The host-management interface 818 interfaces to virtual-data-center agents 824, 825, and 826 that execute as VMs within each of the server computers of the physical data center that is abstracted to a virtual data center by the VDC management server computer.

The distributed services 814 include a distributed-device scheduler that assigns VMs to execute within particular physical server computers and that migrates VMs in order to most effectively make use of computational bandwidths, data-storage capacities, and network capacities of the physical data center. The distributed services 814 further include a high-availability service that replicates and migrates VMs in order to ensure that VMs continue to execute despite problems and failures experienced by physical hardware components. The distributed services 814 also include a live-virtual-machine migration service that temporarily halts execution of a VM, encapsulates the VM in an OVF package, transmits the OVF package to a different physical server computer, and restarts the VM on the different physical server computer from a virtual-machine state recorded when execution of the VM was halted. The distributed services 814 also include a distributed backup service that provides centralized virtual-machine backup and restore.

The core services 816 provided by the VDC management server VM 810 include host configuration, virtual-machine configuration, virtual-machine provisioning, generation of virtual-data-center alerts and events, ongoing event logging and statistics collection, a task scheduler, and a device-management module. Each physical server computers 820-822 also includes a host-agent VM 828-830 through which the virtualization layer can be accessed via a virtual-infrastructure application programming interface ("API"). This interface allows a remote administrator or user to manage an individual server computer through the infrastructure API. The virtual-data-center agents 824-826 access virtualization-layer server information through the host agents. The virtual-data-center agents are primarily responsible for off-loading certain of the virtual-data-center management-server functions specific to a particular physical server to that physical server computer. The virtual-data-center agents relay and enforce device allocations made by the VDC management server VM 810, relay virtual-machine provisioning and configuration-change commands to host agents, monitor and collect performance statistics, alerts, and events communicated to the virtual-data-center agents by the local host agents through the interface API, and to carry out other, similar virtual-data-management tasks.

The virtual-data-center abstraction provides a convenient and efficient level of abstraction for exposing the computational devices of a cloud-computing facility to cloud-computing-infrastructure users. A cloud-director management server exposes virtual devices of a cloud-computing facility to cloud-computing-infrastructure users. In addition, the cloud director introduces a multi-tenancy layer of abstraction, which partitions VDCs into tenant-associated VDCs that can each be allocated to a particular individual tenant or tenant organization, both referred to as a "tenant." A given tenant can be provided one or more tenant-associated VDCs by a cloud director managing the multi-tenancy layer of abstraction within a cloud-computing facility. The cloud services interface (308 in FIG. 3) exposes a virtual-data-center management interface that abstracts the physical data center.

Figure 9:
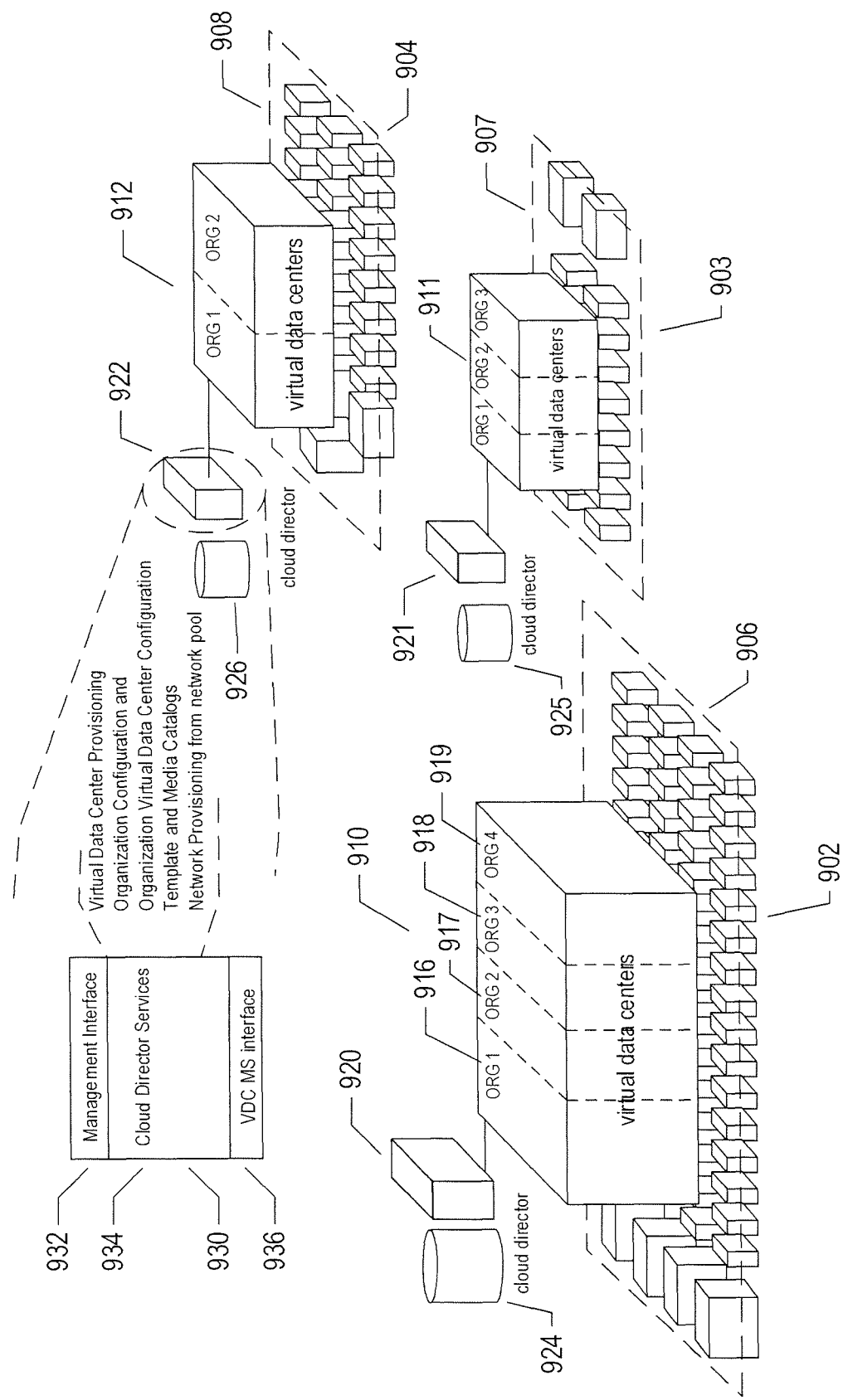
FIG. 9 shows a cloud-director level of abstraction.

FIG. 9 shows a cloud-director level of abstraction. In FIG. 9, three different physical data centers 902-904 are shown below planes representing the cloud-director layer of abstraction 906-908. Above the planes representing the cloud-director level of abstraction, multi-tenant virtual data centers 910-912 are shown. The devices of these multi-tenant virtual data centers are securely partitioned in order to provide secure virtual data centers to multiple tenants, or cloud-services-accessing organizations. For example, a cloud-services-provider virtual data center 910 is partitioned into four different tenant-associated virtual-data centers within a multi-tenant virtual data center for four different tenants 916-919. Each multi-tenant virtual data center is managed by a cloud director comprising one or more cloud-director server computers 920-922 and associated cloud-director databases 924-926. Each cloud-director server computer or server computers runs a cloud-director virtual appliance 930 that includes a cloud-director management interface 932, a set of cloud-director services 934, and a virtual-data-center management-server interface 936. The cloud-director services include an interface and tools for provisioning multi-tenant virtual data center virtual data centers on behalf of tenants, tools and interfaces for configuring and managing tenant organizations, tools and services for organization of virtual data centers and tenant-associated virtual data centers within the multi-tenant virtual data center, services associated with template and media catalogs, and provisioning of virtualization networks from a network pool. Templates are VMs that each contains an OS and/or one or more VMs containing applications. A template may include much of the detailed contents of VMs and virtual appliances that are encoded within OVF packages, so that the task of configuring a VM or virtual appliance is significantly simplified, requiring only deployment of one OVF package. These templates are stored in catalogs within a tenant's virtual-data center. These catalogs are used for developing and staging new virtual appliances and published catalogs are used for sharing templates in virtual appliances across organizations. Catalogs may include OS images and other information relevant to construction, distribution, and provisioning of virtual appliances.

Considering FIGS. 7 and 9, the VDC-server and cloud-director layers of abstraction can be seen, as discussed above, to facilitate employment of the virtual-data-center concept within private and public clouds. However, this level of abstraction does not fully facilitate aggregation of single-tenant and multi-tenant virtual data centers into heterogeneous or homogeneous aggregations of cloud-computing facilities.

Figure 10:
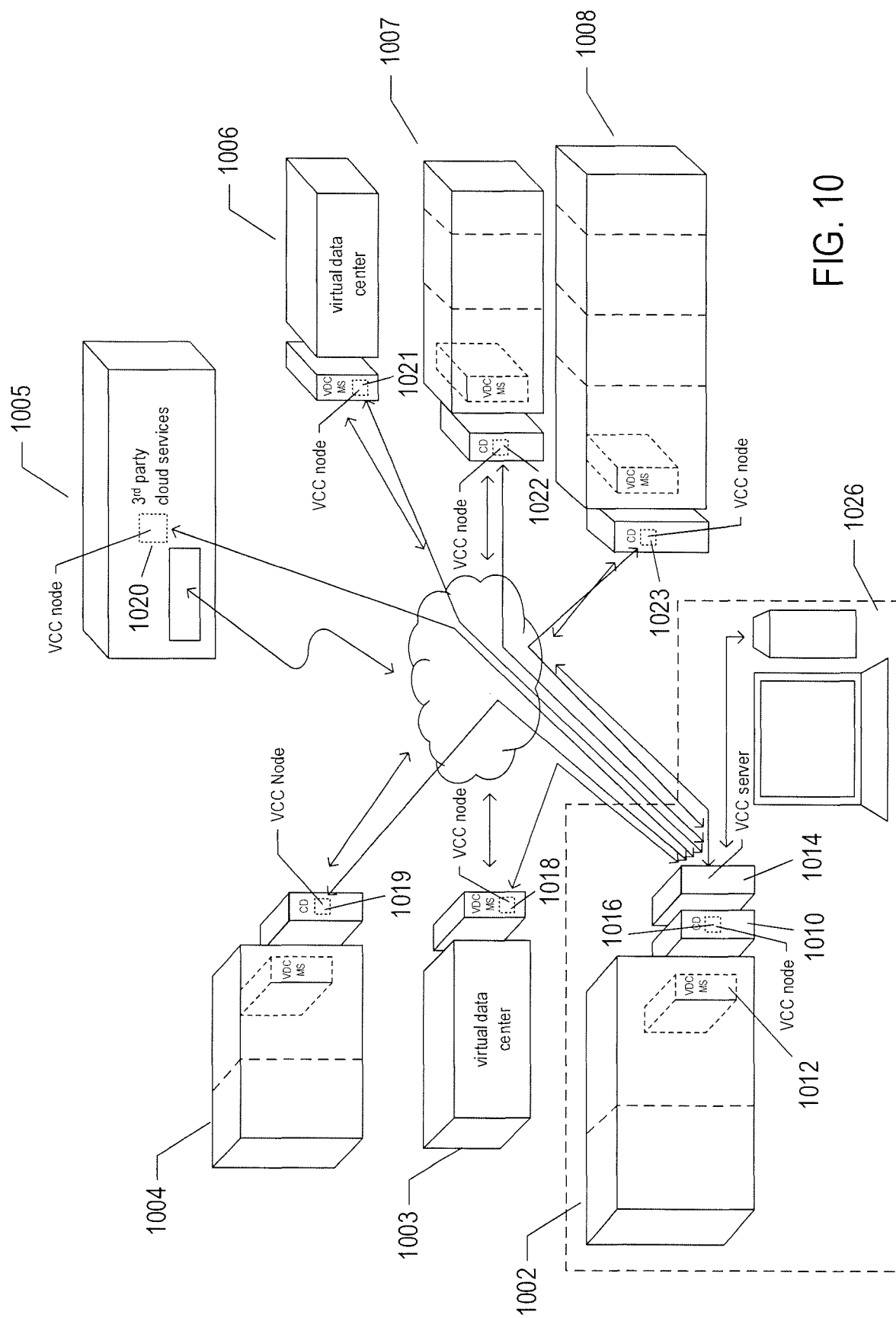
FIG. 10 shows virtual-cloud-connector nodes.

FIG. 10 shows virtual-cloud-connector nodes ("VCC nodes") and a VCC server, components of a distributed system that provides multi-cloud aggregation and that includes a cloud-connector server and cloud-connector nodes that cooperate to provide services that are distributed across multiple clouds. VMware vCloud™ VCC servers and nodes are one example of VCC server and nodes. In FIG. 10, seven different cloud-computing facilities are shown 1002-1008. Cloud-computing facility 1002 is a private multi-tenant cloud with a cloud director 1010 that interfaces to a VDC management server 1012 to provide a multi-tenant private cloud comprising multiple tenant-associated virtual data centers. The remaining cloud-computing facilities 1003-1008 may be either public or private cloud-computing facilities and may be single-tenant virtual data centers, such as virtual data centers 1003 and 1006, multi-tenant virtual data centers, such as multi-tenant virtual data centers 1004 and 1007-1008, or any of various different kinds of third-party cloud-services facilities, such as third-party cloud-services facility 1005. An additional component, the VCC server 1014, acting as a controller is included in the private cloud-computing facility 1002 and interfaces to a VCC node 1016 that runs as a virtual appliance within the cloud director 1010. A VCC server may also run as a virtual appliance within a VDC management server that manages a single-tenant private cloud. The VCC server 1014 additionally interfaces, through the Internet, to VCC node virtual appliances executing within remote VDC management servers, remote cloud directors, or within the third-party cloud services 1018-1023. The VCC server provides a VCC server interface that can be displayed on a local or remote terminal, PC, or other computer system 1026 to allow a cloud-aggregation administrator or other user to access VCC-server-provided aggregate-cloud distributed services. In general, the cloud-computing facilities that together form a multiple-cloud-computing aggregation through distributed services provided by the VCC server and VCC nodes are geographically and operationally distinct.

As mentioned above, while the virtual-machine-based virtualization layers, described in the previous subsection, have received widespread adoption and use in a variety of different environments, from personal computers to enormous distributed computing systems, traditional virtualization technologies are associated with computational overheads. While these computational overheads have steadily decreased, over the years, and often represent ten percent or less of the total computational bandwidth consumed by an application running above a guest operating system in a virtualized environment, traditional virtualization technologies nonetheless involve computational costs in return for the power and flexibility that they provide.

While a traditional virtualization layer can simulate the hardware interface expected by any of many different operating systems, OSL virtualization essentially provides a secure partition of the execution environment provided by a particular operating system for use by containers. A container is a software package that uses virtual isolation to deploy and run one or more applications that access a shared operating system kernel. Containers isolate components of the host used to run the one or more applications. The components include files, environment variables, dependencies, and libraries. The host OS constrains container access to physical resources, such as CPU, memory and data storage, preventing a single container from using all of a host's physical resources. As one example, OSL virtualization provides a file system to each container, but the file system provided to the container is essentially a view of a partition of the general file system provided by the underlying operating system of the host. In essence, OSL virtualization uses operating-system features, such as namespace isolation, to isolate each container from the other containers running on the same host. In other words, namespace isolation ensures that each application is executed within the execution environment provided by a container to be isolated from applications executing within the execution environments provided by the other containers. A container cannot access files not included the container's namespace and cannot interact with applications running in other containers. As a result, a container can be booted up much faster than a VM, because the container uses operating-system-kernel features that are already available and functioning within the host. Furthermore, the containers share computational bandwidth, memory, network bandwidth, and other computational resources provided by the operating system, without the overhead associated with computational resources allocated to VMs and virtualization layers. Again, however, OSL virtualization does not provide many desirable features of traditional virtualization. As mentioned above, OSL virtualization does not provide a way to run different types of operating systems for different groups of containers within the same host and OSL-virtualization does not provide for live migration of containers between hosts, high-availability functionality, distributed resource scheduling, and other computational functionality provided by traditional virtualization technologies.

Figure 11:
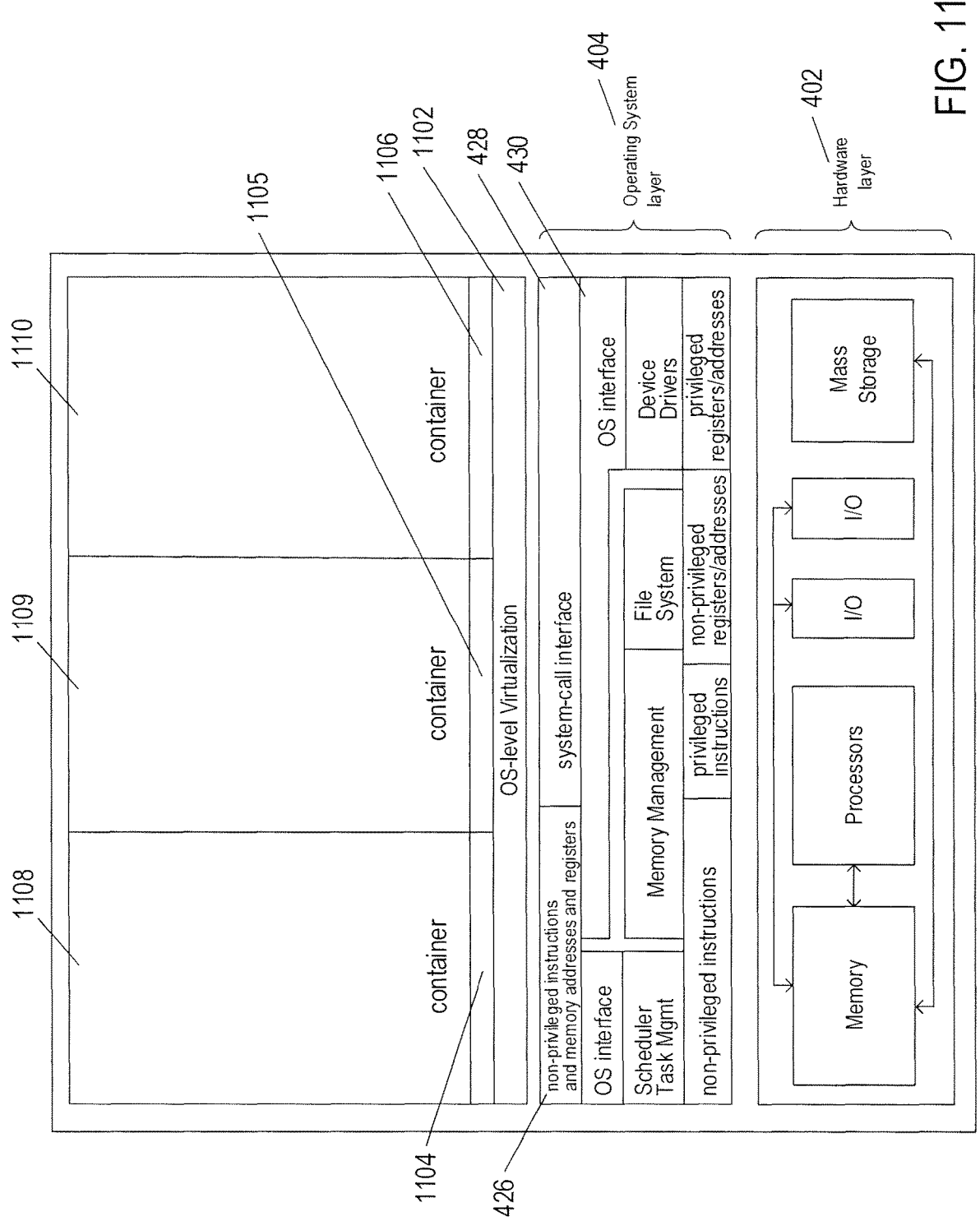
FIG. 11 shows an example server computer used to host three containers.

FIG. 11 shows an example server computer used to host three containers. As discussed above with reference to FIG. 4, an operating system layer 404 runs above the hardware 402 of the host computer. The operating system provides an interface, for higher-level computational entities, that includes a system-call interface 428 and the non-privileged instructions, memory addresses, and registers 426 provided by the hardware layer 402. However, unlike in FIG. 4, in which applications run directly above the operating system layer 404, OSL virtualization involves an OSL virtualization layer 1102 that provides operating-system interfaces 1104-1106 to each of the containers 1108-1110. The containers, in turn, provide an execution environment for an application that runs within the execution environment provided by container 1108. The container can be thought of as a partition of the resources generally available to higher-level computational entities through the operating system interface 430.

Figure 12:
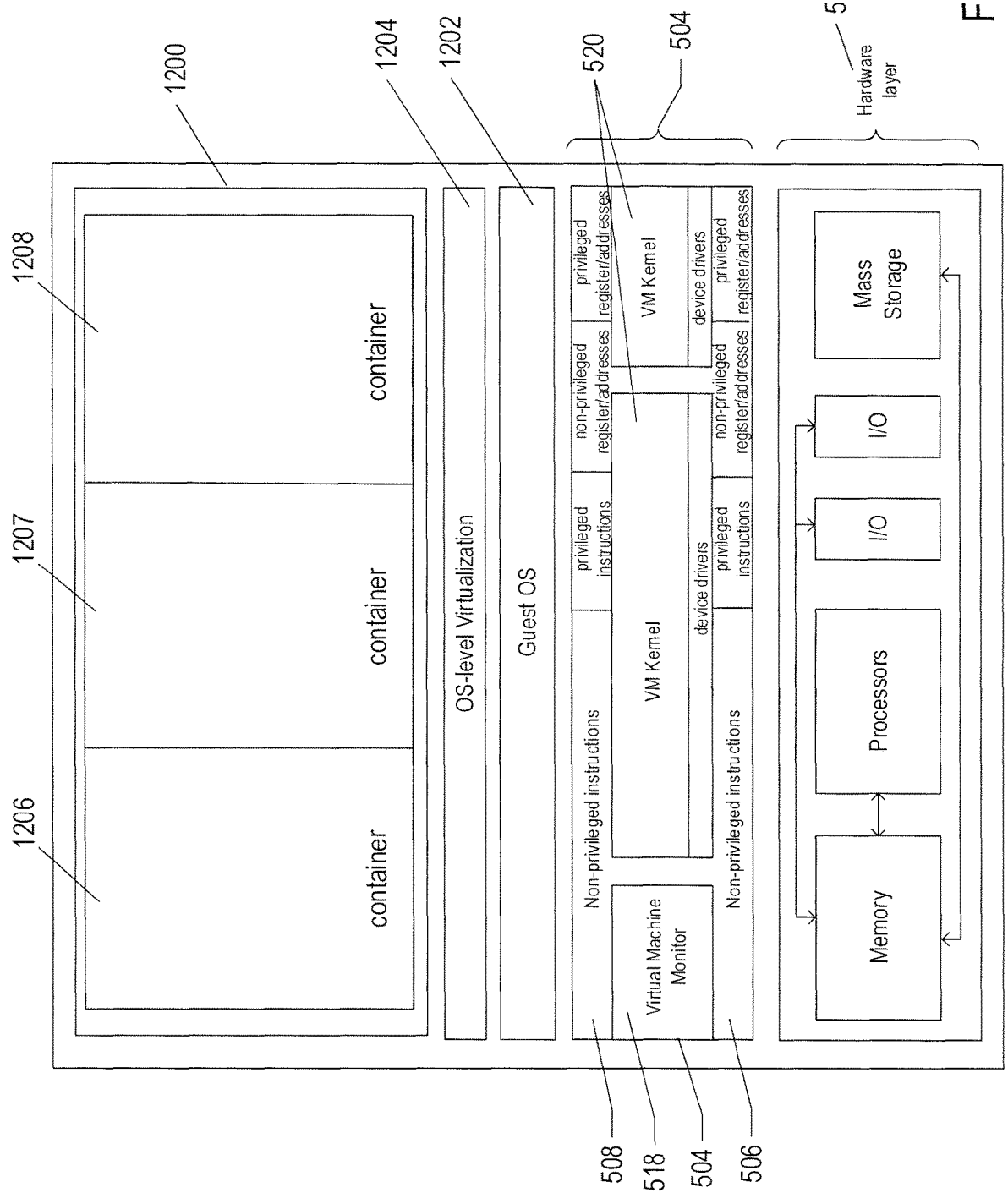
FIG. 12 shows an approach to implementing containers on a VM.

FIG. 12 shows an approach to implementing the containers on a VM. FIG. 12 shows a host computer similar to the host computer shown in FIG. 5A, discussed above. The host computer includes a hardware layer 502 and a virtualization layer 504 that provides a virtual hardware interface 508 to a guest operating system 1102. Unlike in FIG. 5A, the guest operating system interfaces to an OSL-virtualization layer 1104 that provides container execution environments 1206-1208 to multiple application programs.

Although only a single guest operating system and OSL virtualization layer are shown in FIG. 12, a single virtualized host system can run multiple different guest operating systems within multiple VMs, each of which supports one or more OSL-virtualization containers. A virtualized, distributed computing system that uses guest operating systems running within VMs to support OSL-virtualization layers to provide containers for running applications is referred to, in the following discussion, as a "hybrid virtualized distributed computing system."

Running containers above a guest operating system within a VM provides advantages of traditional virtualization in addition to the advantages of OSL virtualization. Containers can be quickly booted in order to provide additional execution environments and associated resources for additional application instances. The resources available to the guest operating system are efficiently partitioned among the containers provided by the OSL-virtualization layer 1204 in FIG. 12, because there is almost no additional computational overhead associated with container-based partitioning of computational resources. However, many of the powerful and flexible features of the traditional virtualization technology can be applied to VMs in which containers run above guest operating systems, including live migration from one host to another, various types of high-availability and distributed resource scheduling, and other such features. Containers provide share-based allocation of computational resources to groups of applications with guaranteed isolation of applications in one container from applications in the remaining containers executing above a guest operating system. Moreover, resource allocation can be modified at run time between containers. The traditional virtualization layer provides for flexible and scaling over large numbers of hosts within large distributed computing systems and a simple approach to operating-system upgrades and patches. Thus, the use of OSL virtualization above traditional virtualization in a hybrid virtualized distributed computing system, as shown in FIG. 12, provides many of the advantages of both a traditional virtualization layer and the advantages of OSL virtualization.

Figure 13:
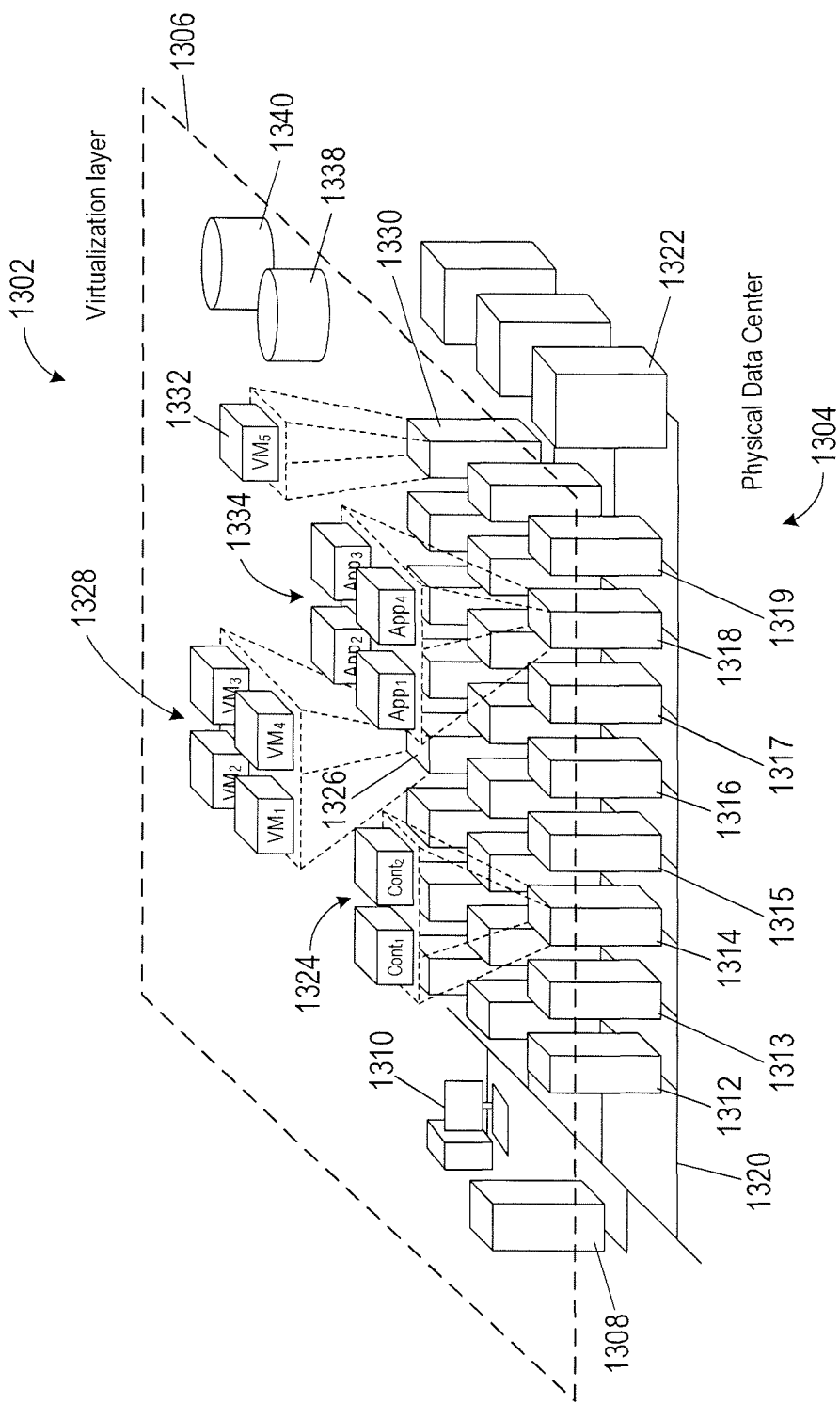
FIG. 13 shows an example of a virtualization layer located above a physical data center.

Automated Processes and Systems for Detecting Abnormally Behaving Objects of a Distributed Computing System FIG. 13 shows an example of a virtualization layer 1302 located above a physical data center 1304. For the sake of illustration, the virtualization layer 1302 is separated from the physical data center 1304 by a virtual-interface plane 1306. The physical data center 1304 is an example of a distributed computing system. The physical data center 1304 comprises physical objects, including a management server computer 1308, any of various computers, such as PC 1310, on which a virtual-data-center ("VDC") management interface may be displayed to system administrators and other users, server computers, such as server computers 1312-1319, data-storage devices, and network devices. The server computers may be networked together to form area networks within the data center 1904. The example physical data center 1304 includes three networks that each directly interconnects a bank of eight server computers and a mass-storage array. For example, network 1320 interconnects server computers 1312-1319 and a mass-storage array 1322. Different physical data centers may include many different types of computers, networks, data-storage systems and devices connected according to many different types of connection topologies. The virtualization layer 1302 includes virtual objects, such as VMs, applications, and containers, hosted by the server computers in the physical data center 1304. The virtualization layer 1302 may also include a virtual network (not illustrated) of virtual switches, routers, load balancers, and network interface cards formed from the physical switches, routers, and network interface cards of the physical data center 1304. Certain server computers host VMs and containers as described above. For example, server computer 1314 hosts two containers 1324, server computer 1326 hosts four VMs 1328, and server computer 1330 hosts a VM 1332. Other server computers may host applications as described above with reference to FIG. 4. For example, server computer 1318 hosts four applications 1334. The virtual-interface plane 1306 abstracts the resources of the physical data center 1304 to one or more VDCs comprising the virtual objects and one or more virtual data stores, such as virtual data stores 1338 and 1340. For example, one VDC may comprise VMs 1328 and virtual data store 1338.

In the following discussion, the term "object" refers to a physical object or a virtual object, such as a server computer, network device, application, VM, virtual network device, container, or any other physical or virtual object of a distributed computing system for which metric data can be collected to evaluate abnormal or normal behavior of the object. The term "resource" refers to a physical resource of a distributed computing system, such as, but are not limited to, a processor, a core, memory, a network connection, network interface, data-storage device, a mass-storage device, a switch, a router, and other any other component of the physical data center 1304. Resources of a server computer and clusters of server computers may form a resource pool for creating virtual resources of a virtual infrastructure used to run virtual objects. The term "resource" may also refer to a virtual resource, which may have been formed from physical resources used by a virtual object. For example, a resource may be a virtual processor formed from one or more cores of a multicore processor, virtual memory formed from a portion of physical memory, virtual storage formed from a sector or image of a hard disk drive, a virtual switch, and a virtual router.

Processes and systems described herein are implemented in a monitoring server that monitors objects of a distributed computing system by collecting numerous streams of time-dependent metric data associated with numerous physical and virtual resources. Each stream of metric data is time series data that may be generated by a metric source, such as an operating system or an object itself. A stream of metric data associated with a resource comprises a sequence of time-ordered metric values that are recorded in spaced points in time called "time stamps." A stream of metric data is simply called a "metric" and is denoted by $$v = (x_i)_{i=1}^{N_v} = (x(t_i))_{i=1}^{N_v} \qquad (1)$$

where
$N_v$ is the number of metric values in the sequence;
$x_i = x(t_i)$ is a metric value;
$t_i$ is a time stamp indicating when the metric value was recorded in a data-storage device; and
subscript i is a time stamp index $i = 1, \ldots, N_v$.

Figure 14A:
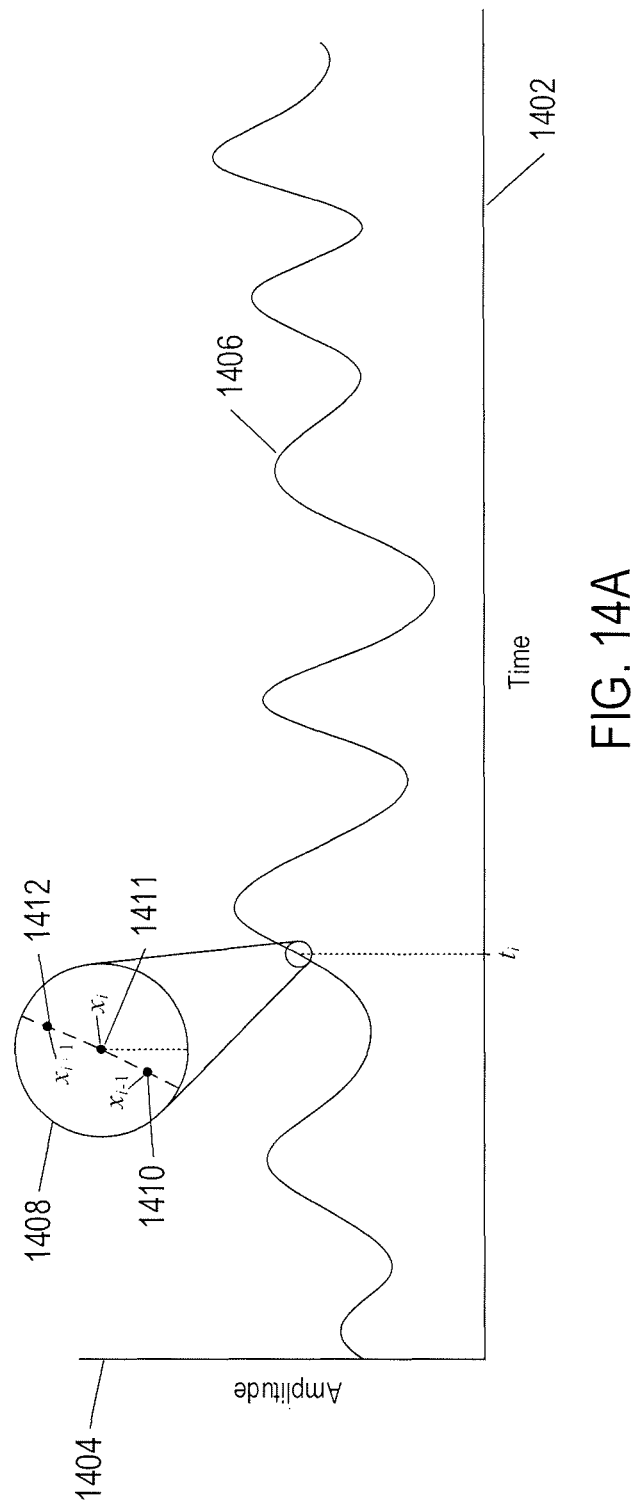
FIG. 14A shows a plot of an example metric represented as a sequence of time series data associated with a resource of a distributed computing system.

FIG. 14A shows a plot of an example metric associated with a resource. Horizontal axis 1402 represents time. Vertical axis 1404 represents a range of metric value amplitudes. Curve 1406 represents a metric as time series data. In practice, a metric comprises a sequence of discrete metric values in which each metric value is recorded in a data-storage device. FIG. 14 includes a magnified view 1408 of three consecutive metric values represented by points. Each point represents an amplitude of the metric at a corresponding time stamp. For example, points 1410-1412 represent three consecutive metric values (i.e., amplitudes) $x_{i-1}$, $x_i$, and $x_{i+1}$ recorded in a data-storage device at corresponding time stamps $t_{i-1}$, $t_i$, and $t_{i+1}$. The example metric may represent usage of a physical or virtual resource. For example, the metric may represent CPU usage of a core in a multicore processor of a server computer over time. The metric may represent the amount of virtual memory a VM uses over time. The metric may represent network throughput for a server computer. Network throughput is the number of bits of data transmitted to and from a physical or virtual object and is recorded in megabits, kilobits, or bits per second. The metric may represent network traffic for a server computer. Network traffic at a physical or virtual object is a count of the number of data packets received and sent per unit of time.

Figure 14B:
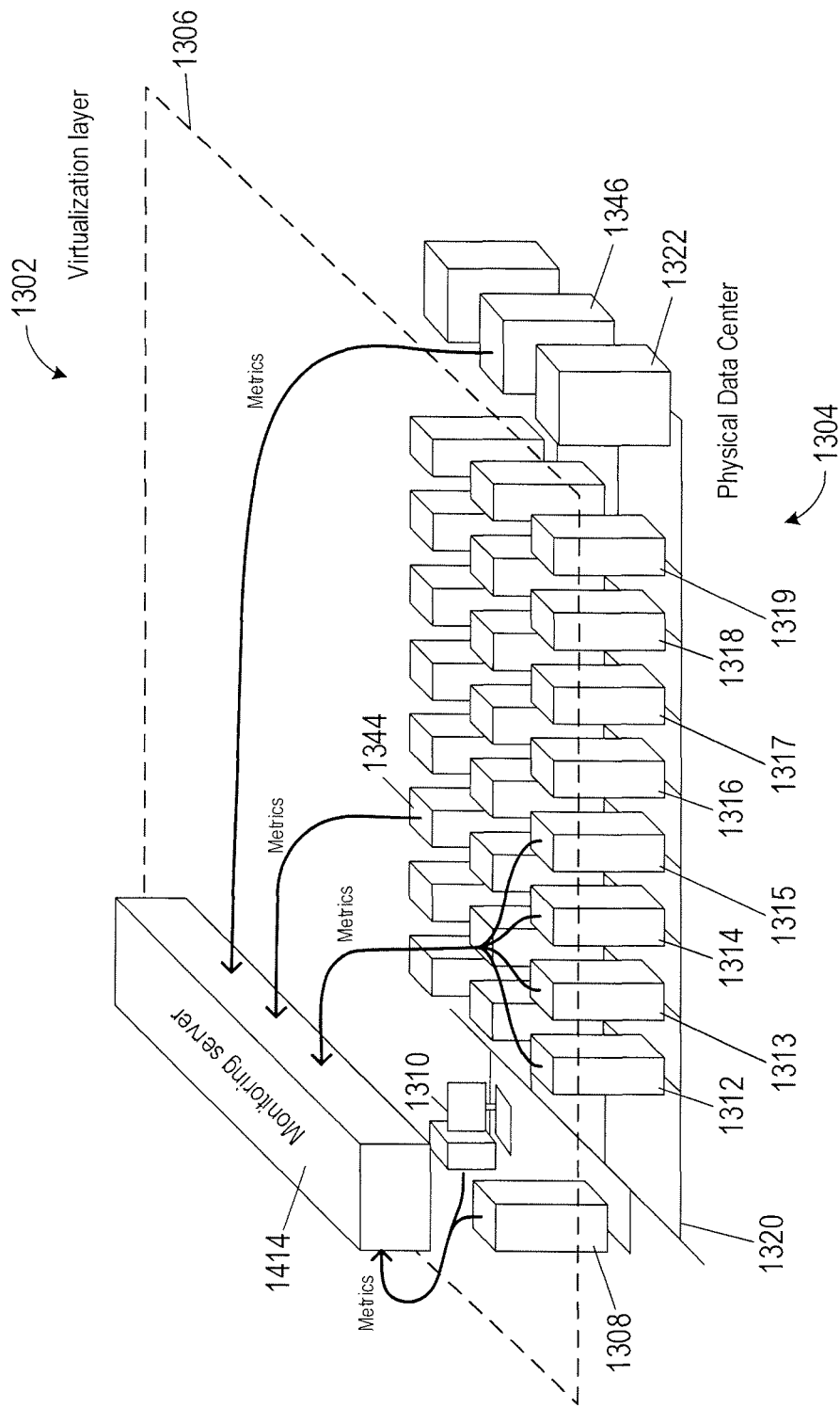
FIGS. 14B-14C show examples of numerous metrics transmitted from physical and virtual objects of a distributed computing system transmitted to a monitoring server.
Figure 14C:
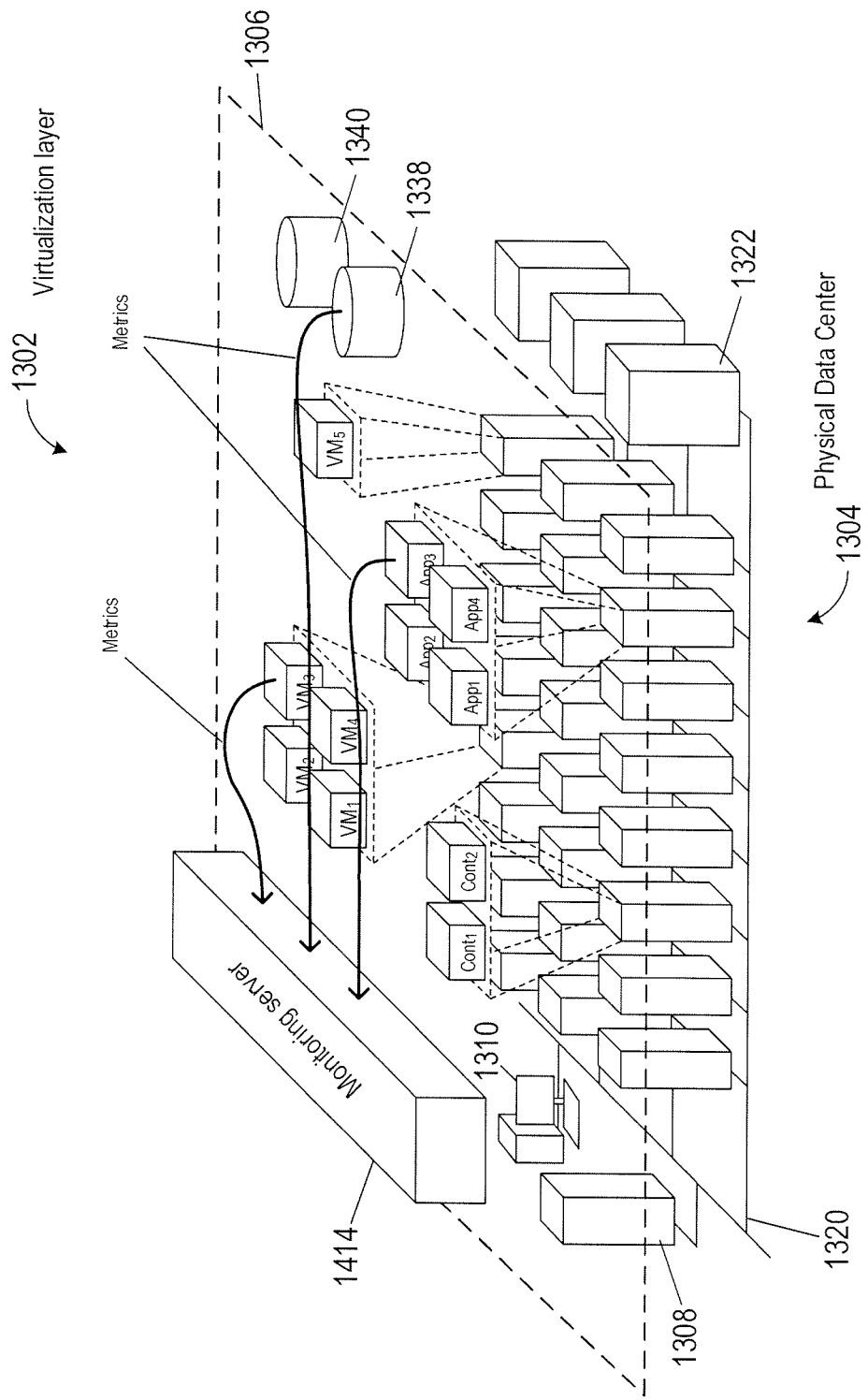

In FIGS. 14B-14C, a monitoring server 1414 collects numerous metrics associated with numerous physical and virtual resources. The monitoring server 1414 may be implemented in a VM to collect and process the metrics, as described below, to identify abnormally behaving objects of the distributed computing system and may generate recommendations to correct abnormally behaving objects or execute remedial measures, such as reconfiguring a virtual network of a VDC or migrating VMs, containers, or applications from one server computer to another. For example, remedial measures may include, but are not limited to, powering down server computers, replacing VMs disabled by physical hardware problems and failures, spinning up cloned VMs on additional server computers to ensure that the services provided by the VMs are accessible to increasing demand for services or when one of the VMs becomes compute or data-access bound. As shown in FIGS. 14B-14C, directional arrows represent metrics sent from physical and virtual resources to the monitoring server 1414. In FIG. 14B, PC 1310, server computers 1308 and 1312-1315, and mass-storage array 1346 send metrics to the monitoring server 1414. Clusters of server computers may also send metrics to the monitoring server 1414. For example, a cluster of server computers 1312-1315 sends metrics to the monitoring server 1414. In FIG. 14C, the operating systems, VMs, containers, applications, and virtual storage may independently send metrics to the monitoring server 1414, depending on when the metrics are generated. For example, certain objects may send time series data of a metric as the data is generated while other objects may only send time series data of a metric at certain times or when requested to send by the monitor server 1414.

The millions of metrics collected and recorded by the monitoring server 1414 contain information that is used to determine, as described below, whether individual objects of the physical data center exhibit abnormal or normal behavior. Each object may have tens to hundreds of associated metrics. A server computer may have numerous metrics that represent usage of each core of a multicore core processor, memory usage, storage usage, network throughput, error rates, datastores, disk usage, average response times, peak response times, thread counts, and power usage, just to name a few. A virtual object, such as a VM, may have hundreds of associated metrics that monitor both physical and virtual resource usage, such as virtual CPU usage, virtual memory usage usage, virtual disk usage, virtual storage space, number of data stores, average and peak response times for various physical and virtual resources of the VM, network throughput, and power usage, just to name a few.

Processes and systems identify metrics associated with an object. The metrics are denoted using set notation as follows:

$$\{v_j\}_{j=1}^{J} = \{(x_i^{(j)})_{i=1}^{N_{v,j}}\}_{j=1}^{J} = \{(x^{(j)}(t_i))_{i=1}^{N_{v,j}}\}_{j=1}^{J} \quad (2)$$

where j is a metric index for the object j=1, ..., J;

$N_{v,j}$ is the number of the metric values in the j-th metric; and

J is an integer number of metrics associated with the object.

Processes and system prepare the metrics by deleting constant and nearly constant metrics, which are not useful in identifying abnormal behavior of the object. Constant or nearly constant metrics may be identified by the magnitude of the standard deviation of each metric over time. The standard deviation is a measure of the amount of variation or degree of variability associated with a metric. A large standard deviation indicates large variability in the metric. A small standard deviation indicates low variability in the metric. The standard deviation is compared to a variability threshold to determine whether the metric has acceptable variation for identification of abnormal or normal behavior of the object.

The standard deviation of a metric may be computed by:

$$\sigma_j = \sqrt{\frac{1}{N_{v,j}} \sum_{i=1}^{N_{v,j}} (x_i^{(j)} - \mu_j)^2} \quad (3a)$$

where the mean of the metric is given by $$\mu_j = \frac{1}{N_{v,j}} \sum_{i=1}^{N_{v,j}} x_i^{(j)} \quad (3b)$$

When the standard deviation $\sigma_j > \varepsilon_{st}$, where $\varepsilon_{st}$ is a variability threshold (e.g., $\varepsilon_{st}=0.01$), the metric $v_j$ is non-constant and is retained. Otherwise, when the standard deviation $\sigma_j \leq \varepsilon_{st}$, the metric $v_j$ is constant and is omitted from consideration of abnormal and normal behavior of the object. Let M be the number of non-constant metrics (i.e., $\sigma_j > \varepsilon_{st}$), where $M \leq J$.

Figure 15A:
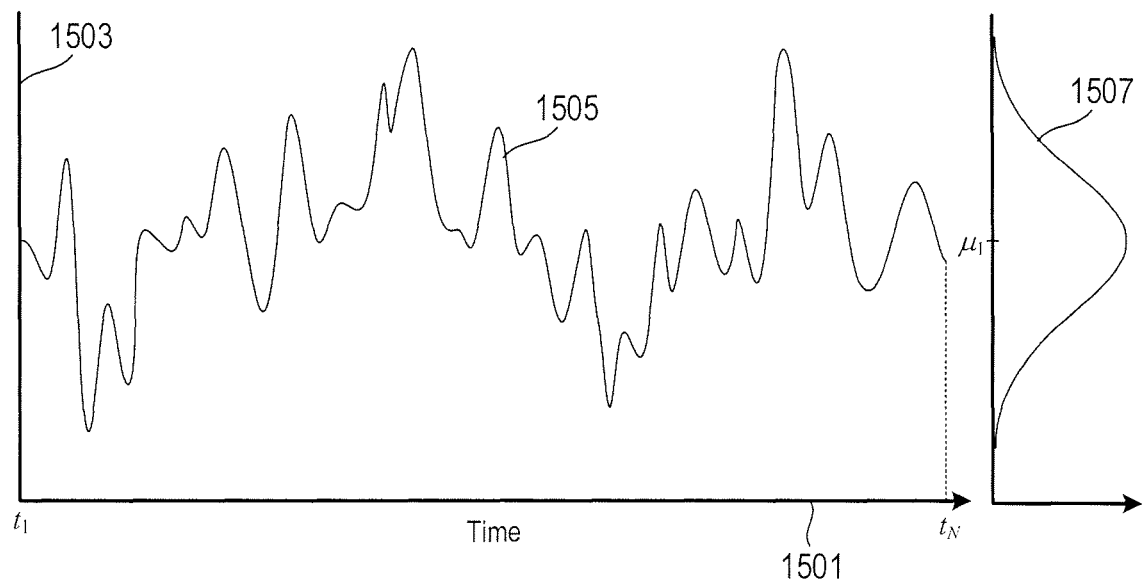
FIGS. 15A-15B show plots example non-constant and constant metrics over time.
Figure 15B:
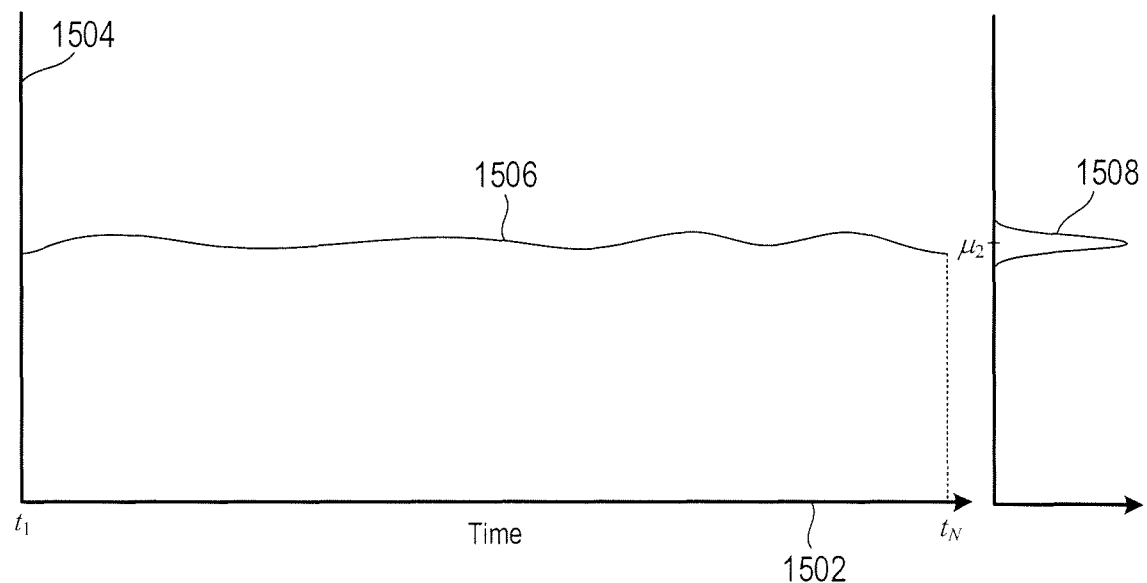

FIGS. 15A-15B show plots of example non-constant and constant metrics over time. Horizontal axes 1501 and 1502 represent time. Vertical axis 1503 represents a range of metric values for a first metric $v_1$. Vertical axis 1504 represents the same range of metric values for a second metric $v_2$. Curve 1505 represents the metric $v_1$ over a time interval between time stamps $t_1$ and $t_N$. Curve 1506 represents the metric $v_2$ over the same time interval. FIG. 15A includes a plot an example first distribution 1507 of the first metric centered about a mean value $\mu_1$. FIG. 15B includes a plot an example second distribution 1508 of the second metric centered about a mean value $\mu_2$. The distributions 1507 and 1508 reveal that the first metric 1505 has a much higher degree of variability than the second metric, which is nearly constant over the time interval.

Because resources associated with an object are varied, the time stamps of the corresponding metrics are typically not synchronized. For example, metric values of certain metrics may be recorded at periodic intervals, but the periodic intervals between metric values may not be the same for all of the metrics. On the other hand, metric values of other metrics may be recorded at nonperiodic intervals and may not be synchronized with respect to the time stamps at which metric values of other metrics are recorded. In certain cases, the monitoring server 1414 may request metric data from metric sources at regular intervals while in other cases, the metric sources may actively send metric data at periodic intervals or, alternatively, whenever metric data becomes available. As a result, the metrics associated with an object are typically not be synchronized.

Figure 16A:
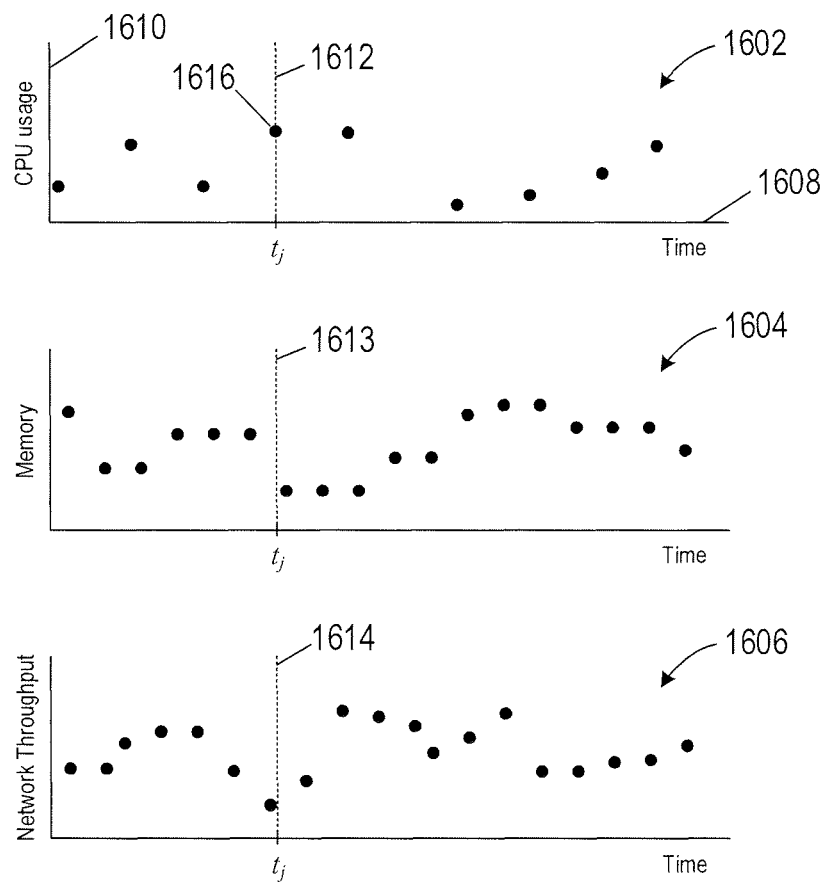
FIG. 16A shows example plots of three synchronized metrics over the same time interval.

FIG. 16A shows example plots of three unsynchronized metrics for CPU usage 1602, memory 1603, and network throughput 1606 for an object recorded in the same time interval. Horizontal axes, such as horizontal axis 1608, represent the length of the time interval. Vertical axes, such as vertical axis 1610, represent ranges of metric values for the CPU, memory, and network throughput. Dots represent metric values recorded at different time stamps in the time interval. CPU metric values are recorded at different periodic intervals than the memory and network throughput metric values. Dashed lines 1612-1614 mark the same time, $t_j$, in the time interval. A metric value 1616 represents CPU usage for the object recorded at time stamp $t_j$. However, the memory and network throughput metrics do not have metric values recorded at the same time stamp $t_j$. In other words, the CPU usage, memory, and network throughput are not synchronized.

For the types of processing carried out by the currently disclosed processes and systems, it is convenient to ensure that the metric values for all metrics used to evaluate normal and abnormal behavior of an object are logically emitted in a periodic manner and that the transmission of metric data is synchronized among the metrics to a general set of uniformly spaced time stamps. Metric values may be synchronized by computing a run-time average of metric values in a sliding time window centered at a time stamp of the general set of uniformly spaced time stamps. In an alternative implementation, the metric values with time stamps in the sliding time window may be smoothed by computing a running time median of metric values in the sliding time window centered at a time stamp of the general set of uniformly spaced time stamps. Processes and systems may also synchronize the metrics by deleting time stamps of missing metric values or interpolating missing metric data at time stamps of the general set of uniformly spaced time stamps using linear, quadratic, or spline interpolation.

Figure 16B:
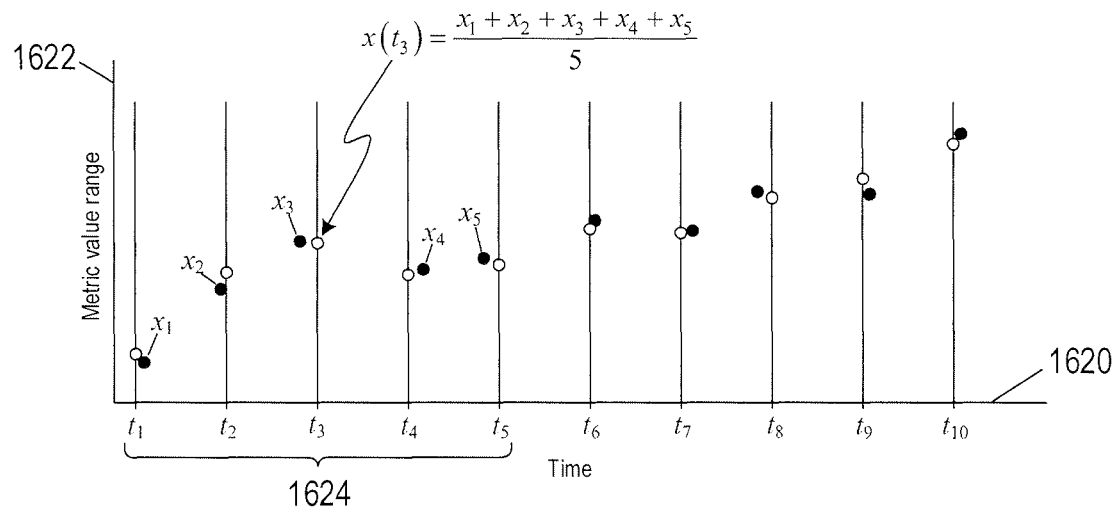
FIG. 16B shows a plot of metric values synchronized to a general set of uniformly spaced time stamps.

FIG. 16B shows a plot of metric values synchronized to a general set of uniformly spaced time stamps. Horizontal axis 1620 represents time. Vertical axis 1622 represents a range of metric values. Solid dots represent metric values recorded at irregularly spaced time stamps. Marks located along time axis 1620 represent time stamps of a general set of uniformly spaced time stamps. Note that the metric values are not aligned with the time stamps of the general set of uniformly spaced time stamps. Open dots represent metric values aligned with the time stamps of the general set of uniformly spaced time stamps. Bracket 1624 represents a sliding time window centered at a time stamp $t_3$ or the general set. The metric values $x_1, x_2, x_3, x_4,$ and $x_5$ have time stamps within the sliding time window 1624 and averaged 1632 to obtain synchronized metric value 1634 at the time stamp $t_3$ of the general set of uniformly spaced time stamps.

The resulting M synchronized and non-constant metrics are denoted in set notation by $$\{u_j\}_{j=1}^{M} = \{(x_i^{(j)})_{i=1}^{N}\}_{j=1}^{M} = \{(x^{(j)}(t_i))_{i=1}^{N}\}_{j=1}^{M} \quad (4)$$

where N is the number of metric values in each of the M synchronized and non-constant metrics.

Processes and systems use the M synchronized and non-constant metrics (i.e., $\{u_j\}_{j=1}^{M}$) to detect previous abnormal behavior of the object over the time interval $[t_1, t_N]$. In other words, the time interval $[t_1, t_N]$ is a historical time window for identifying previous abnormal behavior of the object as described below.

Processes and systems use a principal-component-analysis ("PCA") technique to transform the metrics $\{u_j\}_{j=1}^{M}$ over the historical time window into M sets of parameters called "principal components." Each principal component has an associated variance. The variances are used to rank order the principle components with the first (i.e., highest ranked) principal component having the largest variance and each succeeding principal component having a next largest variance with the constraint that the principal component is orthogonal in an M-dimensional space to the higher ranked principal components. The resulting principal components are an uncorrelated orthogonal basis in the M-dimensional space. The PCA technique applied to the metrics $\{u_j\}_{j=1}^{M}$ is described below with reference to FIGS. 17-31.

The PCA technique may be regarded as fitting an M-dimensional ellipsoid to the metrics $\{u_j\}_{j=1}^{M}$. Each axis of the ellipsoid contains parameters of a principal component. The lengths of the ellipsoid axes correspond to the variances of the M principal components. For example, a short axis of the ellipsoid indicates a small variance in the direction of the short axis. By comparison, a long axis of the ellipsoid indicates a large variance in the direction of the long axis. The dimensionality of the ellipsoid may be reduced by discarding the principal components along the shortest axes, leaving higher variance principal components.

The PCA technique subtracts the average of each metric from the metric values of the metric, which centers the M metrics at the origin of an M-dimensional space. The PCA technique may use a covariance matrix when the metrics have similar scales and stable variances or a correlation matrix when the metrics do not have similar scales and may have unstable variances.

The metrics $\{u_j\}_{j=1}^{M}$ are arranged to form a metric-data matrix denoted by X in which each column of the metric values of one metrics arranged in time order according to time stamps. Each metric has a corresponding coordinate axis in an M-dimensional space. Each row of the metric-data matrix X is an M-tuple represented by a point in the M-dimensional space.

Figures 17, 18:
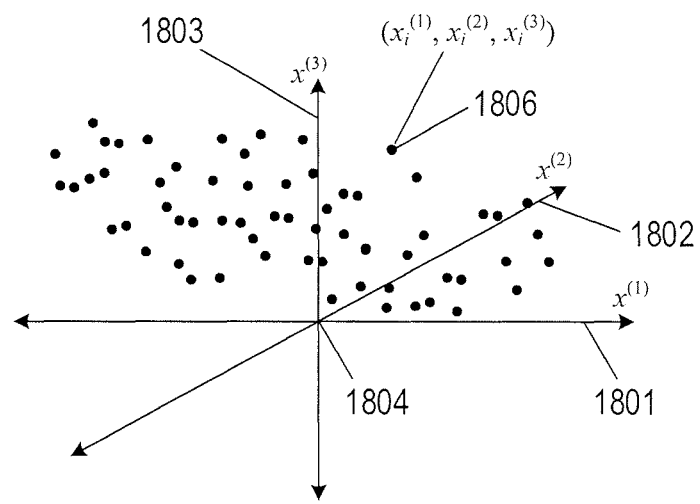
FIG. 17 shows an example metric-data matrix formed from metrics.
FIG. 18 shows an example plot of three metrics in a three-dimensional space.

FIG. 17 shows an example metric-data matrix X 1700 formed from the metrics $\{u_j\}_{j=1}^{M}$. Each column of the metric-data matrix X 1700 comprises a time-ordered sequence of N metric values of one of the M metrics. For example, column 1702 comprises the metric $u_1 = (x_i^{(1)})_{i=1}^{N}$ and column 1704 comprises the metric $u_2 = (x_i^{(2)})_{i=1}^{N}$. Each row of the metric-data matrix X 1700 comprises metric values with the same synchronized time stamp and corresponds to an M-tuple represented by a point in an M-dimensional space. For example, metric values $x_1^{(1)}, x_1^{(2)}, x_1^{(3)}, \ldots, x_1^{(M)}$ 1706 have the same time stamp $t_1$ and correspond to an M-tuple, $(x_1^{(1)}, x_1^{(2)}, \ldots, x_1^{(M)})$, a point in an M-dimensional state.

FIG. 18 shows an example plot of three metrics in a three-dimensional space. Directional arrows 1801-1803 represent three orthogonal coordinate axes, denoted by $x^{(1)}$, $x^{(2)}$, and $x^{(3)}$, that correspond to the three metrics and intersect at an origin 1804. Each axis corresponds to one or three metrics. Each point represents a three-tuple of metric values of the three metrics. The metric values of each three-tuple have the same time stamp and correspond to a row of a metric-data matrix formed from three metrics. For example, point 1806 represents a three-tuple $(x_i^{(1)}, x_i^{(2)}, x_i^{(3)})$ of metric values of the three different metrics with the same time stamp $t_i$ and corresponds to the i-th row of the metric-data matrix.

The PCA technique translates the metrics $\{u_j\}_{j=1}^{M}$ to the origin of the M-dimensional space. For each metric, the mean of the metric values is subtracted from the metric values to obtain a mean-centered metric given by:

$$\bar{u}_j = (\bar{x}_i^{(j)})_{i=1}^{N} = (x_i^{(j)} - \mu_j)_{i=1}^{N} \qquad (5)$$

where the overbar denotes mean centered.

Figures 19, 20:
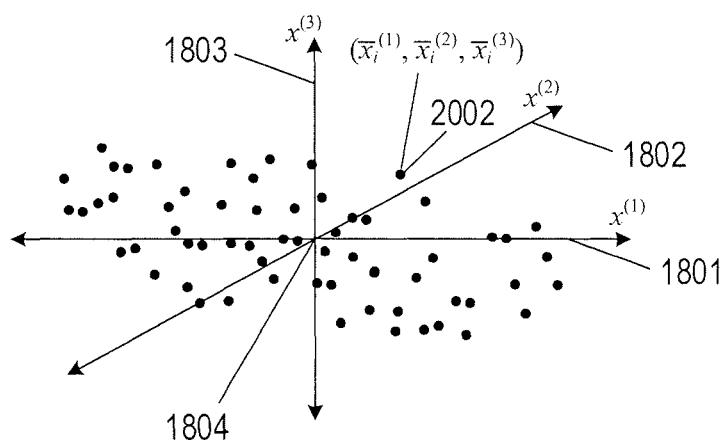
FIG. 19 shows an example mean-centered metric-data matrix formed from mean-centered metrics.
FIG. 20 shows an example plot of three metrics centered at the origin of a three-dimensional space.

The mean-centered metrics, $\{\bar{u}_j\}_{j=1}^{M}$, are arranged to foil a mean-centered metric-data matrix $\overline{X}$ in which columns of the mean-centered metric-data matrix are the mean-centered metrics that corresponds to the metrics in the metric-data matrix X. In other words, the mean of each column of the metric-data matrix X 1700 is subtracted from the metric values in the column to give a corresponding column in mean-centered metric-data matrix $\overline{X}$ 1900 as illustrated in FIG. 19. Each column of the mean-centered metric-data matrix $\overline{X}$ 1900 is a mean-centered metric obtained by subtracting the mean of the metric values from the metric values in the column of the metric-data matrix X 1700.

FIG. 20 shows an example plot of the three metrics shown in FIG. 18 translated to the origin 1804 of the three-dimensional space. Each metric is translated by subtracting the mean of each metric from the metric values of the metric according to Equation (4). For example, the metric values of point 2002 are obtained by subtracting mean values of the three corresponding metrics from the metric values represented by the point 1806 in FIG. 18: $\bar{x}_i^{(1)} = x_i^{(1)} - \mu_1$, $\bar{x}_i^{(2)} = x_i^{(2)} - \mu_2$, and $\bar{x}_i^{(3)} = x_i^{(3)} - \mu_3$.

In one implementation, the PCA technique computes a covariance matrix of the mean-centered metric-data matrix $\overline{X}$ 1900 by first transposing the mean-centered metric-data matrix $\overline{X}$ 1900 to obtain transposed mean-centered metric-data matrix $\overline{X}^T$ 2100, shown in FIG. 21A, where superscript T denotes matrix transpose. The transposed mean-centered metric-data matrix $\overline{X}^T$ 2100 is multiplied by the mean-centered metric-data matrix $\overline{X}$ 1900 to obtain a covariance matrix $C^{cov}$ 2102 shown in FIG. 21B. The covariance matrix $C^{cov}$ 2102 is an M×M square symmetric matrix with matrix elements given by $$\mathrm{cov}(\bar{u}_j, \bar{u}_k) = \frac{1}{N} \sum_{i=1}^{N} \bar{x}_i^{(j)} \bar{x}_i^{(k)} \qquad (6a)$$

where
j=1, ..., M; and
k=1, ..., M.

In another implementation, the PCA technique computes a correlation matrix $C^{cor}$ 2104 shown in FIG. 21C. The correlation matrix $C^{cor}$ 2104 is an M×M square symmetric matrix with matrix elements given by $$\mathrm{cor}(\bar{u}_j, \bar{u}_k) = \frac{1}{N} \sum_{i=1}^{N} \frac{\bar{x}_i^{(j)} \bar{x}_i^{(k)}}{\sigma_j \sigma_k} \qquad (6b)$$

where
$\sigma_j$ is the standard deviation of mean-centered metric $\bar{u}_j$; and
$\sigma_k$ is the standard deviation of mean-centered metric $\bar{u}_k$.

The standard deviations $\sigma_j$ and $\sigma_k$ scale the correlation value between −1 and 1.

The covariance matrix $C^{cov}$ 2102 and the correlation matrix $C^{cor}$ 2104 are measures of deviations between the pairs of mean-centered metrics. In the following discussion of the PCA technique, the term "deviation matrix" refers to the covariance matrix or the correlation matrix, depending on which of the two matrices is selected to perform the PCA technique. When the metrics exhibit stable variances, the deviation matrix, denoted by C, used to perform PCA may be the covariance matrix $C^{cov}$ or the correlation matrix $C^{cor}$. Alternatively, when the metrics exhibit unstable variances, the deviation matrix C used to perform the PCA technique is the correlation matrix $C^{cor}$.

The PCA technique computes the eigenvalues and corresponding mutually orthogonal eigenvectors for the deviation matrix. The eigenvectors are normalized. Each normalized eigenvector corresponds to an axis of an ellipsoid associated with the distribution of the M metrics. The fraction of the variance that each eigenvector represents may be determined by dividing the eigenvalue corresponding to that eigenvector by the sum of all eigenvalues.

Eigenvalues and eigenvectors are computed for an eigenvector-eigenvalue problem formed for the deviation matrix C:

$$CE^j = \lambda_j E^j \qquad (7)$$

where
$E^j$ represents the j-th eigenvector;
$\lambda_j$ represents the j-th eigenvalue; and
j=1, ..., M.

FIG. 22 shows a matrix representation of the eigenvector-eigenvalue problem formed for the deviation matrix C with the eigenvector $E^j$ represented by an M×1 column vector 2202 and the eigenvalue $\lambda_j$ 2204 is a scalar value. Equation (7) is equivalent to $CE^j - \lambda_j E^j = 0$ with the $\lambda_j E^j = \lambda_j I E^j$, where I is the M×M identity matrix. Equation (7) can be rewritten as $$(C - \lambda_j I) E^j = 0 \qquad (8)$$

The M eigenvalues are computed by solving the characteristic equation:

$$\det(C - \lambda_j I) = 0 \qquad (9)$$

where "det" denotes the determinant operator.

After the eigenvalues are computed, corresponding eigenvectors are numerically computed from Equation (9). In other words, each eigenvalue has an associated eigenvector computed from Equation (7). An eigenvalue and the associated eigenvector are called an eigenpair. Because the deviation matrix C is symmetric, the deviation matrix C may be diagonalized in terms of the eigenvectors and eigenvalues as follows:

$$C = E \Lambda E^T \qquad (10)$$

where
E is the eigenvector matrix formed from the eigenvectors of the deviation matrix C;
$E^T$ is the transpose of the eigenvector matrix; and
$\Lambda$ is the eigenvalue matrix formed from eigenvalues $\{\lambda_j\}_{j=1}^{M}$ of the deviation matrix C.

FIG. 23 shows matrix representations of the eigenvector matrix and eigenvalue matrix of Equation (10). The eigenvector matrix E is an M×M matrix in which the columns of the eigenvector matrix are the eigenvectors of the deviation matrix C. The eigenvector matrix $\Lambda$ is an M×M diagonal matrix with the eigenvalues of the deviation matrix C located along the diagonal. The eigenvectors of the eigenvector matrix E and the corresponding eigenvalues of the eigenvalue matrix Λ are eigenpairs. For example, as shown in FIG. 23, the first eigenvector $E^1$ 2302 corresponds to the first eigenvalue $\lambda_1$ 2304. The eigenvectors of the eigenvector matrix E are orthogonal (i.e., $E^j \cdot E^k = 0$ for $j \neq k$, $j=1, \ldots, M$, and $k=1, \ldots, M$).

Each eigenvector corresponds to an axis of an ellipsoid characterization of the mean-centered metrics $\{\bar{u}_j\}_{j=1}^{M}$ in the M-dimensional space. Each eigenvalue is proportional to the magnitude of the variance in the direction of the corresponding eigenvector. A large eigenvalue corresponds to a larger variation in the spread of the mean-centered metrics $\{\bar{u}_j\}_{j=1}^{M}$ in the direction of the corresponding eigenvector than in the direction of an eigenvector with a smaller corresponding eigenvalue. The eigenvalues are rank ordered from largest to smallest. Let $\lambda_1^{ro}, \ldots, \lambda_M^{ro}$ denote the rank ordered eigenvalues of the eigenvalues $\{\lambda_j\}_{j=1}^{M}$, where $\lambda_1^{ro} > \lambda_2^{ro} > \ldots > \lambda_M^{ro}$, and the superscript "ro" identifies the eigenvalues as rank ordered with $\lambda_1^{ro}$ and $\lambda_M^{ro}$ corresponding to the largest and smallest of the eigenvalues $\{\lambda_j\}_{j=1}^{M}$. Let $E_{ro}^1, \ldots, E_{ro}^M$ denote the corresponding eigenvectors of the rank ordered eigenvalues $\lambda_1^{ro}, \ldots, \lambda_M^{ro}$. The large eigenvalue $\lambda_1^{ro}$ corresponds to the largest variation in the spread of the mean-centered metrics $\{\bar{u}_j\}_{j=1}^{M}$ in the direction of the corresponding eigenvector $E_{ro}^1$. By contrast, the smallest eigenvalue $\lambda_M^{ro}$ corresponds to the smallest variation in the spread of the mean-centered metrics $\{\bar{u}_j\}_{j=1}^{M}$ in the direction of the corresponding eigenvector $E_{ro}^M$. Each eigenvector may be normalized to obtain normalized eigenvectors as follows:

$$e^j = \frac{E_{ro}^j}{\|E_{ro}^j\|} \quad (11)$$

where $\|\cap\|$ is the Euclidean noun or length of the eigenvector.

FIG. 24 shows column vectors of M normalized eigenvectors. Normalized eigenvector $e^1$ corresponds to the largest rank order eigenvalue $\lambda_1^{ro}$, normalized eigenvector $e^2$ corresponds to the second largest rank order eigenvalue $\lambda_2^{ro}$, normalized eigenvector $e^3$ corresponds to the third largest rank order eigenvalue $\lambda_3^{ro}$, and normalized eigenvector $e^M$ corresponds to the smallest rank order eigenvalue $\lambda_M^{ro}$.

FIG. 25 shows three orthogonal normalized eigenvectors $e^1$, $e^2$, and $e^3$ for the three metrics shown FIG. 20. Ellipse 2502 represents a three-dimensional elliptical region of space that is centered at the origin 1804 and represents the general shape of the space occupied by the three metrics. The normalized eigenvectors $e^1$, $e^2$, and $e^3$ correspond to directions of the greatest variance, medium variance, and smallest variance of the three metrics and correspond to the largest, medium, and smallest eigenvalues of the three metrics. For example, normalized vector $e^1$ points in the direction of the longest axis of the ellipsoid 2502.

The mean-centered metrics $\{\bar{u}_j\}_{j=1}^{M}$ are projected onto M principal-component axes, denoted by $PC_1, PC_2, \ldots, PC_M$, that are aligned with the directions of the normalized eigenvectors to obtain M principal components. FIG. 26 shows computation of the M-principal components based on the mean-centered metrics $\{\bar{u}_j\}_{j=1}^{M}$. The mean-centered metric-data matrix $\bar{X}$ 1900 is multiplied by a normalized eigenvector matrix 2602 formed from the normalized eigenvectors, shown in FIG. 24, to obtain a principal-component matrix 2604. Each column of a principal-component matrix 2604 is a principal component comprising N principal component values located along a corresponding principal component axis. For example, the first principal component $PC_1$ is represented by column 2606 and comprises principal component values $pc_1(t_1), pc_1(t_2), \ldots, pc_1(t_N)$ located along the principal-component axis $PC_1$. The second principal component $PC_2$ is represented by column 2608 and comprises principal component values $pc_2(t_1), pc_2(t_2), \ldots, pc_2(t_N)$ located along the principal-component axis $PC_2$. The M-th principal component $PC_M$ is represented by column 2610 and comprises principal component values $pc_M(t_1), pc_M(t_2), \ldots, pc_M(t_N)$ located along the principal-component axis $PC_M$. Principal component values with the same time stamp form an M-tuple that may be represented by a point in an M-dimensional space.

The PCA technique retains principal components with the largest variance and discards principal components with the smallest variance. The variance of the principal components along each of the M principal-component axes is computed by:

$$\text{Var}(PC_j) = \frac{1}{N}\sum_{i=1}^{N}\left(pc_j(t_i) - \mu(PC_j)\right)^2 \quad (12)$$

where $j = 1, \ldots, M$; and $$\mu(PC_j) = \frac{1}{N}\sum_{i=1}^{N} pc_j(t_i).$$

The variances of the principal components correspond to the rank ordered eigenvalues of the deviation matrix. In other words, the variances of the principal components decrease are used to rank order the principal components as follows: $\text{Var}(PC_1) > \text{Var}(PC_2) > \ldots > \text{Var}(PC_M)$. The first principal component has the largest variance, the second principal component has the second large variance, and so on with the M-th principal component having the smallest variance.

Figure 27:
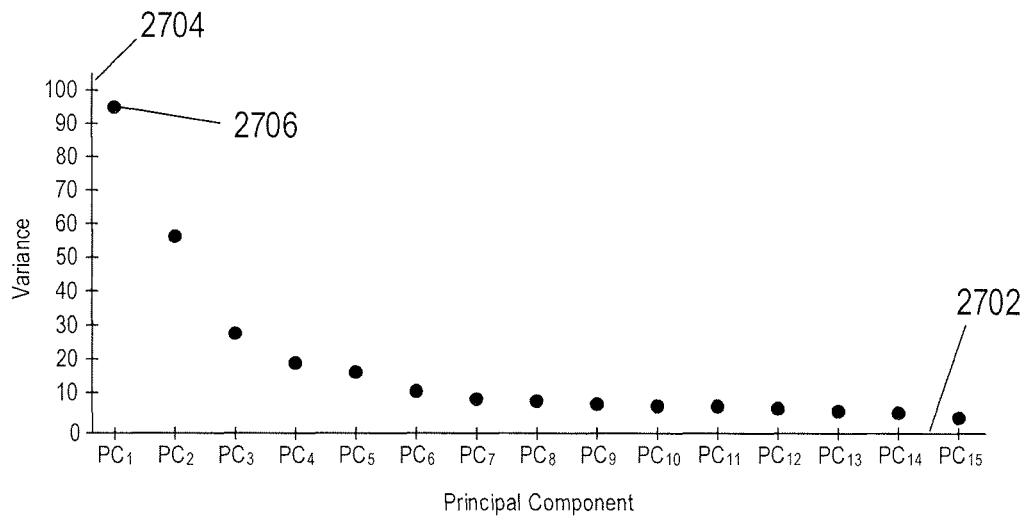
FIG. 27 shows a plot of example variances for 15 principal components.

FIG. 27 shows a plot of example rank ordered variances for the first 15 principal components. Each mark located along horizontal axis 2702 corresponds to one of the 15 principal components. Vertical axis 2704 represents a variance range. Points are variances of the principal components. For example, point 2706 is the variance of the first principal component $PC_1$. In the example of FIG. 27, the variances decrease exponentially.

Subset of principal components are formed from the principal components in which each subset of principal component comprises the first n principal components with the n largest corresponding variances. In other words, each subset of principal components comprises the n principal components with the n largest variances. For example, a first three (i.e., n=3) principal components comprises the principal components with the three largest corresponding variances, and a first four (i.e., n=4) principal components comprises the principal components with the four largest corresponding variances. A percentage of variance computed for the first n principal components (i.e., n<M) by $$\text{Percent} - \text{Var}(n) = \frac{\sum_{j=1}^{n} V(PC_j)}{\sum_{j=1}^{M} V(PC_j)} \times 100 \quad (13)$$

A threshold may be used to determine the first n principal components. For example, the first n principal components contain a most of the variation, when the following condition is satisfied $$\text{Percent-Var}(n) \geq Th_{perc\_var} \qquad (14)$$

where $Th_{perc\_var}$ is a percentage of variance threshold (e.g., $Th_{perc\_var}$ may be set to any value between 85% and 98%).
The smallest percentage of variance that satisfies the condition given by Equation (14) gives the smallest number of principal components that contain most of the variation of the metrics. The smallest subset of first n principal components with the corresponding smallest percentage of variance that satisfies the condition given by Equation (14) are called "high-variance principal components." The remaining M−n principal components do not have sufficient variance and may be discarded, reducing the dimensionality of the principal-component space from M dimensions to n dimensions.

Figure 28:
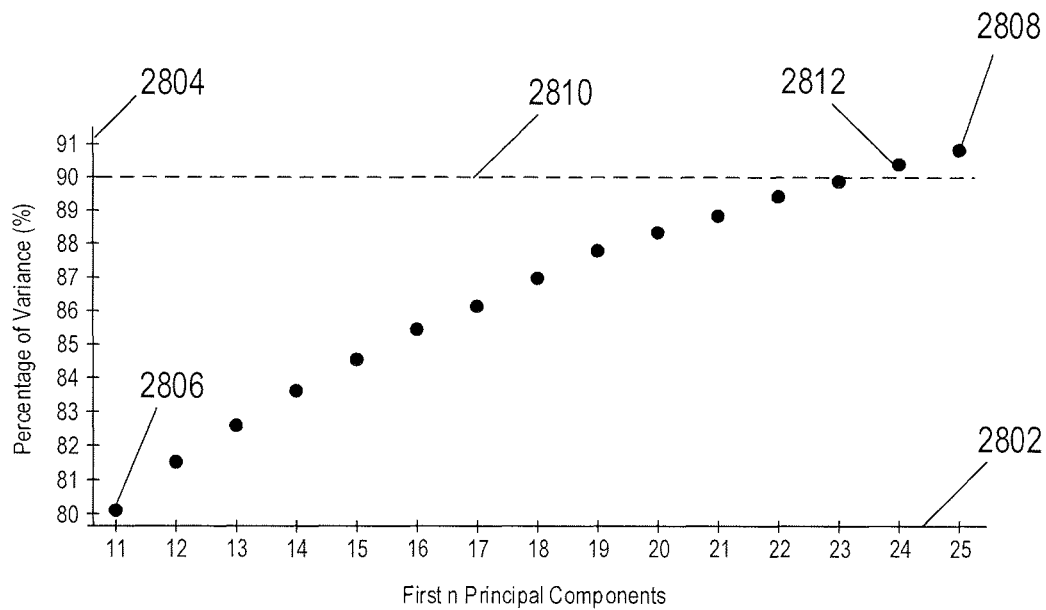
FIG. 28 shows a plot of percentage of variance for first 11 principal components through first 25 principal components.

FIG. 28 shows a plot of example percentage of variance for first 11 principal components through first 25 principal components. Each mark along horizontal axis 2802 corresponds to a first fixed number of principal components, where n ranges from 11 to 25. Vertical axis 2804 corresponds to a range of percentage of variances. Points represent the percentage of variance for different numbers of principal components. For example, point 2806 represents a percentage of variance for the first 11 principal components and point 2808 represents a percentage of variance for the first 25 principal components. Dashed line 2810 represents a percentage of variance threshold of 90%. The plot of percentage of variances indicates that the first 24 principal components identified by point 2812 contain about 90% of the variation of the mean-centered metrics $\{\bar{u}_j\}_{j=1}^{M}$. In other words, because the percentage of variance threshold is set to 90%, only the first 24 principal components may be used to characterize variance of the mean-centered metrics $\{\bar{u}_j\}_{j=1}^{M}$. In other words, if the first 24 principal components characterize 90% of the variation in the metrics, the remaining M−24 principal components may be discarded for lack of sufficient variation, thereby reducing the dimensionality of the principal-component space from the M-dimensional principal-component space to a 24-dimensional principal-component space.

Figure 29A:
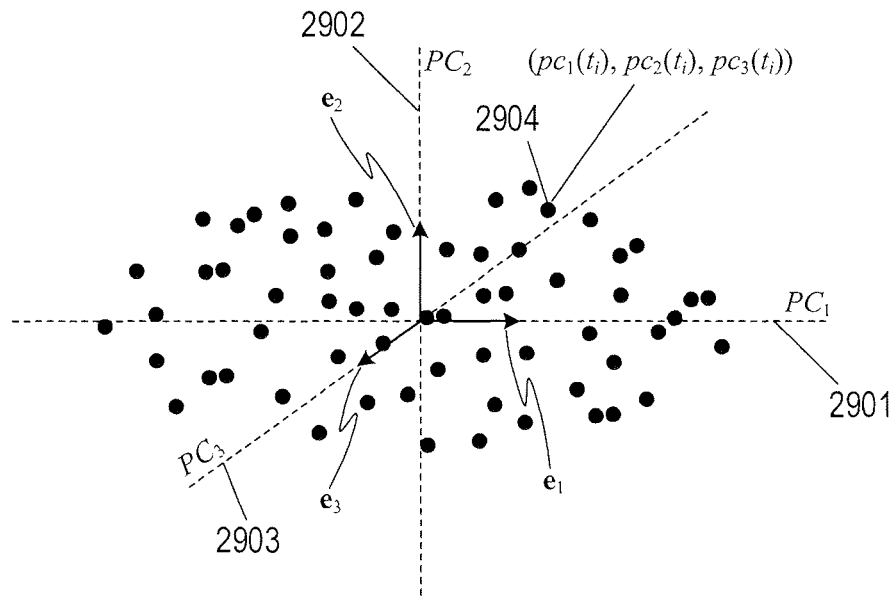
FIGS. 29A-29B show an example of reducing the number of principal components associated with the three metrics.
Figure 29B:
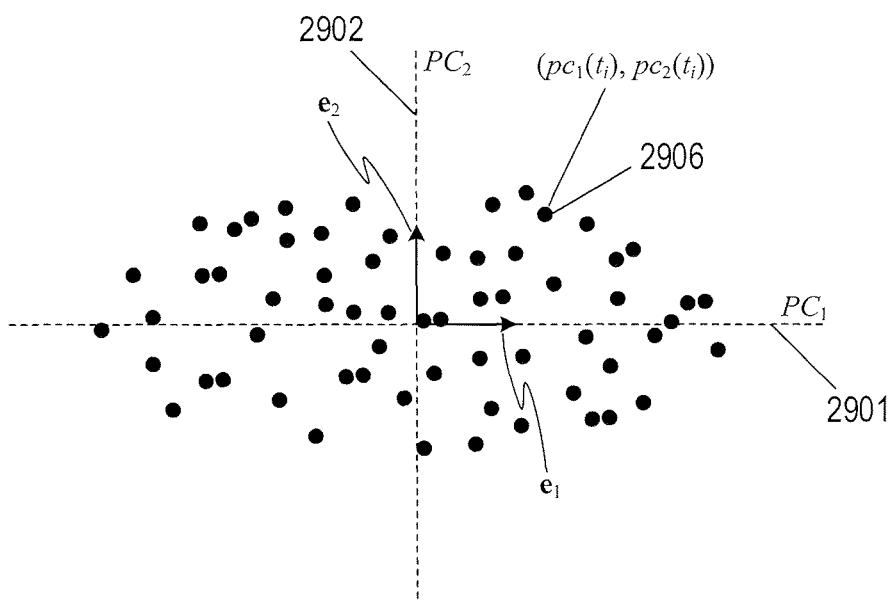

FIGS. 29A-29B show an example of reducing the number of hypothetical principal components associated with the three metrics plotted in FIG. 25. In FIG. 29A, dashed lines 2901-2903 represent principal-component axes $PC_1$, $PC_2$ and $PC_3$, respectively. Points represent three tuples of three principal components values of the three principal components $PC_1$, $PC_2$ and $PC_3$ with the same time stamp. For example, point 2904 comprises the principal component values $pc_1(t_i)$, $pc_2(t_i)$ and $pc_3(t_i)$ of the corresponding principal components $PC_1$, $PC_2$ and $PC_3$. Suppose that Percent−Var(2) satisfies the condition given by Equation (12). The principal components $PC_1$ and $PC_2$ are identified as high-variance principal components that may be used to characterize variation of the object associated with the three metrics. Because the principal components $PC_1$ and $PC_2$ contain most of the variation of the three metrics, the principal component $PC_3$ is discarded, which reduces the dimensionality of the principal-component space from three to two, as shown in FIG. 29B. For example, point 2904 in FIG. 29A is reduced from the three principal component values $pc_1(t_i)$, $pc_2(t_i)$ and $pc_3(t_i)$ to a point 2906 in FIG. 29B with the two principal component values $pc_1(t_i)$ and $pc_2(t_i)$.

A system indicator is computed from the high-variance principal components over the historical time window. The system indicator is a time dependent sequence used to distinguish normal and abnormal behavior of the object over the historical time window. In one implementation, for each time stamp in the historical time window, the system indicator comprises a principal-component average value computed as follows:

$$pc_{ave}(t_i) = \frac{1}{n}\sum_{j=1}^{n}pc_j(t_i) \qquad (15a)$$

In another implementation, for each time stamp in the historical time window, a system indicator comprises a principal-component average-absolute value computed as follows:

$$pc_{ave\_abs}(t_i) = \frac{1}{n}\sum_{j=1}^{n}|pc_j(t_i)| \qquad (15b)$$

where $|\cap|$ represents the absolute value operator.
In another implementation, for each time stamp in the historical time window, a system indicator comprises a principal-component distance computed as a distance from principal-component values with the same time stamp to the origin of a principal-component space:

$$pc_{distance}(t_i) = \sqrt{\sum_{j=1}^{n}(pc_j(t_i))^2} \qquad (15c)$$

Figure 30A:
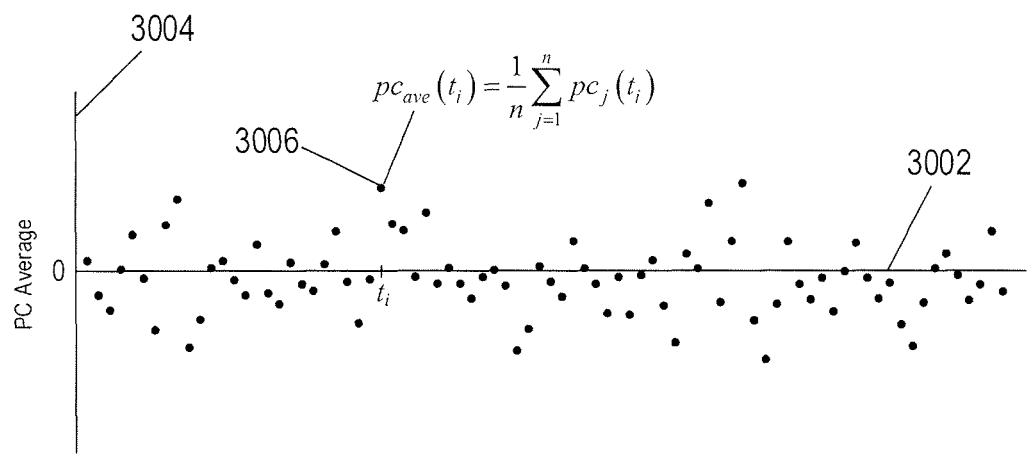
FIG. 30A shows a plot of an example system indicator of principal component average values over a time.

FIG. 30A shows a plot of an example system indicator of principal-component average values over time. Horizontal axis 3002 represents a historical time window. Vertical axis 3004 represents a range of principal component averages. Each point represents an average of principal-component values at a time stamp computed according to Equation (15a). For example, point 3006 represents the average of the principal-component values at the time stamp $t_i$. Note that average principal-component values may be negative or positive.

Figure 30B:
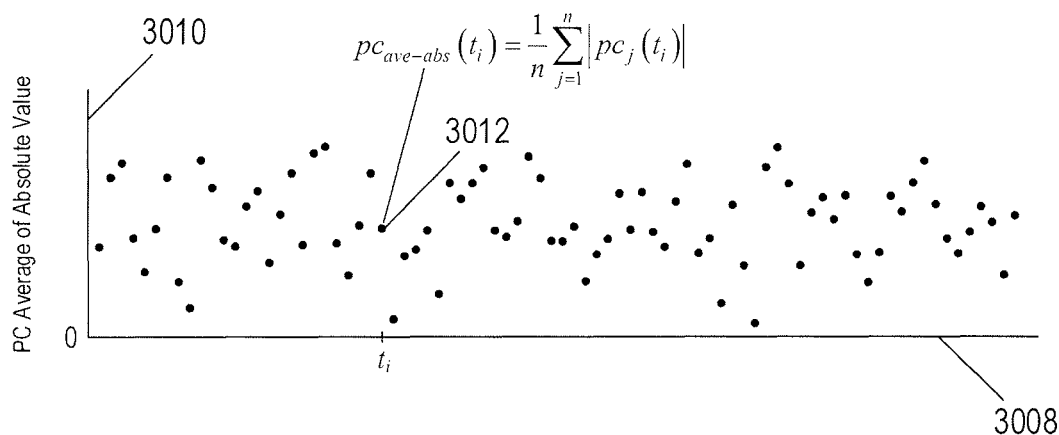
FIG. 30B shows a plot of an example system indicator principal component average-absolute values over time.

FIG. 30B shows a plot of an example system indicator of principal-component average-absolute values over time. Horizontal axis 3008 represents a historical time window. Vertical axis 3010 represents a range of average-absolute values of the principal components. Points represent average-absolute values of principal components at the same time stamp computed according to Equation (15b). For example, point 3012 represents the average-absolute value of the principal components at the time stamp $t_i$.

System-indicator values are labeled as normal or outliers based on whether the system-indicator values violate upper or lower normal bounds. An abnormal system-indictor value is an indication of abnormal behavior of the object. Normal system-indicator values signify normal behavior by the object. A system-indicator value is labeled as normal if the following condition is satisfied:

$$\mu_X - Z\sigma_X \leq pc_X(t_i) \leq \mu_X + Z\sigma_X \qquad (16)$$

where
X denotes PC average, PC average-absolute value, or PC distance;

Z is a selected positive numerical value;

$$\mu_X = \frac{1}{N}\sum_{i=1}^{N} pc_X(t_i)$$

$$\sigma_X = \sqrt{\frac{1}{N}\sum_{i=1}^{N}(pc_X(t_i) - \mu_X)^2}$$

$\mu_X + Z\sigma_X$ is an upper normal bound; and $\mu_X - Z\sigma_X$ is a lower normal bound.

Otherwise, if a system-indicator value does not satisfy the condition given by Equation (16) (i.e., violates the upper or lower normal bound), the system-indicator value is labeled as an abnormal system-indicator value.

Figure 31:
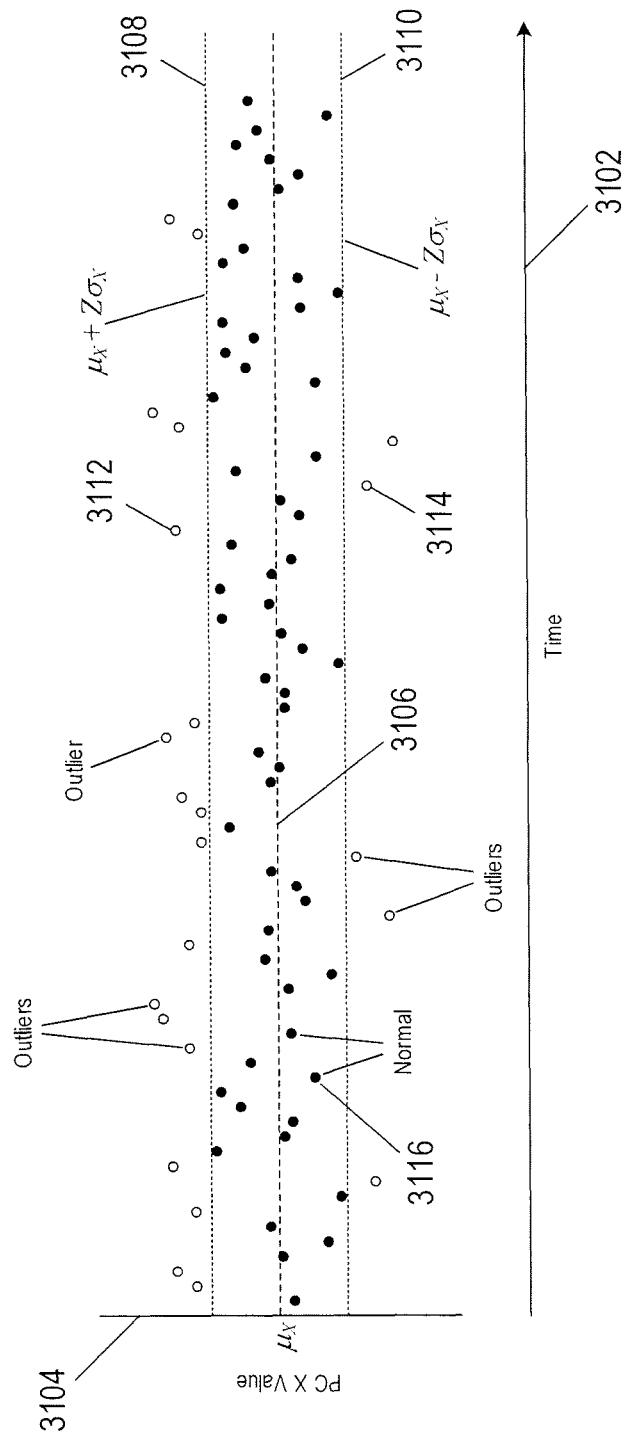
FIG. 31 shows normal and abnormal system-indicator values for an example system indicator.

FIG. 31 shows normal and abnormal system-indicator values for an example system indicator. Horizontal axis 3102 represents a historical time window. Vertical axis 3104 represents a range of system-indicator values. The system indicator may be principal-component average, principal-component average-absolute value, or principal-component distance. Dashed line 3106 represents the average $\mu_X$ of the system-indicator values over the time interval. Dotted line 3108 represents an upper normal bound $\mu_X + Z\sigma_X$. Dotted line 3110 represents a lower normal bound $\mu_X - Z\sigma_X$. System-indicator values that are greater than the upper normal bound 3108 or are less than the lower normal bound 3110 are outliers and are labeled as abnormal system-indicator values, as represented by open dots. For example, open dots, such as open dot 3112 and 3114, are outliers that are labeled as abnormal system-indicator values. System-indicator values that are located between the upper normal bound 3104 and the lower normal bound 3106 are labeled as normal system-indicator values, as represented by solid points, such as point 3116.

The labeled normal and abnormal system-indicator values are used to train a state classifier that is, in turn, used to classify run-time system-indicator values as an outlier or normal. Processes and systems use a support vector machine ("SVM") to train a state classifier that distinguishes between abnormal and normal run-time system-indicator values. The state classifier is trained using the system-indicator points denoted by a $\{(t_i, pc_X(t_i)), y_i\}$, where $i=1, \ldots, N$, and $y_i \in \{-1, 1\}$. A system-indicator point $(t_i, pc_X(t_i))$ comprises a time stamp $t_i$ and system-indicator value $pc_X(t_i)$. The value of $y_i$ is a class label that identifies which of the two normal or abnormal classes the system-indicator point $(t_i, pc_X(t_i))$ belongs to. For example, a class label $y_i=-1$ may identify system-indicator points $(t_i, pc_X(t_i))$ that have been labeled as abnormal and a class label $y_i=1$ may identify system-indicator points $(t_i, pc_X(t_i))$ that have been labeled as normal.

Figure 32A:
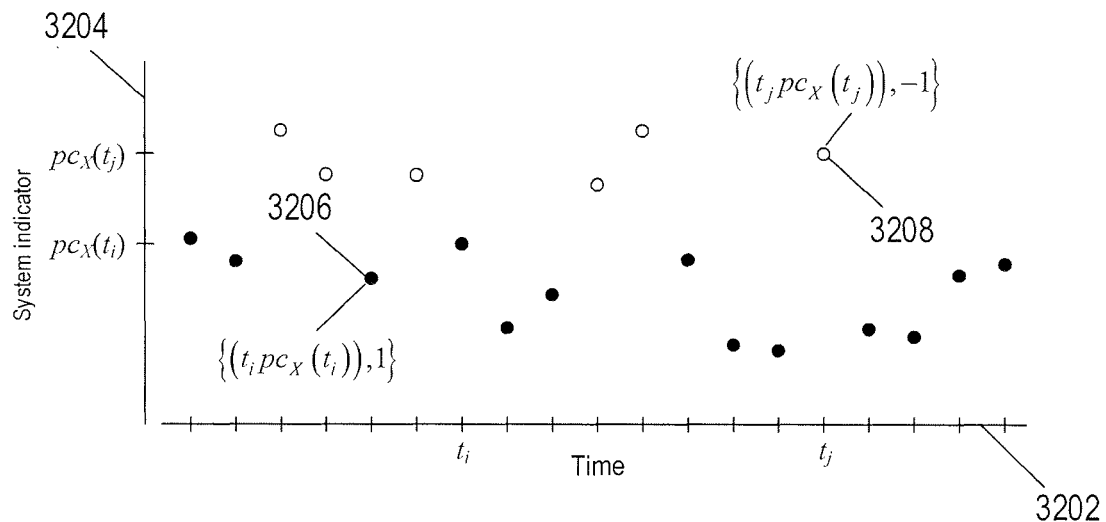
FIG. 32A shows an example of labeled system-indicator points of a sequence of system indicators.

FIG. 32A shows an example of labeled system-indicator points of a sequence of system indicators. Horizontal axis 3202 represents time. Vertical axis 3204 represents a range of system-indicator values. Solid points represent system indicators points labeled as normal. For example, point 3206 is a normal system-indicator point with class label $y_i=1$ and point 3208 is an abnormal system-indicator point with class label $y_j=-1$.

The objective of the SVM is to determine a maximum-margin boundary that separates system-indicator points with a class label $y_i=1$ from system-indicator points with a class label $y_i=-1$ and is defined so that the distance between the maximum-margin boundary and the nearest system-indicator point is a minimum. In general, the parametric equation for a linear boundary may be written as $$[pc_X(t_i)\ t_i]^T \vec{w} - b = 0 \quad (17)$$

where $$\begin{bmatrix} pc_X(t_i) \\ t_i \end{bmatrix}$$

is a column vector representation of a system-indicator point;

$\vec{w}$ is the normal vector to the maximum-margin line; and b is a constant.

The SVM determines the maximum-margin boundary that lies midway between two parallel outer linear boundaries that separate the two classes of outlier and normal system-indicator points such that the distance between the two parallel linear boundaries is a maximum. The region bounded by the outer boundary is called the margin, and the maximum-margin boundary lies midway between the outer boundaries. In order to handle system-indicator points that are not fully linearly separable by a linear boundary, a slack variable may be introduced with the constraint $$y_i([pc_X(t_i)\ t_i]^T \vec{w} + b) - 1 + \xi_i \geq 0 \quad (18)$$

where $\xi_i$ is the slack variable; and for every $\xi_i \geq 0$.

Support vectors are system-indicator points that lie along the margins. The maximum-margin boundary is determined by the support vectors.

Figure 32B:
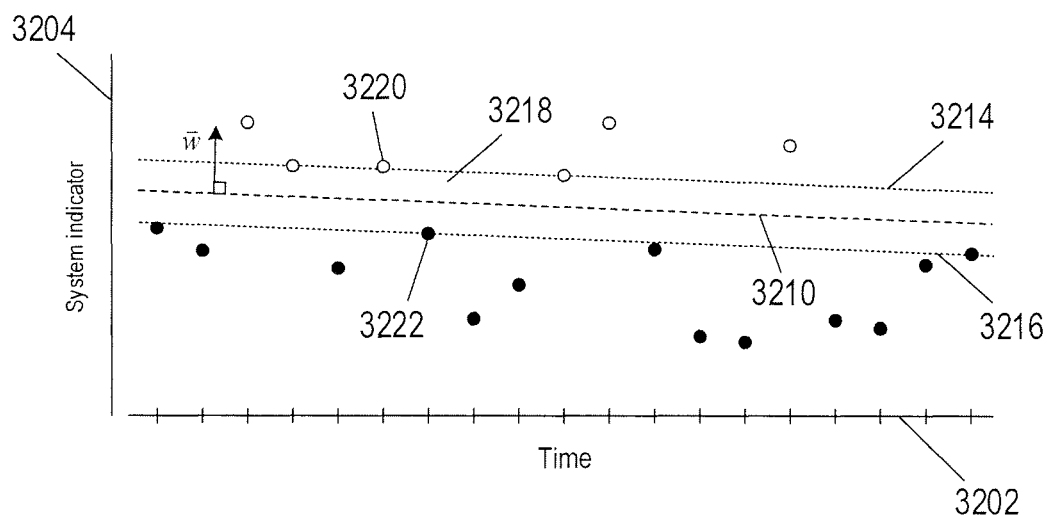
FIG. 32B shows an example of a maximum-margin line that separates normal system indicator points from abnormal system indicator points identified in FIG. 32A.

FIG. 32B shows an example of a maximum-margin line 3210 that separates normal system-indicator points from abnormal system-indicator points identified in FIG. 32A. Directional arrow 3212 is the normal vector $\vec{w}$ with respect to the line 3210. Dotted line 3214 denotes a first outer line. Dotted line 3216 denotes a second outer line. The region 3218 between the outer lines 3214 and 3216 is the margin. System-indicator points, such as points 3220 and 3222, that are located along the outer lines 3214 and 3216 are support vectors.

For system-indicator points separated by a maximum-margin line, the SVM technique computes elements of a square SVM matrix H as follows:

$$H_{ij} = y_i y_j \left\langle \begin{bmatrix} pc_X(t_i) \\ t_i \end{bmatrix}, \begin{bmatrix} pc_X(t_j) \\ t_j \end{bmatrix} \right\rangle \quad (19)$$

where i=1, ..., N;

j=1, ..., N; and $\langle \cap, \cap \rangle$ denotes the scalar product.

Using quadratic programming, a misclassification parameter C is selected and parameters of a vector $\vec{\alpha}^T = [\alpha_1, \ldots, \alpha_N]$ are computed by maximizing $$L(\vec{\alpha}) = \max_{\vec{\alpha}} \left[ \sum_{i=1}^{N} \alpha_i - \frac{1}{2} \vec{\alpha}^T H \vec{\alpha} \right] \quad (20)$$

(20) subject to the constraints that $C \geq \alpha_i \geq 0$, for every $i=1, \ldots, N$, and $\sum_{i=1}^{N} \alpha_i y_i = 0$. The misclassification parameter C is a constant that controls a trade-off between the slack variable and the size of the margin. Equation (20) is solved for the parameter vector $\vec{\alpha}$ using Quadratic programming. The parameter vector $\vec{\alpha}$ is used to compute the normal vector of maximum-margin line that separates the abnormal system-indicator points from the normal system-indicator points:

$$\vec{w} = \sum_{i=1}^{N} \alpha_i y_i \begin{bmatrix} pc_X(t_i) \\ t_i \end{bmatrix} \quad (21)$$

The non-zero parameters $\alpha_s$ of the parameter vector $\vec{\alpha}$ correspond to the support vectors (i.e., system-indicator points that lie along the outer lines of the margin), where the subscript s denotes the non-zero $\alpha_s$. In other words, the support vectors are the system-indicator points $(t_s, pc_X(t_s))$, where $\alpha_s \neq 0$. The constant b in Equation (17) is given by:

$$b = \frac{1}{N_S} \sum_{s \in S} \left( y_s - \sum_{m \in S} \alpha_m y_m \left\langle \begin{bmatrix} pc_X(t_m) \\ t_m \end{bmatrix}, \begin{bmatrix} pc_X(t_s) \\ t_s \end{bmatrix} \right\rangle \right) \quad (22)$$

where
S is the set of non-zero $\alpha_s$ indices; and
$N_s$ is the number of indices in S.

The normal vector $\vec{w}$ and the constant b are used to form a state classifier given by:

$$\tilde{y} = \text{sgn}([pc_X(t_r) \ t_r]^T \vec{w} + b) \quad (23)$$

where
"sgn" is the sign function;
$t_r$ is a run-time time stamp; and
$pc_X(t_r)$ is a run-time systemic indicator value.
Each run-time system indicator point, $(t_r, pc_X(t_r))$, is classified using the state classifier in Equation (23) as abnormal or normal. For example, using the convention describe above with reference to FIG. 31A, if $\tilde{y}=1$, the object is in a normal state. On the other hand, if $\tilde{y}=-1$, the object is in an abnormal state, which triggers generation of an alert displayed on the system administration console.

In another implementation, for system-indicator points separated by nonlinear boundary, the SVM computes elements of a square matrix H as follows:

$$H_{ij} = y_i y_j \left\langle \phi\left( \begin{bmatrix} pc_X(t_i) \\ t_i \end{bmatrix} \right), \phi\left( \begin{bmatrix} pc_X(t_j) \\ t_j \end{bmatrix} \right) \right\rangle \quad (24)$$

where
$\langle \phi(\bullet), \phi(\bullet) \rangle$ is scalar product and is identified as the kernel; and
$\phi(\bullet)$ is a polynomial mapping.
An example of a quadratic polynomial mapping is given by $$\phi\left( \begin{bmatrix} pc_X(t_i) \\ t_i \end{bmatrix} \right) = \begin{bmatrix} pc_X(t_i)^2 \\ \sqrt{2} \cdot pc_X(t_i) \cdot t_i \\ t_i^2 \end{bmatrix}$$

The polynomial kernel maps the normal and abnormal system-indicator points to a space in which the normal system-indicator points and the abnormal system-indicator points can be separated by a linear maximum-margin boundary, as described above with reference to FIG. 31B. The parameters in vector $\vec{\alpha}$ are computed as described above with reference to Equation (21). The normal vector is computed by $$\vec{w} = \sum_{i=1}^{K} \alpha_i y_i \phi\left( \begin{bmatrix} pc_X(t_i) \\ t_i \end{bmatrix} \right) \quad (25)$$

The constant b is computed by $$b = \frac{1}{N_S} \sum_{s \in S} \left( y_s - \sum_{m \in S} \alpha_m y_m \left\langle \phi\left( \begin{bmatrix} pc_X(t_m) \\ t_m \end{bmatrix} \right), \phi\left( \begin{bmatrix} pc_X(t_s) \\ t_s \end{bmatrix} \right) \right\rangle \right) \quad (26)$$

A state classifier for system-indicator points separate by a non-linear maximum-margin boundary is computed by $$\tilde{y} = \text{sgn}\left( \phi\left( \begin{bmatrix} pc_X(t_m) \\ t_m \end{bmatrix} \right) \cdot \vec{w} + b \right) \quad (27)$$

The state classifier obtained in either Equation (23) or Equation (27) is used to identify run-time abnormal behavior of the object. The run-time metrics associated with the object are collected or retrieved from memory. Constant and nearly constant metrics are discarded as described above with reference to FIGS. 15A-15B. The non-constant metrics are synchronized, as described above with reference to FIG. 16B, to obtain the run-time synchronized and non-constant metrics denoted in set notation by $$\{u_j^{rt}\}_{j=1}^{M} = \{(x_i^{(j)})_{i=N+1}^{N+Q}\}_{j=1}^{M} \quad (28)$$

where
Q is an integer number of time stamps in a run-time interval; and
superscript "rt" denotes run time.
Note that although the time stamps of Equation (28) begin with the time stamp $t_{N+1}$, which occurs immediately after time stamp $t_N$ of the historical time window, collection of run-time metric values may be begin at some time later. In other words, $t_{N+1}$ may not represent a point in time immediately following the time stamp $t_N$ or may represent a much later point in time. The run-time metrics $\{u_j^{rt}\}_{j=1}^{M}$ are translated to the origin of the M-dimensional space by subtracting the mean of the metric values from the metric values of each metric to obtain run-time mean-centered metrics denoted in set notation by:

$$\{\bar{u}_j^{rt}\}_{j=1}^{M} = \{(\bar{x}_i^{(j)})_{i=N+1}^{N+Q}\}_{j=1}^{M} \quad (29)$$

The run-time mean-centered metrics $\{\bar{u}_j^{rt}\}_{j=1}^{M}$ are projected onto n principal-component axes, $PC_1, PC_2, \ldots, PC_n$, using the n eigenvectors associated with the high-variance principal components to obtain n run-time principal components.

FIG. 33 shows computation of the n-principal components based on the run-time mean-centered metrics $\{\bar{u}_j^{rt}\}_{j=1}^{M}$. The run-time mean-centered metric-data matrix 3302 is multiplied by normalized eigenvector matrix 3304 formed from the n normalized eigenvectors associated with the high-variance principal components. Each column of a run-time principal-component matrix 3306 is a principal component comprising Q principal-component values. For example, the first run-time principal component $PC_i^{rt}$ is represented by column 3308 and comprises principal component values $pc_1(t_{N+1})$, $pc_1(t_{N+2})$, ..., $pc_1(t_{N+Q})$ located along the principal-component axis $PC_1$. The second run-time principal component $PC_2^{rt}$ is represented by column 3310 and comprises principal component values $pc_2(t_{N+1})$, $pc_2(t_{N+2})$, ..., $pc_2(t_{N+Q})$ located along the principal-component axis $PC_2$. The n-th run-time principal component $PC_n^{rt}$ is represented by column 3312 and comprises principal component values $pc_n(t_{N+1})$, $pc_n(t_{N+2})$, ..., $pc_n(t_{N+Q})$ located along the principal-component axis $PC_n$.

A run-time sequence of system indicators is computed from the n run-time principal components. The run-time sequence of system indicators is denoted by $(pc_X(t_r))_{r=N+1}^{N+Q}$. The state classifier given by Equation (23) is used to classify each run-time system indicator as an outlier or normal. For example, when $sgn([pc_X(t_r) \ t_r]^T \vec{w} + b) = -1$, the run-time system indicator indicates abnormal behavior of the object at time stamp $t_r$. Alternatively, when $sgn([pc_X(t_r) \ t_r]^T \vec{w} + b) = 1$, the run-time system indicator indicates normal behavior of the object. In other implementations, the state classifier given by Equation (27) may be used to identify abnormal and normal run-time system indicators.

In certain cases, when a run-time system-indicator value indicates abnormal behavior or of the object, an alert may be triggered, indicating that the object is in an abnormal state. In another case, when a subsequence of run-time system-indicator values are abnormal (e.g., a subsequence of five or more system-indicator values are abnormal), the object is in an abnormal state. When an object enters an abnormal state, the alert may be displayed in a graphical user interface of a system administration console. The alert may identify the object and state that the object performance is critical or generate a warning, depending on the number of run-time system indicator values that are abnormal. For example, if 5% of the run-time system indicators are abnormal, a general warning may be displayed. But, if more than 5% of the run-time system indicators are abnormal, a critical warning may be displayed indicating that immediate action should be taken.

Given the many different types of abnormal states of an object, system administrators may have developed different remedial measures for correcting the various different abnormal object states. When abnormal run-time system-indicator values are detected, processes and systems may also generate instructions for correcting the abnormality or execute preprogrammed computer instructions that correct the abnormality. For example, if an object is a VM and an alert is triggered based on associated abnormal run-time system-indicator values, the VM may be torn down, resources, such CPU and memory, may be increased, or the VM may be migrated to a different server computer with more available memory and processing capacity. As another example, if the object is a computer server, remedial measures may include restarting the server computer or migrating virtual objects running on the server computer to other server computers in order to reduce the workload at the server computer, or the server computer may be taken off line or shut down.

The processes described below with reference to FIGS. 34-39 are stored in one or more data-storage devices as machine-readable instructions that when executed by one or more processors of the computer system shown in FIG. 1 automatically detect abnormally behaving objects of a distributed computing system.

Figure 34:
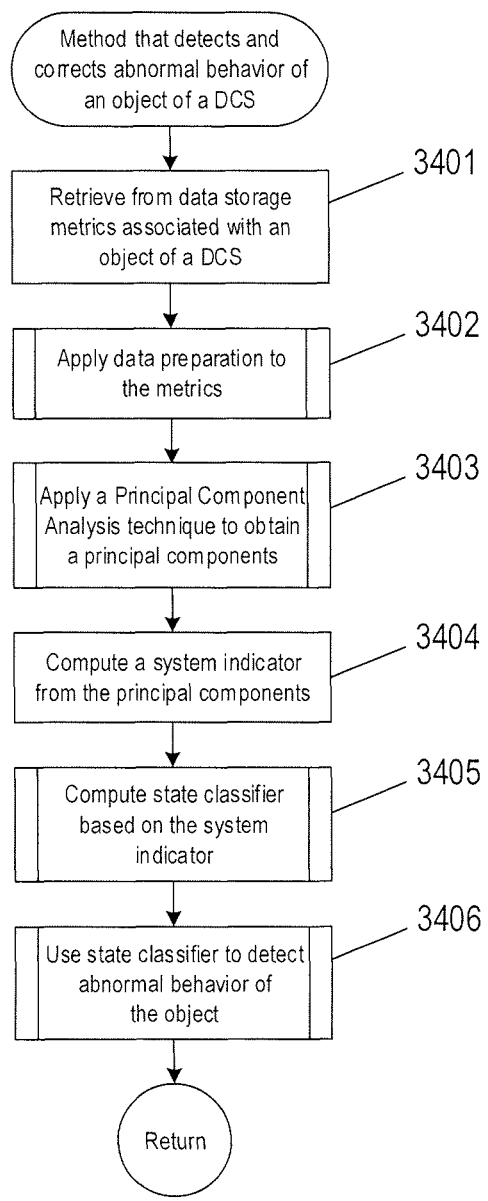
FIG. 34 is a flow diagram illustrating an example implementation a method that detects and corrects abnormal behavior of an object of a distributed computing system.

FIG. 34 is a flow diagram illustrating an example implementation a method that detects and corrects abnormal behavior of an object of a distributed computing system. In block 3401, metrics associated with the object of the distributed computing system is retrieved from data storage. In block 3402, an "apply data preparation to the metrics" procedure is performed. In block 3403, an "apply a PCA technique to obtain principal components" procedure is performed on the metrics output by the procedure represented by block 3402. In block 3404, a system indicator is computed from the principal components as described above with reference to Equations (15a)-(15c) and FIGS. 30A-30B. In block 3405, a "compute state classifier based on system indicator" procedure is performed. In block 3406, a "use state classifier to detect abnormal behavior of the object" procedure is performed.

Figure 35:
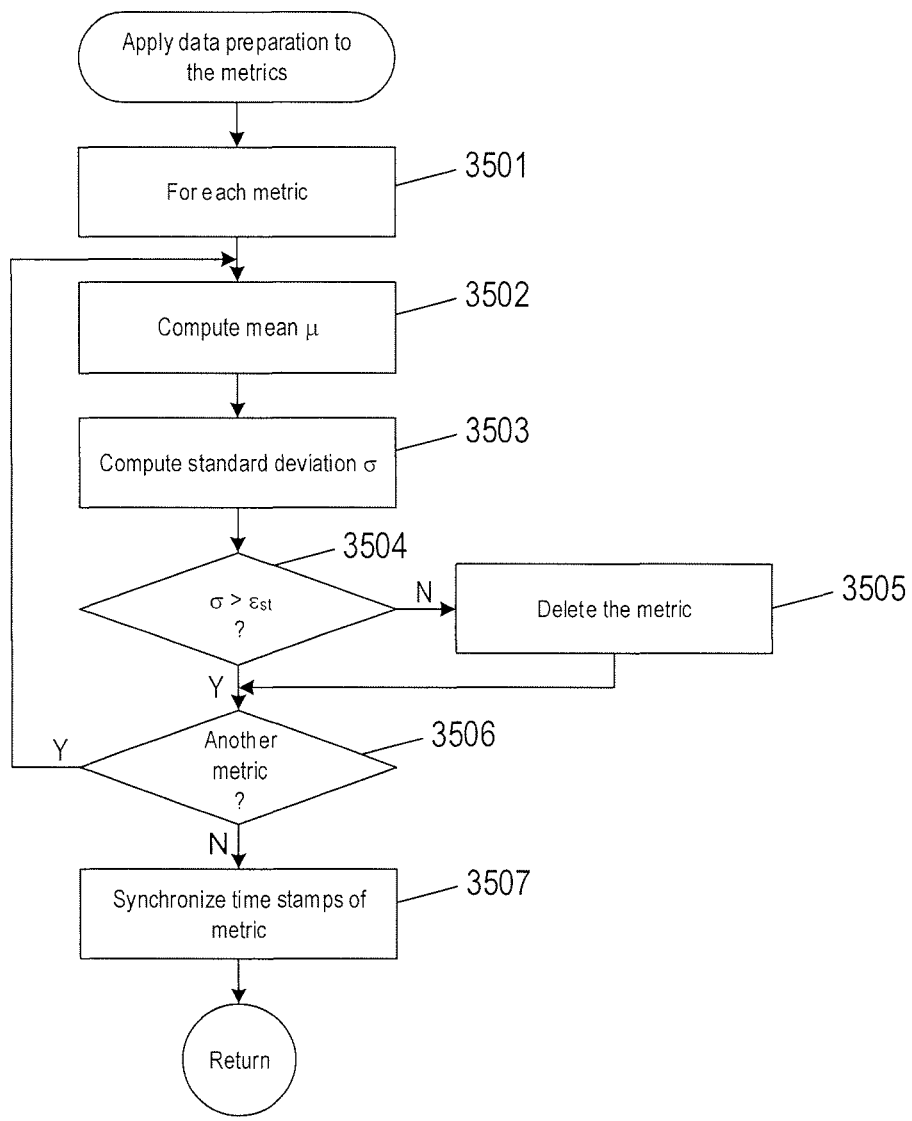
FIG. 35 is a flow diagram illustrating an example implementation of the "apply data preparation to the metrics" step of FIG. 34.

FIG. 35 is a flow diagram illustrating an example implementation of the "apply data preparation to the metrics" step referred to in block 3402 of FIG. 34. A loop beginning with block 3501 repeats the operations represented by blocks 3502-3506 for each metric associated with the object. In block 3502, a mean is computed for the metric. In block 3503, a standard deviation is computed based on the metric and the mean computed in block 3502. In block 3504, when the standard deviation is less than a standard deviation threshold, control flows to block 3505. In block 3505, the metric is deleted from the metrics and not used below. In block 3506, the operations represented by blocks 3502-3505 are repeated for another metric. In block 3507, each metric is synchronized to a general set of uniformly spaced time stamps, as described above with reference to FIG. 16B.

Figure 36:
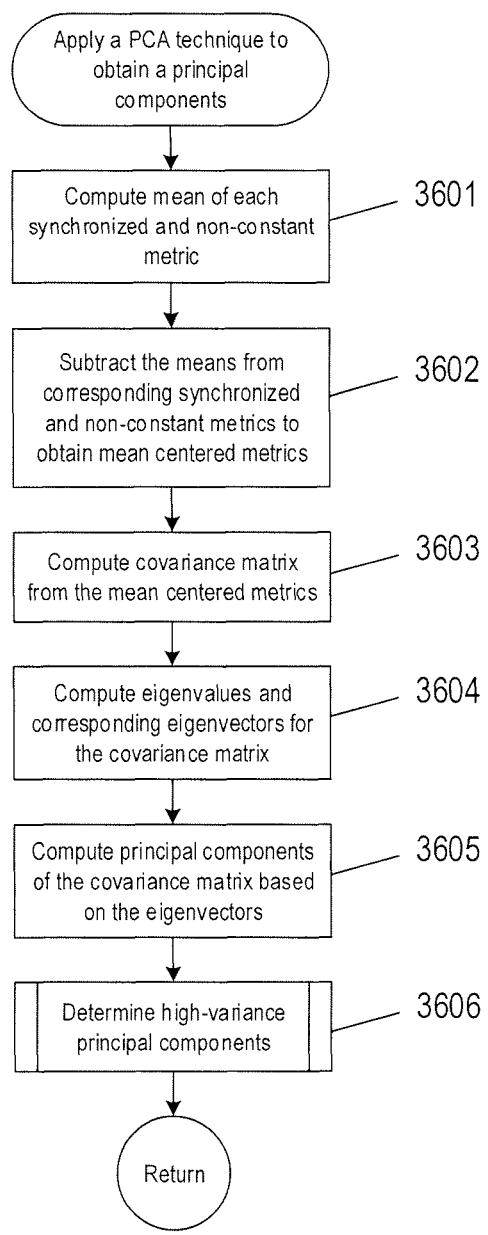
FIG. 36 is a flow diagram of an example implementation of the "apply a PCA technique to obtain principal components" step of FIG. 34.

FIG. 36 is a flow diagram of an example implementation of the "apply a PCA technique to obtain principal components" step referenced in block 3403 of FIG. 34. In block 3601, compute a mean of each synchronized and non-constant metric as described above with reference to Equation (3b). In block 3602, subtract the means from corresponding synchronized and non-constant metrics to obtain mean-centered metrics as described above with reference Equation (5). In block 3603, a deviation matrix is computed from the mean-centered metrics as described above with reference to FIGS. 21A-21B and Equation (6). In block 3604, eigenvalues and corresponding eigenvectors are computed as described above with reference to FIG. 22 and Equations (8) and (9). In block 3605, principal components of the deviation matrix are computed based on the eigenvectors as described above with reference to Equation (11) and FIGS. 24 and 26. In block 3606, a "determine high-variance principal component" procedure is performed on the principal components obtained in block 3605.

Figure 37:
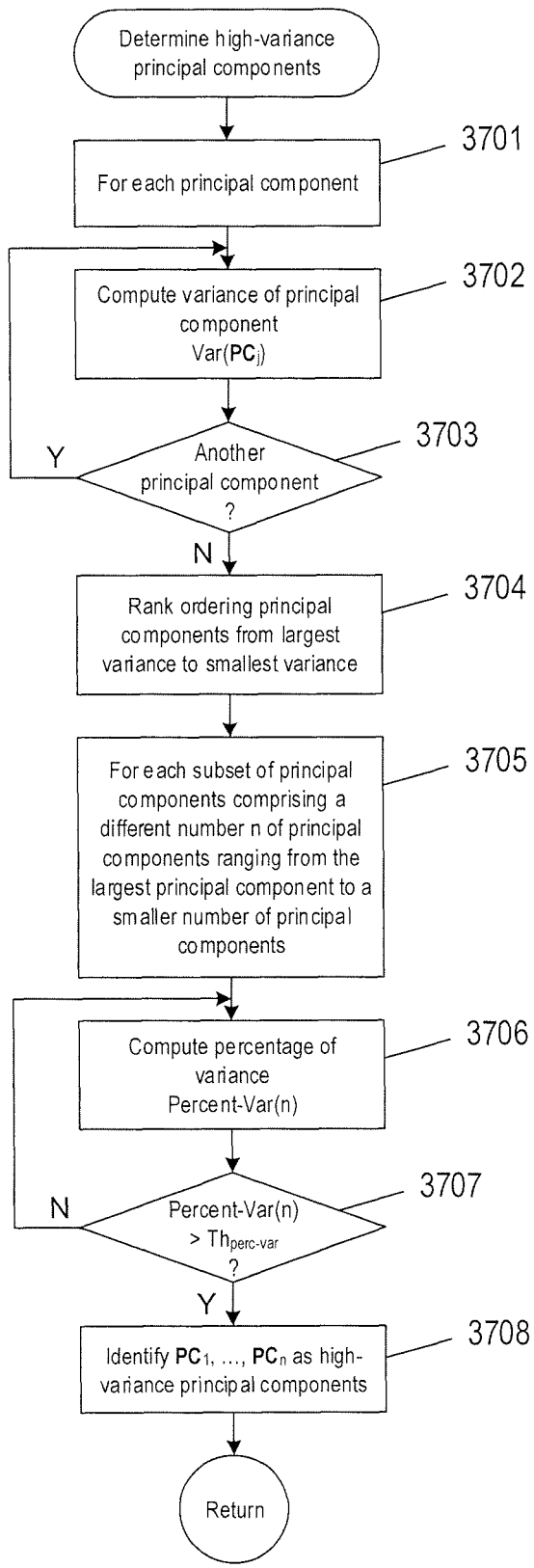
FIG. 37 is a flow diagram of an example implementation of the "determine high-variance principal component" step referred to in block 3606 of FIG. 36.

FIG. 37 is a flow diagram of an example implementation of the "determine high-variance principal component" step referred to in block 3606 of FIG. 36. A loop beginning with block 3701 repeats the computational operation represented by block 2702 for each principal component. In block 3702, a variance of the principal component is computed as described above with reference to Equation (12). In decision block 3703, when the variance of each principal component has been computed, control flows to block 3704. In block 3704, the principal components are rank order from the largest variance to the smallest variance as described above with reference FIG. 27. A loop beginning with block 3705 repeats the computational operation represented by block 3706 for each subset of principal components comprising a different number n of principal components with the n largest variances (e.g., discussion of FIG. 28). In block 3706, a percentage of variance is computed for each subset of principal components as described above with reference to Equation (13). In decision block 3707, when the smallest percentage of variance satisfies the condition given by Equation (14), control flows to block 3708. In block 3708, the principal components with a percentage of variance that satisfies the condition in decision block 3707 are identified as high-variance principal components.

Figure 38:
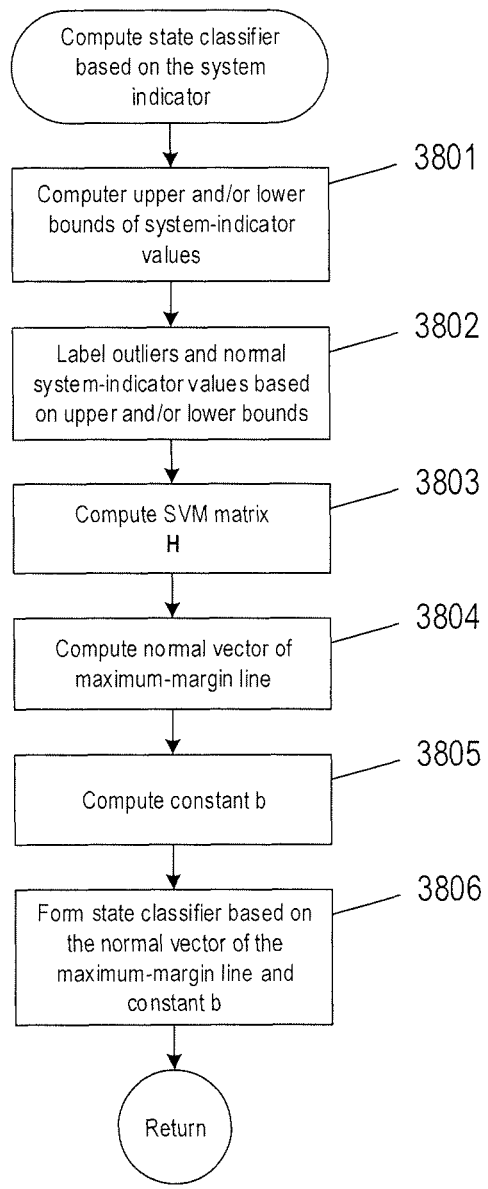
FIG. 38 is a control-flow diagram of the routine "compute state classifier based on system indicator" step of FIG. 43.

FIG. 38 is a flow diagram of "compute state classifier based on system indicator" step referenced in block 3405 of FIG. 43. In block 3801, upper and/or lower bounds are computed for the system-indicator values as described above with reference to Equation (16). In block 3802, system-indicator values are labeled as outlier and normal system-indicator values as described above with reference to Equation (16) and FIG. 31. In block 3803, an SVM matrix H is computed as described above with reference to Equation (19) or Equation (24). In block 3804, a normal vector $\vec{w}$ is computed as described above with reference to Equation (21) or Equation (25). In block 3805, a constant b is computed as described above with reference to Equation (22) of Equation (26). In block 3806, a state classifier is formed form the normal vector and the constant b as described above with reference to Equation (23) or Equation (27).

Figure 39:
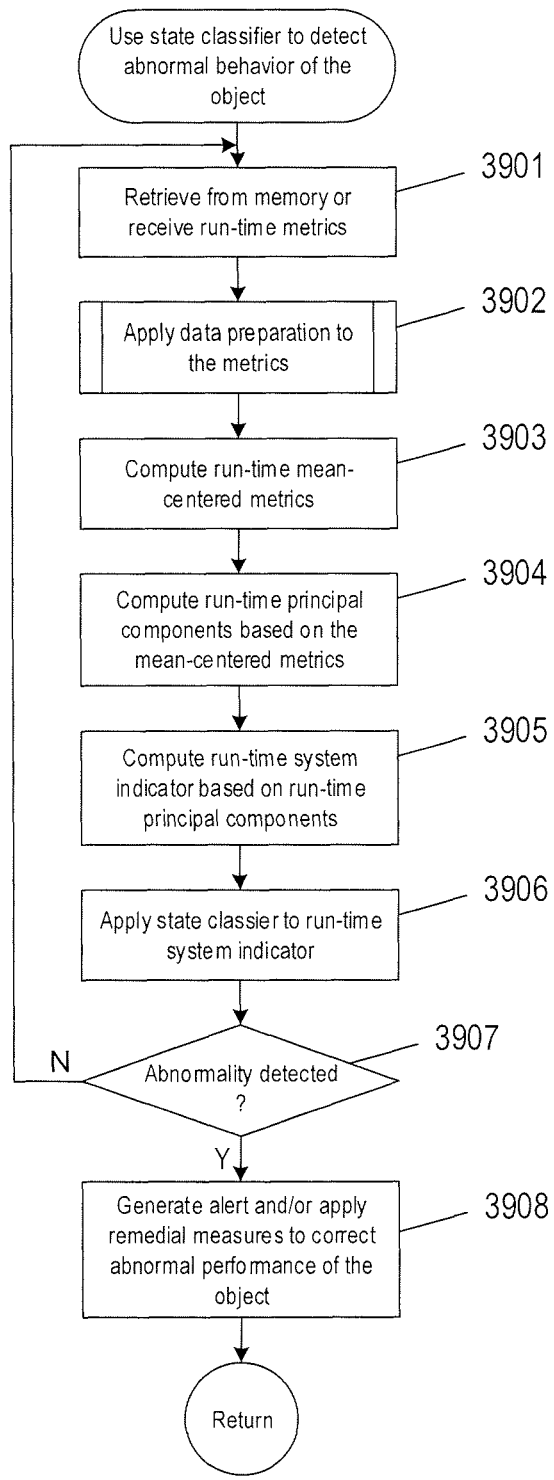
FIG. 39 is a flow diagram of the "use state classifier to detect abnormal behavior of the object" step of FIG. 34.

FIG. 39 is a flow diagram of the "use state classifier to detect abnormal behavior of the object" step block 3406 of FIG. 34. In block 3901, a run-time metrics is retrieved from memory or received. In block 3902, the procedure of "apply data preparation to the metrics" in FIG. 35 is performed to obtain run-time synchronized and non-constant metrics. In block 3903, run-time mean-centered metrics is computed as described above with reference to Equation (29). In block 3904, run-time principal components are computed using the eigenvectors of the high-variance principal components as described above with reference to FIG. 33. In block 3905, a run-time system indicator is computed based on the run-time principal components using one of the system indicator described above with reference to Equations (15a)-(15c). In block 3906, the state classifier is applied to the run-time sequence of system indicators to detect if any abnormal system-indicator values indicative of an abnormal state for the object. In decision block 3907, when an abnormal state is detected, control flows to block 3908. In block 3908, an alert may be generated and/or remedial measures may be executed to correct the abnormal behavior of the object.

It is appreciated that the previous description of the disclosed embodiments is provided to enable any person skilled in the art to make or use the present disclosure. Various modifications to these embodiments will be apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The invention claimed is:

1. In a process that detects abnormal behavior of an object of a distributed computing system using metrics associated with the object and recorded in a historical time window, the improvement comprising:
    applying a principal component analysis technique to the metrics to determine principal components of the metrics in the historical time window;
    for each time stamp in the historical time window, computing a system-indicator value for the object based on principal component values of the principal components at the time stamp, each system-indicator value identifying an abnormal or normal state of the object at a time stamp in the historical time window;
    computing a state classifier for the object based on the system-indicator values and corresponding time stamps in the historical time window;
    using the state classifier to detect abnormal behavior of the object based on run-time metrics associated with the object; and
    generating an alert that identifies abnormal behavior of the object in response to detection of abnormal behavior of the object by the state classifier, thereby enabling identification of the abnormal behavior of the object.

2. The process of claim 1 further comprising:
    deleting constant and nearly constant metrics from the metrics; and
    synchronizing the metrics to a general sequence of time stamps.

3. The process of claim 2 wherein deleting the constant and nearly constant metrics in the metrics comprises:
    computing a standard deviation for each metric in the metric data; and
    deleting each metric with a standard deviation less than a standard deviation threshold.

4. The process of claim 1 wherein applying the principal component analysis technique to the metrics comprises:
    for each metric of the metrics
        computing a mean of metric values of the metric, and subtracting the mean from each metric value of the metric to obtain a mean-centered metric;
    computing a deviation matrix based on the mean-centered metrics;
    computing eigenvalues and eigenvectors for the deviation matrix;
    computing the principal components of the deviation matrix based on the eigenvalues and eigenvectors; and
    identifying high-variance principal components of the principal components.

5. The process of claim 4 wherein identifying the high-variance principal components of the principal components comprises:
    computing a variance for each principal component;
    computing a percentage of variance for each subset of principal components, each subset comprising a different number of principal components with the largest corresponding variances;
    determining a smallest percentage of variances that is greater than a percentage of variance threshold; and
    identifying the principal components that correspond to the smallest percentage of variances as the high-variance principal components.

6. The process of claim 1 wherein computing the state classifier for the object comprises:
    computing a bound for the system-indicator values;
    labeling system-indicator values that violate the bound as abnormal system-indicator values;
    labeling system-indicator values that do not violate the bound as normal system-indicator values;
    computing a support vector machine matrix based on the normal system-indicator values;
    computing the state classifier based on the support vector machine matrix.

7. The process of claim 1 wherein using the state classifier to detect abnormal behavior of the object comprises:
    deleting constant and nearly constant metrics from the run-time metrics;
    synchronizing the run-time metrics to a general sequence of time stamps;

computing run-time mean-centered metrics based on the synchronized and non-constant sets of metrics:
computing run-time principal components of the run-time mean-centered metrics;
computing a run-time system indicator based on the run-time principal components; and
applying the state classifier to the run-time system-indicator values to detect abnormal behavior of the object.

8. A computer system to detect abnormal behavior of an object of a distributed computing system, the system comprising:
one or more processors;
one or more data-storage devices; and
machine-readable instructions stored in the one or more data-storage devices that when executed using the one or more processors controls the system performs operations comprising:
retrieving metrics associated with the object and recorded in a historical time window from the one or more data-storage devices;
applying a principal component analysis technique on the metrics to determine principal components of the metrics in the historical time window;
for each time stamp in the historical time window, computing a system-indicator value for the object based on principal component values of the principal components at the time stamp, each system-indicator value identifying an abnormal or normal state of the object at a time stamp in the historical time window;
computing a state classifier for the object based on the system-indicator values and corresponding time stamps in the historical time window;
using the state classifier to detect abnormal behavior of the object based on run-time metrics associated with the object; and
generating an alert that identifies abnormal behavior of the object in response to detection of abnormal behavior of the object by the state classifier.

9. The computer system of claim 8 further comprising:
deleting constant and nearly constant metrics from the metrics; and
synchronizing the metrics to a general sequence of time stamps.

10. The computer system of claim 9 wherein deleting the constant and nearly constant metrics in the metrics comprises:
computing a standard deviation for each metric in the metric data; and
deleting each metric with a standard deviation less than a standard deviation threshold.

11. The computer system of claim 8 wherein applying the principal component analysis technique to the metrics comprises:
for each metric of the metrics
computing a mean of metric values of the metric, and subtracting the mean from each metric value of the metric to obtain a mean-centered metric;
computing a deviation matrix based on the mean-centered metrics:
computing eigenvalues and eigenvectors for the deviation matrix;
computing the principal components of the deviation matrix based on the eigenvalues and eigenvectors; and
identifying high-variance principal components of the principal components.

12. The computer system of claim 11 wherein identifying the high-variance principal components of the principal components comprises:
computing a variance for each principal component;
computing a percentage of variance for each subset of principal components, each subset comprising a different number of principal components with the largest corresponding variances;
determining a smallest percentage of variances that is greater than a percentage of variance threshold; and
identifying the principal components that correspond to the smallest percentage of variances as the high-variance principal components.

13. The computer system of claim 8 wherein computing the state classifier for the object comprises:
computing a bound for the system-indicator values;
labeling system-indicator values that violate the bound as abnormal system-indicator values;
labeling system-indicator values that do not violate the bound as normal system-indicator values;
computing a support vector machine matrix based on the normal system-indicator values;
computing the state classifier based on the support vector machine matrix.

14. The computer system of claim 8 wherein using the state classifier to detect abnormal behavior of the object comprises:
deleting constant and nearly constant metrics from the run-time metrics;
synchronizing the run-time metrics to a general sequence of time stamps;
computing a run-time mean-centered metrics based on the synchronized and non-constant sets of metrics;
computing run-time principal components of the run-time mean-centered metrics;
computing a run-time system indicator based on the run-time principal components; and
applying the state classifier to the run-time system-indicator values to detect abnormal behavior of the object.

15. A non-transitory computer-readable medium encoded with machine-readable instructions that implement a method carried out by one or more processors of a computer system that performs operations comprising:
retrieving a metrics associated with the object and recorded in a historical time window from the one or more data-storage devices;
applying a principal component analysis technique on the metrics to determine principal components of the metrics in the historical time window;
for each time stamp in the historical time window, computing a system-indicator value for the object based on principal component values of the principal components at the time stamp, each system-indicator value identifying an abnormal or normal state of the object at a time stamp in the historical time window;
computing a state classifier for the object based on the system-indicator values and corresponding time stamps in the historical time window;
using the state classifier to detect abnormal behavior of the object based on run-time metrics associated with the object; and
generating an alert that identifies abnormal behavior of the object in response to detection of abnormal behavior of the object by the state classifier.

16. The medium of claim 15 further comprising:
deleting constant and nearly constant metrics from the metrics; and synchronizing the metrics to a general sequence of time stamps.

17. The medium of claim 16 wherein deleting the constant and nearly constant metrics in the metrics comprises:
    computing a standard deviation for each metric in the metric data; and
    deleting each metric with a standard deviation less than a standard deviation threshold.

18. The medium of claim 15 wherein applying the principal component analysis technique to the metrics comprises:
    for each metric of the metrics
        computing a mean of metric values of the metric, and subtracting the mean from each metric value of the metric to obtain a mean-centered metric;
    computing a deviation matrix based on the mean-centered metrics;
    computing eigenvalues and eigenvectors for the deviation matrix;
    computing the principal components of the deviation matrix based on the eigenvalues and eigenvectors; and
    identifying high-variance principal components of the principal components.

19. The medium of claim 18 wherein identifying the high-variance principal components of the principal components comprises:
    computing a variance for each principal component;
    computing a percentage of variance for each subset of principal components, each subset comprising a different number of principal components with the largest corresponding variances;
    determining a smallest percentage of variances that is greater than a percentage of variance threshold; and
    identifying the principal components that correspond to the smallest percentage of variances as the high-variance principal components.

20. The medium of claim 15 wherein computing the state classifier for the object comprises:
    computing a bound for the system-indicator values;
    labeling system-indicator values that violate the bound as abnormal system-indicator values;
    labeling system-indicator values that do not violate the bound as normal system-indicator values;
    computing a support vector machine matrix based on the normal system-indicator values;
    computing the state classifier based on the support vector machine matrix.

21. The medium of claim 15 wherein using the state classifier to detect abnormal behavior of the object comprises:
    deleting constant and nearly constant metrics from the run-time metrics;
    synchronizing the run-time metrics to a general sequence of time stamps;
    computing run-time mean-centered metrics based on the synchronized and non-constant sets of metrics;
    computing run-time principal components of the run-time mean-centered metrics;
    computing a run-time system indicator based on the run-time principal components; and
    applying the state classifier to the run-time system-indicator values to detect abnormal behavior of the object.

* * * * *